US012811723B2

(12) United States Patent
Awadin et al.

(10) Patent No.: US 12,811,723 B2
(45) Date of Patent: Nov. 24, 2026

(54) INITIAL ACCESS FOR REDUCED CAPABILITY NEW RADIO DEVICES

(71) Applicant: IPLA HOLDINGS INC., New York, NY (US)

(72) Inventors: Mohamed M. Awadin, Wilmington, DE (US); Patrick Svedman, Wilmington, DE (US); Pascal Adjakple, Wilmington, DE (US); Guodong Zhang, Wilmington, DE (US); Joseph M. Murray, Wilmington, DE (US); Yifan Li, Wilmington, DE (US); Kyle Pan, Wilmington, DE (US); Allan Tsai, Wilmington, DE (US); Rocco Di Girolamo, Wilmington, DE (US); Zhuo Chen, Wilmington, DE (US)

(73) Assignee: IPLA HOLDINGS INC., New York, NY (US)

( * ) Notice: Subject to any disclaimer, the term of this patent is extended or adjusted under 35 U.S.C. 154(b) by 357 days.

(21) Appl. No.: 17/923,603

(22) PCT Filed: May 14, 2021

(86) PCT No.: PCT/US2021/032376
§ 371 (c)(1),
(2) Date: Nov. 7, 2022

(87) PCT Pub. No.: WO2021/231816
PCT Pub. Date: Nov. 18, 2021

(65) Prior Publication Data

US 2023/0188261 A1 Jun. 15, 2023

Related U.S. Application Data

(60) Provisional application No. 63/062,415, filed on Aug. 6, 2020, provisional application No. 63/024,883, filed on May 14, 2020.

(51) Int. Cl.
*H04L 1/08* (2006.01)
*H04L 1/1825* (2023.01)
(Continued)

(52) U.S. Cl.
CPC .............. *H04L 1/08* (2013.01); *H04L 1/1825* (2013.01); *H04L 5/0053* (2013.01); *H04W 74/0833* (2013.01); *H04W 74/0836* (2024.01)

(58) Field of Classification Search
CPC ....... H04L 1/08; H04L 1/1825; H04L 1/1864; H04L 1/189; H04L 5/0053; H04W 74/0833
See application file for complete search history.

(56) References Cited

U.S. PATENT DOCUMENTS 12,167,458 B2 * 12/2024 Ly .......................... H04L 5/0044
2016/0212663 A1 * 7/2016 Uemura ................ H04W 48/16
(Continued)

FOREIGN PATENT DOCUMENTS

CN 105379316 A 3/2016
CN 107409421 A 11/2017
(Continued)

OTHER PUBLICATIONS

International Search Report and Written Opinion mailed on Sep. 21, 2021, received for PCT Application PCT/US2021/032376, filed on May 14, 2021, 13 pages.
(Continued)

*Primary Examiner* — Rasheed Gidado
(74) *Attorney, Agent, or Firm* — XSENSUS LLP

(57) ABSTRACT

Methods and apparatuses are described herein for reduced capability New Radio (NR) devices. A reduced capability NR device may receive, from a base station, a reference signal (RS) or broadcast system information. The reduced capability NR device may determine, based on the received
(Continued)

RS or the received broadcast system information, a coverage enhancement for the wireless communications device and may determine a repetition configuration. The reduced capability NR device may select, based on the coverage enhancement and repetition configuration, a plurality of random access channel occasions (ROs) for a plurality of physical random access channel (PRACH) repetitions. The reduced capability NR device may send, based on one or more ROs of the selected plurality of ROs, one or more PRACH repetitions of the plurality of PRACH repetitions to cause the base station to identify the coverage enhancement and a type associated with the wireless communications device.

23 Claims, 40 Drawing Sheets

(51) Int. Cl.

| | |
|---|---|
| ***H04L 5/00*** | (2006.01) |
| ***H04W 74/08*** | (2024.01) |
| ***H04W 74/0833*** | (2024.01) |
| *H04W 74/0836* | (2024.01) |

(56) References Cited

U.S. PATENT DOCUMENTS

2018/0084578 A1 3/2018 Kato
2018/0103419 A1 4/2018 Lee
2020/0374939 A1* 11/2020 Liu .................. H04W 74/0833
2021/0051707 A1* 2/2021 Rastegardoost ...... H04W 72/23
2021/0112602 A1* 4/2021 Li .................... H04W 72/0446
2021/0251016 A1* 8/2021 Xiong .................. H04L 1/0061
2022/0272771 A1* 8/2022 Xing .................... H04L 1/1812
2023/0085104 A1* 3/2023 Park ......................... H04L 1/08 370/329
2023/0122950 A1* 4/2023 Wei .................... H04W 72/232 370/329

FOREIGN PATENT DOCUMENTS

CN 109891790 A 6/2019
WO 2016/119237 A1 8/2016
WO 2021/026710 A1 2/2021

OTHER PUBLICATIONS

3GPP, "Evolved Universal Terrestrial Radio Access (E-UTRA); Requirements for support of radio resource management (Release 16)", 3GPP TS 36.133 V16.5.0, Mar. 2020, pp. 1-760.
3GPP, "Evolved Universal Terrestrial Radio Access (E-UTRA); Medium Access Control (MAC) protocol specification (Release 16)", 3GPP TS 36.321 V16.0.0, Mar. 2020, pp. 1-141.
Ericsson (Rapporteur), "Introduction of low complexity UE and enhanced coverage features", 3GPP TSG-RAN WG2 Meeting #92, R2-157137, Nov. 16-20, 2015, 7 pages.

* cited by examiner

200

300

400

(A)

(B)

700

800

1200

1300

1500

1600

1700

1800

2000

2400

2500

2600

3100

3200

3300

3400

INITIAL ACCESS FOR REDUCED CAPABILITY NEW RADIO DEVICES

CROSS-REFERENCE TO RELATED APPLICATIONS

This application is based on PCT filing PCT/US2021/032376, filed May 14, 2021, which claims the benefit of U.S. Provisional Patent Application No. 63/024,883, filed May 14, 2020, and U.S. Provisional Patent Application No. 63/062,415, filed Aug. 6, 2020, each of which are hereby incorporated by reference in their entirety.

BACKGROUND

Compared with regular new radio (NR) user equipment (UEs), reduced capability NR devices are expected to have limited capabilities such as reduced processing power, smaller number of antennas, limited battery capability but yet longer battery life for some use cases, or the support of narrower bandwidth, e.g., 24 physical resource block (PRB) which is 5 or 10 MHz for subcarrier spacing of 15 or 30 kHz, respectively. Therefore, the coverage of downlink and uplink channels may be severely deteriorated. Accordingly, there is a need for improved access techniques for reduced capability NR devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for reduced capability New Radio (NR) devices. In one example embodiment, a reduced capability NR device may receive, from a base station, a reference signal (RS) or broadcast system information. The reduced capability NR device may have been monitoring the RS or the broadcast system information at a reduced frequency with respect to a legacy user equipment (UE) monitoring frequency. The RS may comprise a synchronization signal block (SSB). The broadcast system information may comprise a remaining system information (RMSI) or other system information (OSI). The reception occasion of the broadcast system information may have been indicated by a control resource set (CORESET) of a plurality CORESETS. The CORESET may be based on a configuration received from the base station. The reduced capability NR device may determine, based on the received RS or the received broadcast system information, a coverage enhancement for the wireless communications device and may determine a repetition configuration. The coverage enhancement may be based on a message A (Msg-A) physical uplink shared channel (PUSCH) associated with a plurality of coverage enhancements.

The reduced capability NR device may select, based on the coverage enhancement and repetition configuration, a plurality of random access channel occasions (ROs) for a plurality of physical random access channel (PRACH) repetitions. The reduced capability NR device may send, based on one or more ROs of the selected plurality of ROs, one or more PRACH repetitions of the plurality of PRACH repetitions to cause the base station to identify the coverage enhancement and a type associated with the wireless communications device. The one or more PRACH repetitions may be sent in consecutive slots or non-consecutive slots and/or in different bandwidth parts (BWPs). The one or more PRACH repetitions may be sent prior to a first message A (Msg-A) physical uplink shared channel (PUSCH) repetition. The one or more PRACH repetitions may be sent in a same association period as a message A (Msg-A) physical uplink shared channel (PUSCH) repetition. The one or more PRACH repetitions may be sent in a frequency hopping mode. The one or more PRACH repetitions may comprise a preamble indicating that the type is a reduced capability new radio (NR) device. The reduced capability NR device may receive a fallback random access response (RAR) from the base station.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1A:
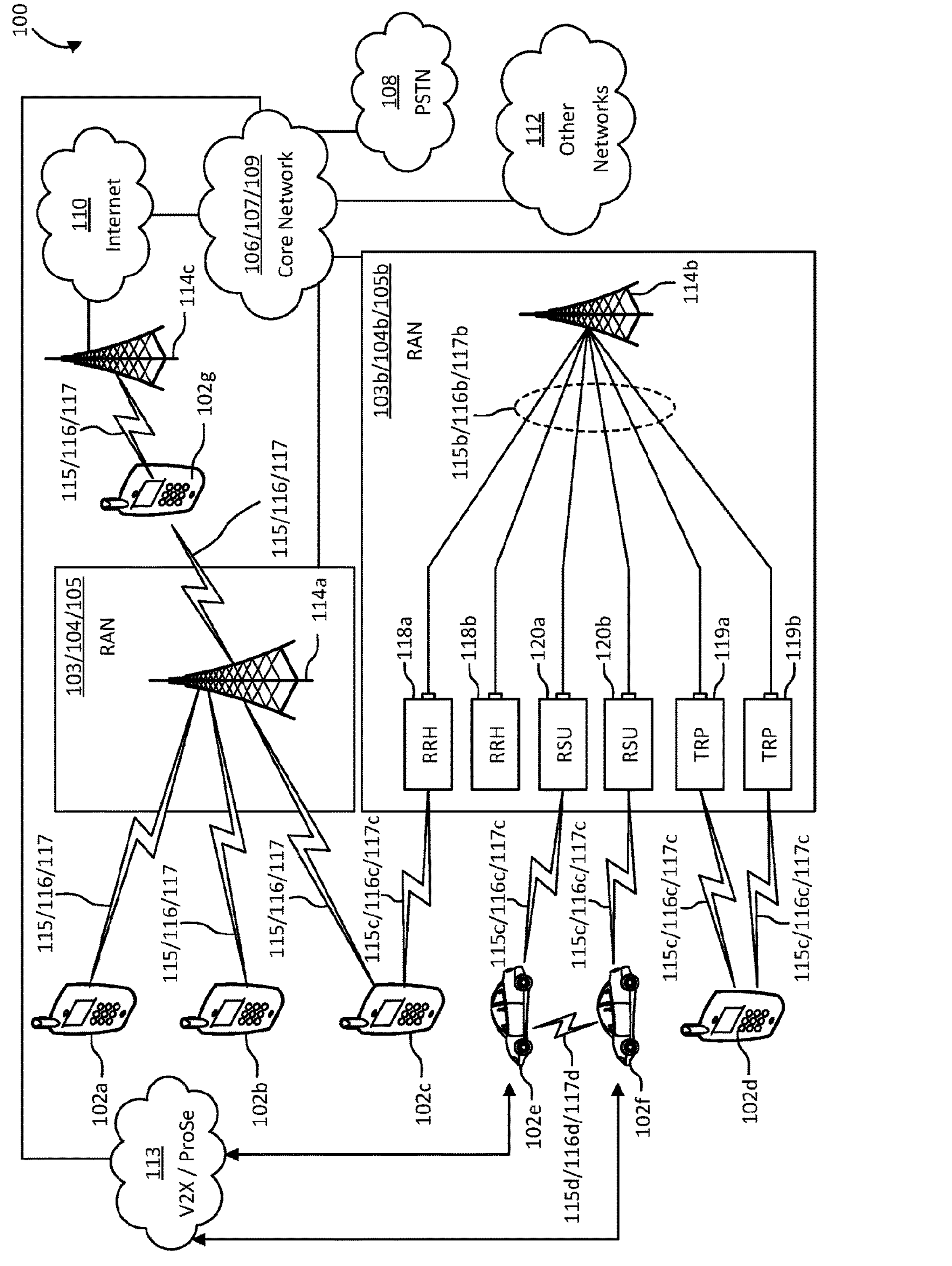
FIG. 1A illustrates one embodiment of an example communications system in which the methods and apparatuses described and claimed herein may be embodied.

Methods and apparatuses are described herein for New Radio (NR) devices. For example, the embodiments described herein may apply to reduced capability NR devices.

The following abbreviations and definitions may be used herein:

ACK Acknowledgement
BWP Bandwidth Part
CORESET Control Resource Set
CQI Channel Quality Indicator
CRC Cyclic Redundancy Check
C-RNTI Cell Radio-Network Temporary Identifier
CSI-RS Channel State Information-Reference Signal
DCI DL Control Information
DL Downlink
DMRS Demodulation Reference Signals
FDMed Frequency Division Multiplexed
gNB Next Generation NodeB
HARQ Hybrid Automatic Repeat Request
IE Information Element
LTE Long Term Evolution
MCS Modulation and Coding Scheme
MIB Master Information Block
Msg1 Message 1
Msg2 Message 2
Msg3 Message 3
Msg4 Message 4
MsgA Message A
MsgB Message B
MsgB-RNTI MsgB-radioRadio-network Network temporary identifierIdentifier
MsgB-RNTI-RedCap MsgB-Radio-Network Temporary Identifier-Reduced Capability
MTC Machine Type Communication
NR New Radio
OFDM Orthogonal Frequency Division Multiplexing
OSI Other System Information
PDCCH Physical Downlink Control Channel
PO PUSCH Occasion
PRACH Physical Random Access Channel
PRB Physical Resource Block
PUCCH Physical uplink control channel
PUSCH Physical uplink shared channel
RACH Random Access Channel
RAN Radio Access Network
RAPID RACH Preamble Identified
RAR Random Access Response
RAR Random Access Response
RA-RNTI Random Access Radio-Network Temporary Identifier
RBs Resource Blocks
RIV Resource Indicator Value
RMSI Remaining System Information
RO RACH occasion
RRC Radio Resource Control
RS Reference signal
RSRP Reference Signal Receive Power
RSRQ Reference Signal Receive Quality
RSSI Received Signal Strength Indicator
RV Redundancy Version
SIB1 System Information Block
SINR Signal to Interference plus Nosie ratio
SI-RC-RNTI System Information Reduced Capability Radio-Network Temporary Identifier SI-RNTI System Information Radio-Network Temporary Identifier
SLIV Start and Length Indicator Value
SSB Synchronization Signal Block
TC-RNTI Temporary Cell Radio-Network Temporary Identifier
TDRA Time Domain Resource Allocation
TRP Transmission and Reception Point
UCI Uplink Control Information
UE User Equipment
UL Uplink The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to comprise a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that may provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 1A may be configured to communicate with the base station 114*a*, which may employ a cellular-based radio technology, and with the base station 114*c*, which may employ an IEEE 802 radio technology.

Figure 1B:
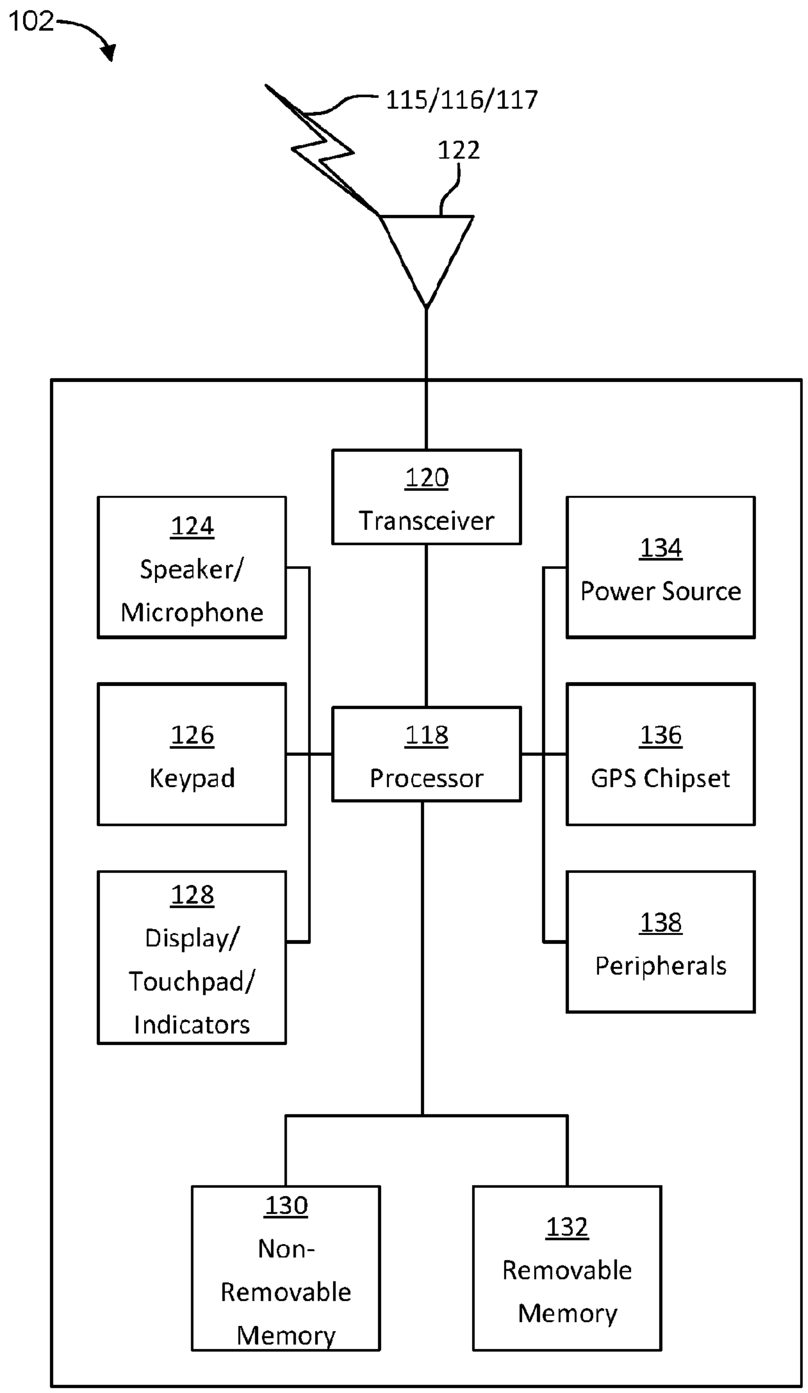
FIG. 1B is a block diagram of an example apparatus or device configured for wireless communications in accordance with the embodiments illustrated herein, such as for example, a wireless transmit/receive unit (WTRU)

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
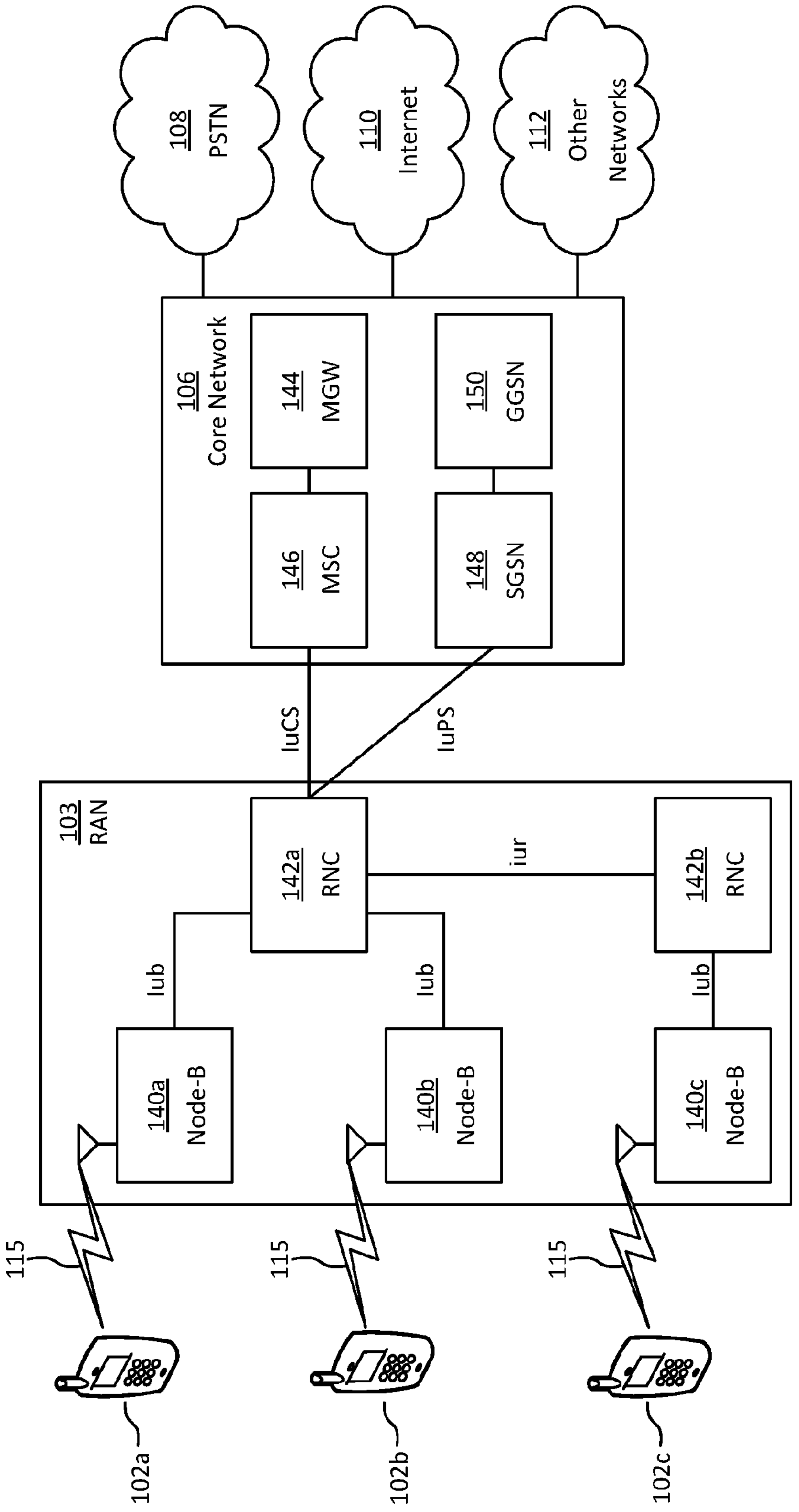
FIG. 1C is a system diagram of a RAN and a core network according to an embodiment.

FIG. 1C is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 1C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
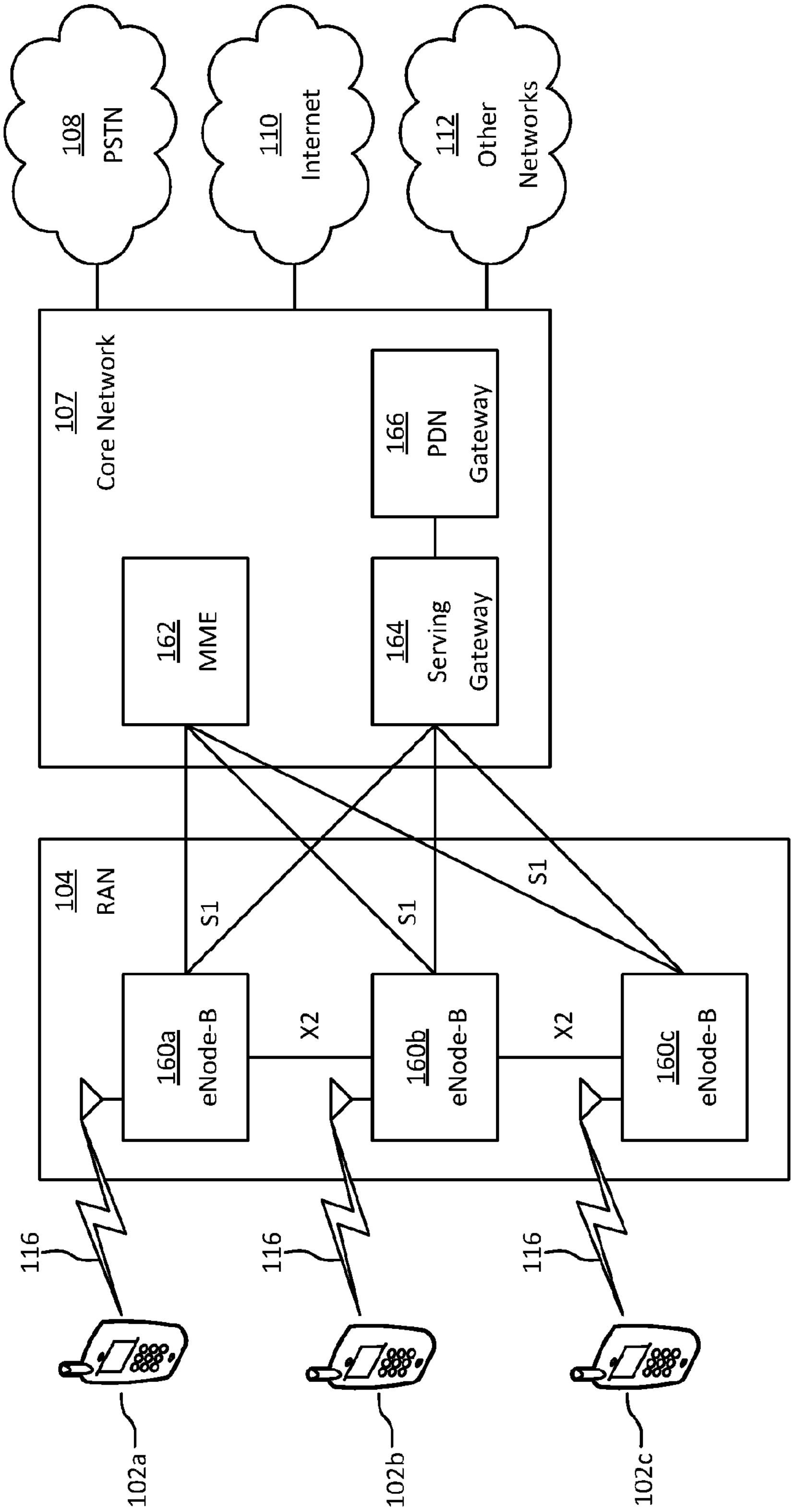
FIG. 1D is a system diagram of a RAN and a core network according to an embodiment.

FIG. 1D is a system diagram of the RAN 104 and the core network 107 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
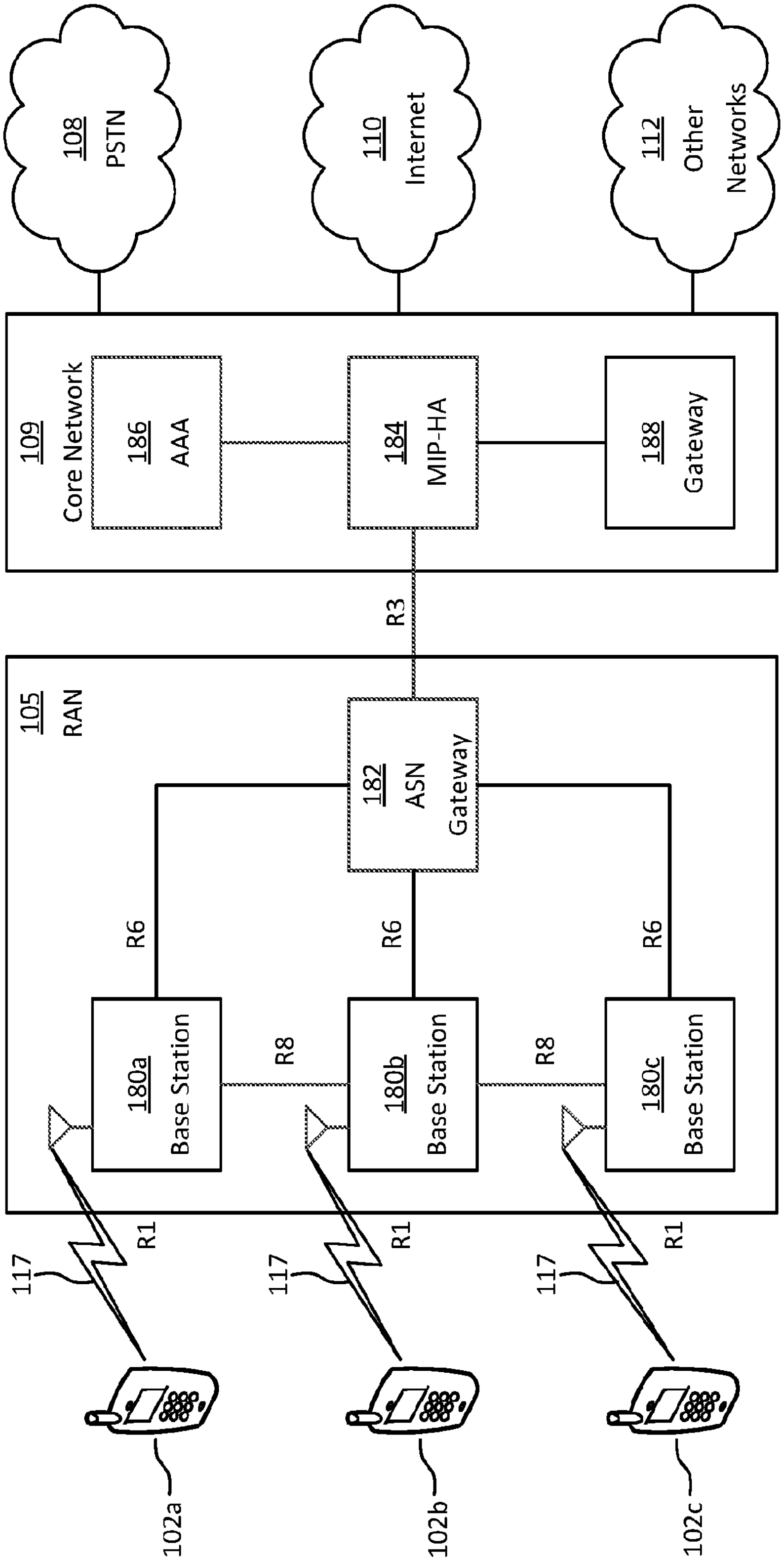
FIG. 1E is a system diagram of a RAN and the core network according to an embodiment.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
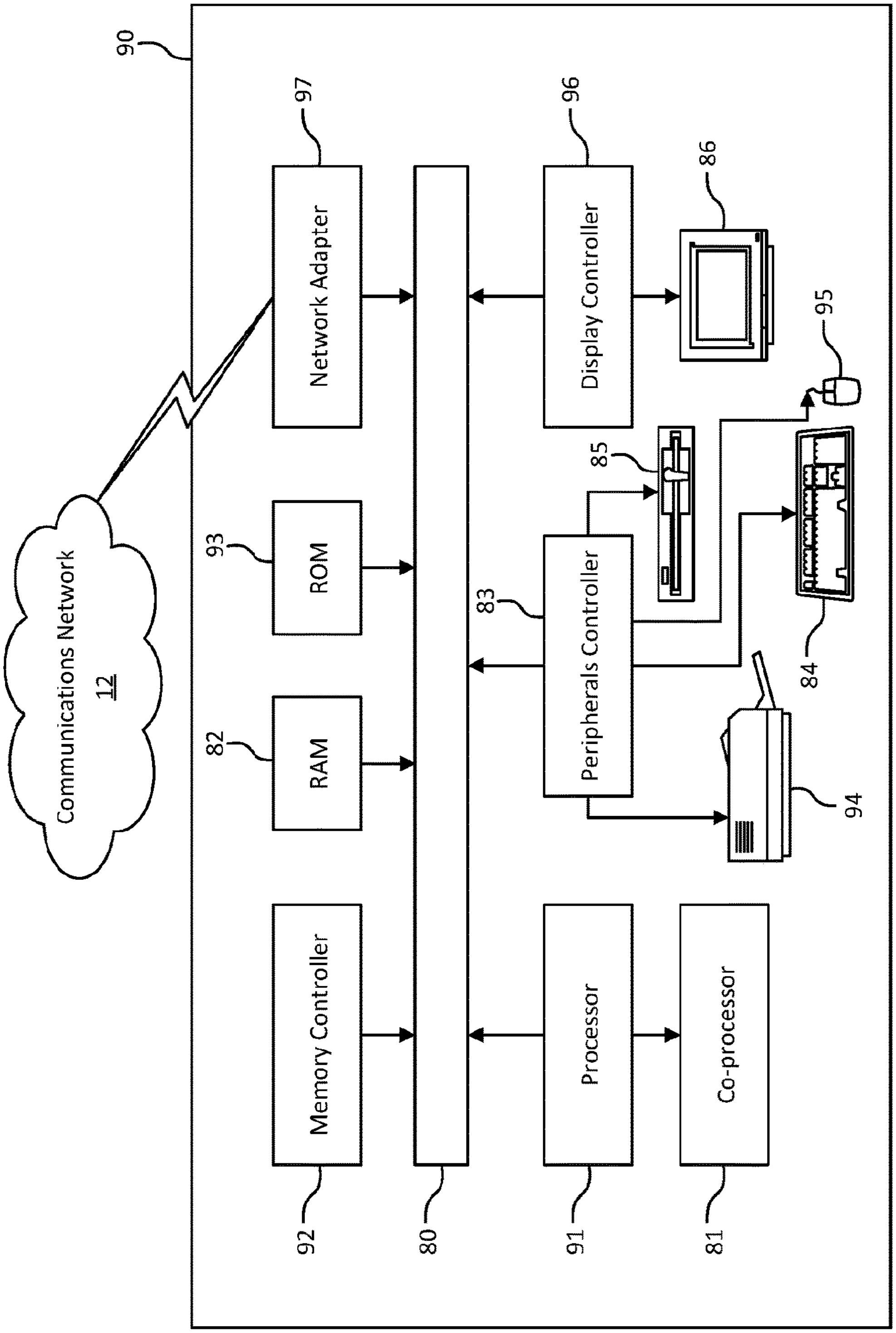
FIG. 1F is a block diagram of an exemplary computing system in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
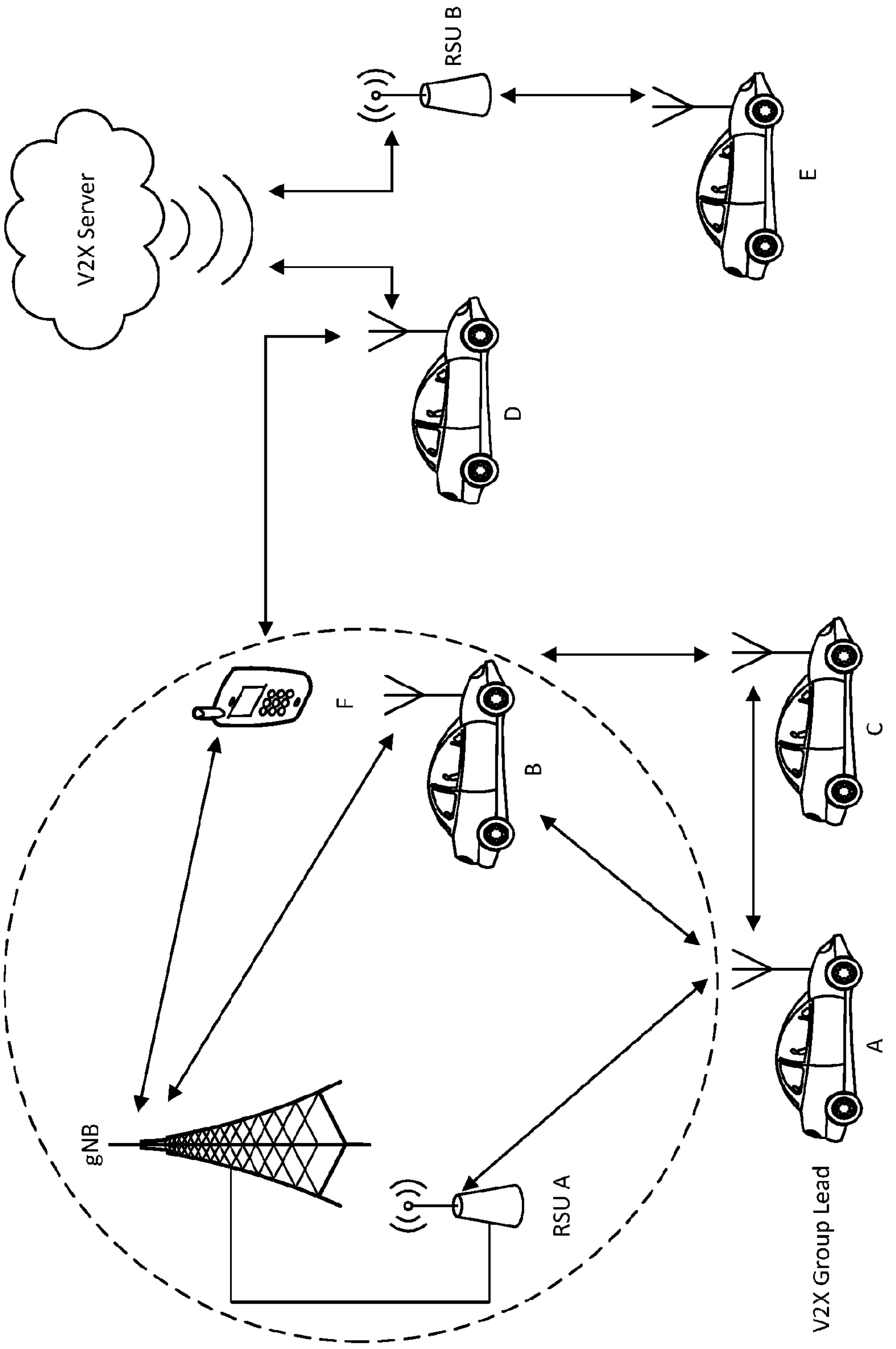
FIG. 1G illustrates one embodiment of an example communications system in which the methods and apparatuses described and claimed herein may be embodied.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The details of a 4-step new radio (NR) random access procedure are provided in 3GPP TS 38.213 V16.1.0 in Clauses 8 through 8.4 except Clauses 8.1A and 8.2A. The details of 2-step NR random access procedure are provided in 3GPP TS 38.213 V16.1.0 in Clauses 8 through 8.1A and 8.2A. The details of random access procedure for machine type communication (MTC) in long term evolution (LTE) are provided in 3GPP TS 36.213. The details of synchronization and cell search procedures for MTC in LTE are provided in 3GPP TS 36.213.

The embodiments described herein may apply to reduced capability NR devices. There is a need for improved procedures for reduced capability NR devices. Compared with regular NR UEs, reduced capability NR devices are expected to have limited capabilities such as reduced processing power, smaller number of antennas, limited battery capability but yet longer battery life for some use cases, or the support of narrower bandwidth, e.g., 24 physical resource block (PRB) which is 5 or 10 MHz for subcarrier spacing of 15 or 30 kHz, respectively. Therefore, the coverage of downlink and uplink channels may be severely deteriorated. The following procedures may be affected as follows.

Acquiring System Information may be affected. Since the maximum supported bandwidth of reduced capability NR devices, e.g. 24 PRB, is expected to be smaller than the maximum supported bandwidth of legacy NR UEs, reduced capability NR devices may not be able to receive remaining system information-physical downlink control channel (RMSI-PDCCH) if the bandwidth of control resource set-0 (CORESET-0) is wider than its maximum supported bandwidth. Also, if next generation NodeB (gNB) operates with the maximum bandwidth of reduced capability NR devices, regular NR UEs are penalized by operating on a smaller CORESET-0 than what they can really support. The embodiments described herein handle this challenge.

The coverage of RMSI-PDCCH and remaining system information-physical downlink shared channel (RMSI-PDSCH) need to be enhanced for reduced capability NR devices. The embodiments described herein enhance the coverage of both RMSI-PDCCH and RMSI-PDSCH. Also, for the cases where SSBs can be selected by UEs with different capabilities or by UEs of different categories, the embodiments described herein minimize the impact of the coverage enhancing scheme on regular NR UEs, if any.

In 4-step RACH in Rel. 15 and 16, after a UE selects RACH occasion (RO) associated with the preferred synchronization signal block (SSB) and transmit physical random access channel (PRACH), the UE starts monitoring for message 2 (Msg2). Most likely the PRACH may not reach gNB at reasonable power level even if reduced capability NR devices allocated maximum transmit power. Therefore, following 4-step RACH procedure in Rel. 15 and 16, reduced capability NR devices may start monitoring Msg2 which results in more power consumption. Additionally, reduced capability NR devices are likely to experience higher random access failure rate as a result of low received power of PRACH at the base station. The embodiments described herein enhance the coverage of message 1 (Msg1) PRACH in 4-step RACH. The embodiments described herein include procedures to let the UE know the required coverage enhancement level for Msg1 PRACH transmission.

For 2-step RACH, a UE follows a similar approach for PRACH transmission in 4-step RACH. Then UE transmits for message A-physical uplink shared channel (MsgA-PUSCH) in physical uplink shared channel (PUSCH) occasion that is spaced msgAPUSCH-TimeDomainOffset slots relative to the start of each PRACH slot. In other words, MsgA comprises two channels, PRACH and PUSCH, and the coverage enhancement is needed for each one of them when MsgA is transmitted by reduced capability NR device. The embodiments described herein include procedures to enhance the coverage for both channels.

The RRC parameter ra-SearchSpace, in PDCCH-ConfigCommon, is used to configure the search space in which the UE monitors PDCCH of Msg2 and MsgB in 4-step and 2-step RACH, respectively. Therefore, the search space and its associated CORESET is cell specific and may be used by all UEs selecting the same SSB. The bandwidth of CORESET associated with ra-SearchSpace may be beyond the maximum bandwidth supported by reduced capability NR devices. The embodiments described herein resolve this issue and avoid penalizing regular NR UE.

In NR Rel. 15 and 16, UE starts monitoring Msg2 and MsgB after the transmission of Msg1 PRACH and MsgA-PUSCH in 4-step RACH and 2-step RACH procedures, respectively. Depending on how Msg1 and MsgA may be modified to enhance their coverage, the details of Msg2 and MsgB monitoring window may need to be modified.

For reduced capability NR devices, the embodiments described herein enhance the coverage of random access response (RAR) message in physical downlink shared channel (PDSCH) and its scheduling PDCCH for both 4-step and 2-step RACH procedures. To this end, the embodiments described herein provide enhanced coverage of PDCCH and PDSCH of Msg2 and message B (MsgB).

Similar to the previous problems, there is a need to enhance the coverage of message 3 (Msg3) for reduced capability NR devices. The current scheme for repetition of Msg3 with different redundancy versions (RVs) might not be efficient or good enough to compensate for the coverage lost due to the reduced capability of these devices. Specifically, in NR Rel. 15 and 16, Msg3 can be repeated and each repetition has to be scheduled by a separate downlink control information (DCI) format 1_0 with cyclic redundancy check (CRC) scrambled by temporary cell radio-network temporary identifier (TC-RNTI) indicating the RV to be applied. Therefore, even if the existing repetition scheme with different RVs is re-used, there may still be a need for further enhancements as the current repetition scheme which requires receiving multiple PDCCH might not meet the more stringent power consumption requirement. Therefore, the embodiments described herein include procedures to enhance the coverage of Msg3 and provide details on how it can be scheduled by Msg2 or MsgB in 4-step and 2-step RACH.

In NR Rel. 15 and 16, for 4-step RACH, physical uplink control channel (PUCCH) resource indicator and PDSCH-to-hybrid automatic repeat request (HARQ)_feedback timing indicator fields in DCI scrambled by TC-RNTI indicate the time and frequency resources for the transmission of PUCCH carrying HARQ-N/ACK for Msg4. In NR Rel. 16, for 2-step RACH, these information are either transmitted in successRAR or in the DCI itself when DCI scheduling message B (MsgB) is scrambled by MsgB-radio-network temporary identifier (MsgB-RNTI) or cell radio-network temporary identifier (C-RNTI), respectively. For reduced capability NR devices, the embodiments described herein include procedures to enhance the coverage of PUCCH carrying the HARQ-N/ACK and provide the signaling details to let the UE know when and where PUCCH should be transmitted. The embodiments described herein enhance the coverage of PDCCH and PDSCH of message 4 (Msg4) for reduced capability NR devices.

Procedures are described herein to facilitate acquiring the system information for reduced capability NR devices; to enable SSB to configure multiple CORESET-0s for legacy UEs and reduced capability NR devices; to enable SSB to configure a single CORESET-0 for both legacy UEs and reduced capability NR devices while dedicating a narrow portion of this CORESET to be used by reduced capability NR devices; to enhance the coverage of both RMSI-PDCCH and RMSI-PDSCH using procedures based on repetitions; and to enhance the coverage of RMSI-PDCCH by enhancing the coding rate of RMSI-PDCCH.

Procedures are described herein to enhance the coverage of PRACH transmission (Msg1) in 4-step RACH procedure for reduced capability NR devices. This may include:

Determining the needed coverage enhancement level based on measurements;

Transmitting the repetitions of PRACH in different RACH occasions within or across different association period; and Enabling/disabling frequency hopping for PRACH.

Procedures are described herein to enhance the MsgA in 2-step RACH procedure. This may include:

- Determining the needed coverage enhancement level for MsgA-PRACH and MsgA-PUS CH;
- Enhancing the selection between 4-step RACH and 2-step RACH based on the needed coverage enhancement level;
- Repetition-based coverage enhancement;
- Non-repetition based coverage enhancement such as providing more configurations for MsgA-PUSCH, frequency hopping across different BWPs and power boosting;
- Indicating the UE type/the selected coverage enhancement level
- Handling the invalid ROs/POs.

Procedures are described herein to enhance the reception of RAR (Msg2) in 4-step RACH procedure for reduced capability NR devices. This may include:

- Enabling monitoring the Msg2 before finishing all the repetitions of Msg1 to enable early termination; and
- Enhancing the coverage of Msg2-PDCCH and Msg2-PDSCH by using procedures based on repetitions; and
- Procedures are described herein for enhancing the MsgB in a 2-step RACH procedure. This may include:
- Enabling reduced capability NR devices to receive a dedicated MsgB by configuring a dedicated search space, apply different RNTI, etc.;
- Determining the beginning of the monitoring window to enable early termination of Msg-A repetitions; and
- Enhancing the coverage of MsgB which include frequency hopping within or across different BWPs.

Procedures are described herein to enhance the coverage of Msg3. This may include:

- Scheduling multiple repetitions of Msg3-PUSCH; and
- Scheduling multiple repetitions of Msg3-PUSCH by using MsgB with Fallback RAR.

Procedures are described herein to enhance the reception of Msg4. This may include:

- Enhancing the coverage of Msg4 using repetitions; and
- Scheduling PUCCH to carry the HARQ-ACK of Msg4 if it is received correctly by the reduced capability NR device.

Solutions for SI acquisition issues are described herein. The embodiments described herein address the challenges related to different maximum supported bandwidth between legacy UE and reduced capability NR devices and its impacts on receiving remaining system information (RMSI) and other system information (OSI).

Figure 2:
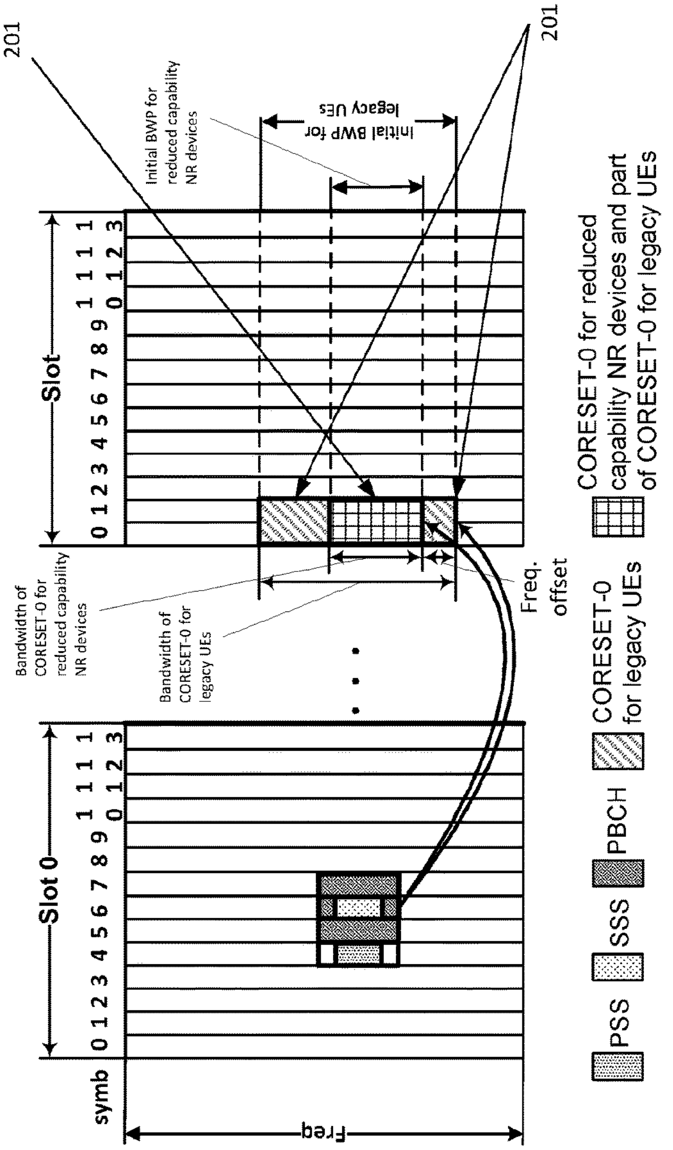
FIG. 2 shows an example of a SSB configuring two CORESET-0s with different bandwidths.

FIG. 2 shows an example of a SSB configuring two CORESET-0s with different bandwidths 200. According to the techniques described herein, the SS/PBCH block(s) (SSB) of a cell may configure multiple CORESET-0s 201, 202 with different bandwidths for the reception of PDCCH scheduling with CRC scrambled by system information-radio-network temporary identifier (SI-RNTI), for example. Each CORESET-0 may be used by a particular category of UEs. In other words, legacy UEs may monitor CORESET-0 201 with wide bandwidth while the reduced capability NR devices may monitor CORESET-0 202 with narrow bandwidth. Both CORESET-0s 201, 202 in the example of FIG. 2 may comprise the same number of consecutive symbols as shown in FIG. 2, for example. However, in general, each CORESET-0 201, 202 may be have different number of consecutive symbols, which can be configured into the UE by the base station for e.g. a UE may be configured with a value of this parameter that is specific to the device category of the UE. More details on signaling/(pre-) configuring this parameter is described below.

Moreover, the offset from the smallest RB index of CORESET-0 202 for reduced capability NR devices to the smallest RB index of the common RB overlapping with the first RB of the corresponding SSB may be the same as the offset value for CORESET-0 201 for legacy UEs. In other words, both CORESET-0s for legacy UEs and reduced capability NR devices may start from the same RB. However, in general, the offset values may be different as shown in FIG. 2, for example, more details on signaling/(pre-) configuring the offset value of reduced capability NR devices is described below.

Since the CORESET-0 201, 202 for legacy UEs and reduced capability NR devices may be overlapped, a new RNTI is described herein that is used to scramble DCI format 1_0, for example, that should be decoded by reduced capability NR devices, SI-RedCap-RNTI. This is beneficial as legacy UEs would not have any ambiguity on whether the decoded DCI is scheduling RMSI for legacy UEs or for reduced capability NR devices. A one-bit indicator in RMSI-PDCCH may also be used to distinguish whether this RMSI-PDCCH is directed to legacy UE or reduced capability NR device.

Please note the freq. offset value may be large enough such that CORESET-0 for reduced capability NR devices does not overlap with CORESET-0 of legacy UEs, they are frequency division multiplexed (FDMed).

Regarding the monitoring occasions for PDCCH in type0-PDCCH CSS, legacy UEs follow the procedure defined in Clause 13 in TS 38.213. Specifically, for SSB and CORESET multiplexing pattern 1, legacy UEs monitor RMSI-PDCCH in slots $n_0$ and $n_0+1$, the details on calculating $n_0$ is provided in in TS 38.213, and the first symbol index in each monitoring occasion is provided by Tables 13-11 and 13-12 in in TS 38.213. On other hand, for SSB and CORESET multiplexing pattern 2 and 3, the monitoring periodicity of RMSI-PDCCH is as same as the periodicity of SSB and legacy UEs monitors only one slot. The first symbol in each monitoring occasion and the slot index are provided Tables 13-13 through 13-15 in in TS 38.213.

Therefore, the techniques described herein enable reduced capability NR devices to monitor RMSI-PDCCH in the same monitoring occasions as legacy UEs, i.e., the same monitoring periodicity, the same slot index and the same first symbol to start monitoring RMSI-PDCCH.

Figure 3:
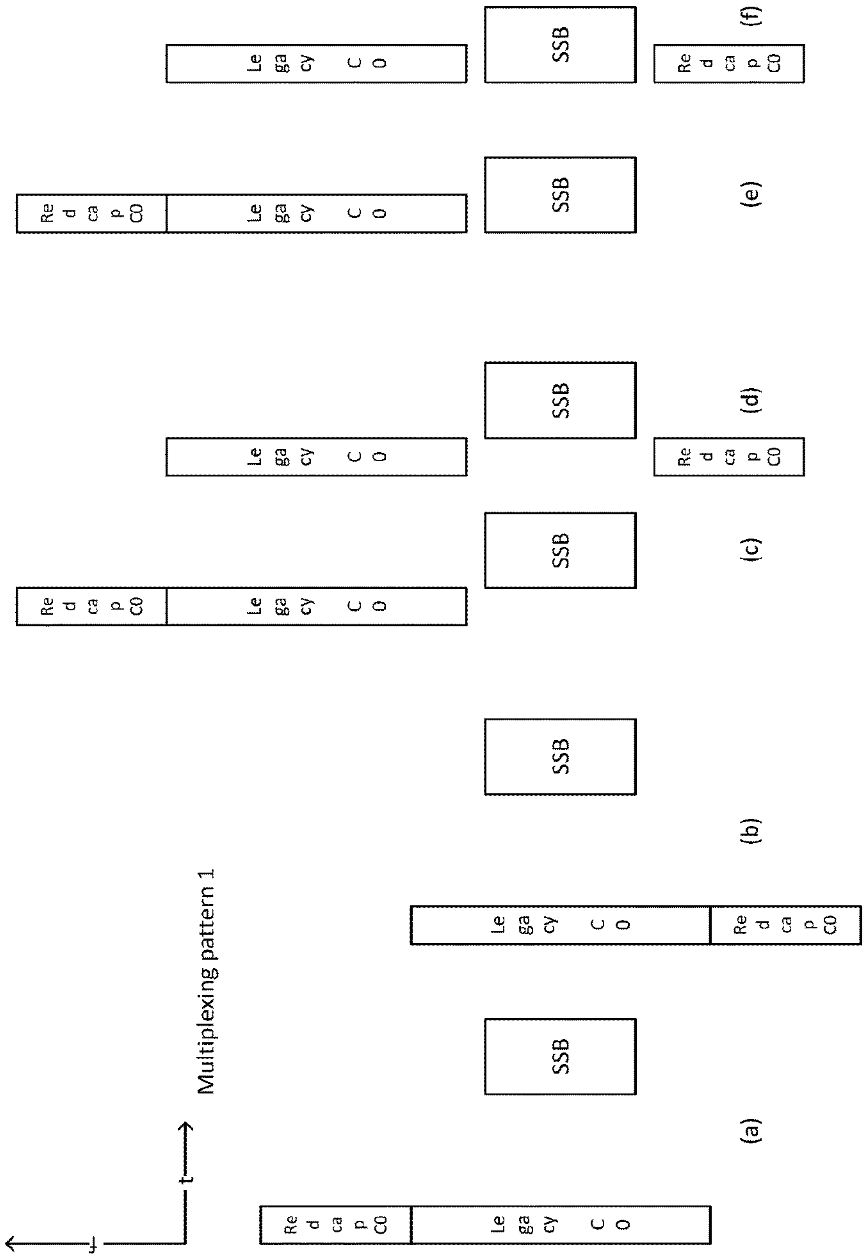
FIG. 3 shows an example of various placements of the reduced capability CORESET 0 (“redcap C0”) in relation to the legacy CORESET 0 (“Legacy C0”) and the SSB.

FIG. 3 shows an example of various placements of the reduced capability CORESET 0 (“redcap C0”) in relation to the legacy CORESET 0 (“Legacy C0”) and the SSB 300. In the example of FIG. 3, (a) and (b) show two examples for multiplexing pattern 1, (c) and (d) show two cases show two examples for multiplexing pattern 2, and (e) and (f) show two examples for multiplexing pattern 3. In legacy NR, when SSB and CORESET-0 are multiplexed according to pattern 3, the CORESET-0 is transmitted in the same symbol as the SSB, but FDMed. Hence, the SSB is on one side of the legacy CORESET-0. For reduced capability NR devices, its CORESET-0 may in one case be placed adjacent to the legacy CORESET-0 but not one the same side of the legacy CORESET-0 as the SSB ((e) in FIG. 3). In another case, the CORESET-0 for reduced capability UEs is placed adjacent to the SSB, possibly with a subcarrier offset as for legacy CORESET-0, but not on the same side of the SSB as the legacy CORESET-0 ((f) in FIG. 3). For multiplexing pattern 2, the situation is similar, but the CORESET-0 starts just before the SSB in time. In one example, the network can configure in the SS/PBCH block on which side of the legacy CORESET-0 the CORESET-0 for reduced capability UE is placed, e.g. according to the cases discussed above (illustrated in FIG. 3). In another example, it is fixed on which side the reduced capability CORESET-0 is located. For multiplexing pattern 1, 1 bit indication may be used for selecting on which side (above or below in frequency as illustrated in (a) and (b) FIG. 3) of legacy CORESET-0 that reduced capability NR devices CORESET-0 is located.

Figure 4:
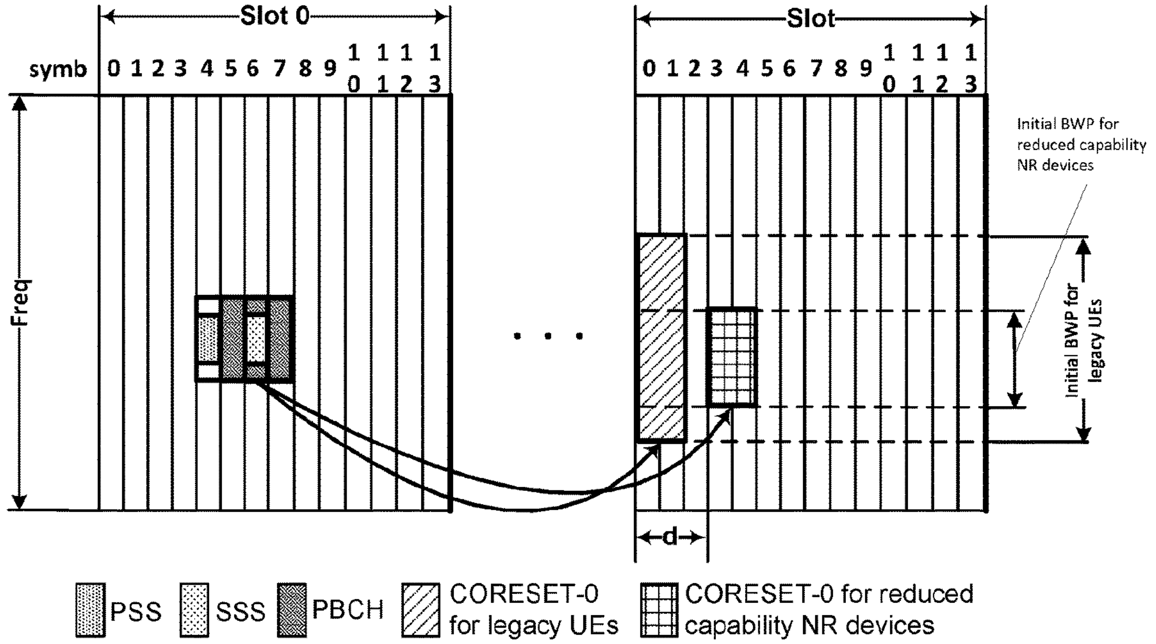
FIG. 4 shows an example of shifting RMSI-PDCCH monitoring occasions for reduced capability NR devices with respect to RMSI-PDCCH monitoring occasions for legacy UEs.
Figure 4:
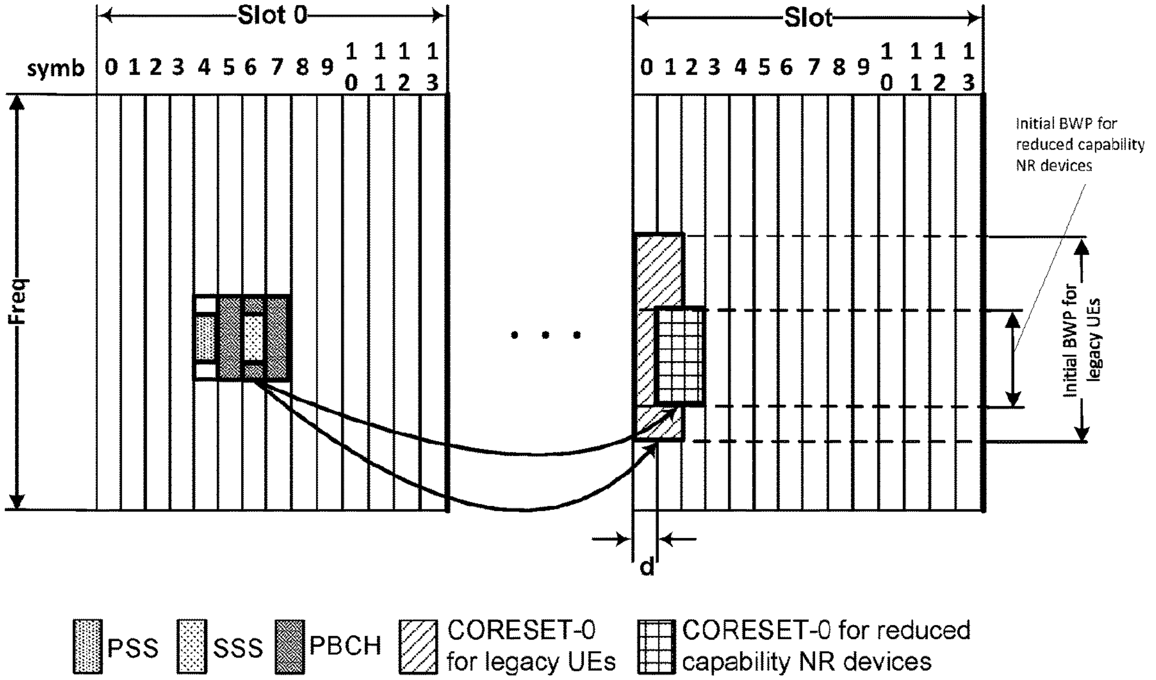

FIG. 4 shows an example of shifting RMSI-PDCCH monitoring occasions for reduced capability NR devices with respect to RMSI-PDCCH monitoring occasions for legacy UEs 400. In FIG. 4, (A) shows an example of when the monitoring occasions are not overlapped, and (B) shows an example of when the monitoring occasions are partially overlapped. As yet other possibility, the monitoring occasions for reduced capability NR devices may be shifted from those for legacy UEs. The monitoring occasions may be non-overlapped as shown in (A) of FIG. 4, for example. Also, they may be partially overlapped as illustrated in (B) of FIG. 4. A shift value, e.g. parameter "d," as shown in the example of FIG. 4, may be used in units of symbols, slots and/or radio frames and may be provided such that reduced capability NR devices can identify the location of RMSI-PDCCH monitoring occasions relative to what is applied by legacy UEs. More details on signaling/(pre-) configuring the shift parameter to reduced capability NR devices are described below.

The RMSI-PDCCH monitoring periodicity for reduced capability NR devices may be less frequent than that for legacy UEs. Or it may be fixed independent of the monitoring periodicity of legacy UEs, and it may be either signaled or specified, provided in the specs. Specifically, the techniques described herein enable reduced capability NR devices to operate on scaled version of RMSI-PDCCH monitoring periodicity of legacy UEs. The details of indicating the scaling parameter are described below.

Figure 5:
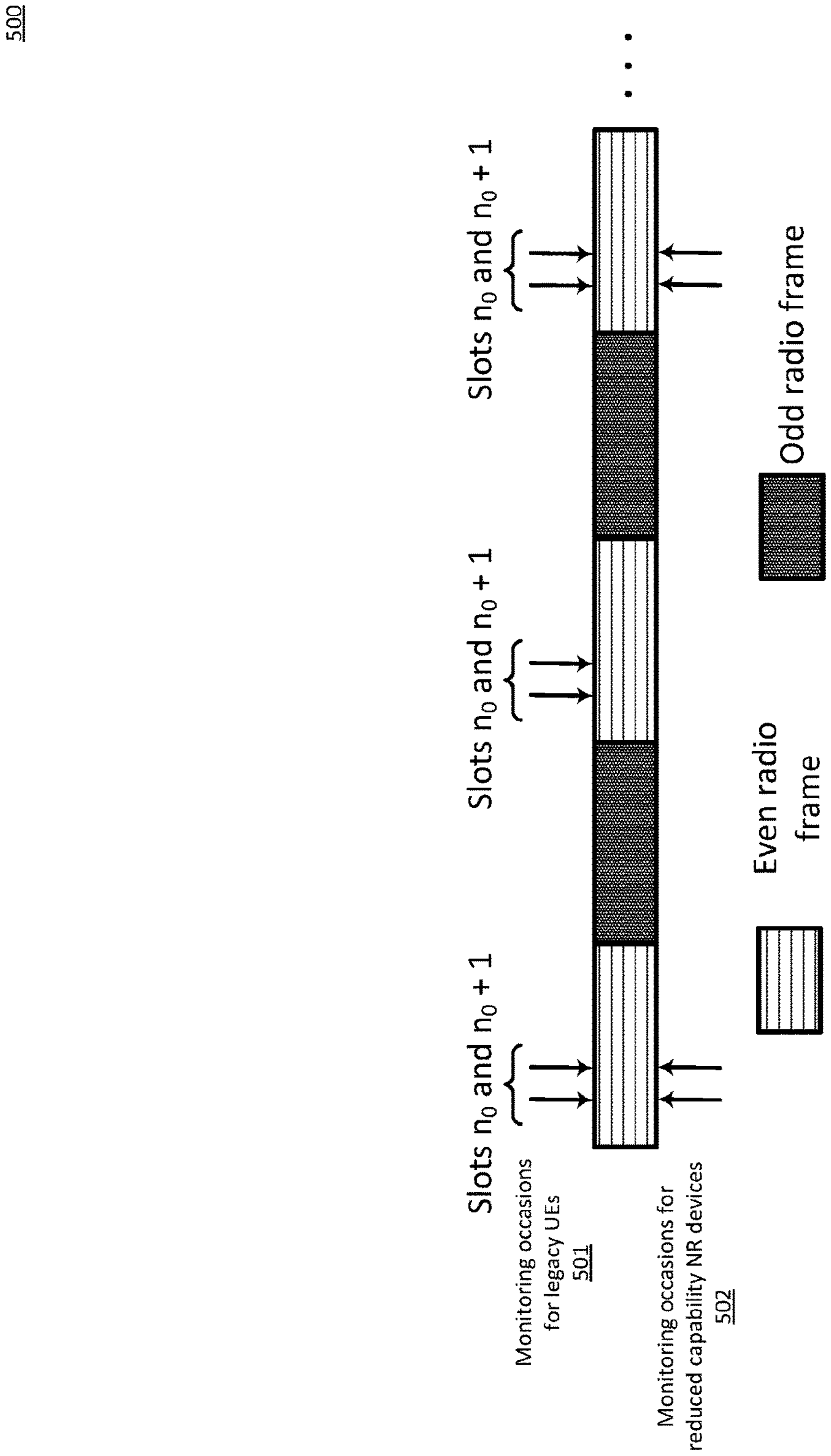
FIG. 5 shows an example of scaling down the monitoring periodicity of RMSI-PDCCH for reduced capability NR devices.

FIG. 5 shows an example of scaling down the monitoring periodicity of RMSI-PDCCH for reduced capability NR devices 500. In the example of FIG. 5, RMSI-PDCCH monitoring occasions for legacy UEs 501 are shown occurring in even radio frames for SSB and CORESET-0 multiplexing pattern 1. In this example, reduced capability NR devices 502 operate on scaled down monitoring occasions periodicity by factor two to be every other even radio frame instead of every even radio frame as the case of legacy UEs. Though FIG. 5 shows an example of scaling down the monitoring occasion periodicity when the SSB and CORESET-0 multiplexing pattern 1 is used, the same approach may be applied as well when SSB and CORESET-0 multiplexing pattern 2 or 3 is used. Please note that procedures to shift the monitoring occasions of RMSI-PDCCH for reduced capability NR devices with respect to the monitoring occasions of legacy UEs may be applied in addition to scaling down the periodicity of the monitoring occasions.

To further reduce the power consumption for reduced capability NR devices when SSB and CORESET-0 multiplexing pattern 1 is used, the RMSI-PDCCH may be monitored in only one slot instead of two consecutive slots as in the case for legacy UEs. This slot may be either $n_0$ or $n_0+1$, which may be specified, provided in the specs.

Figure 6:
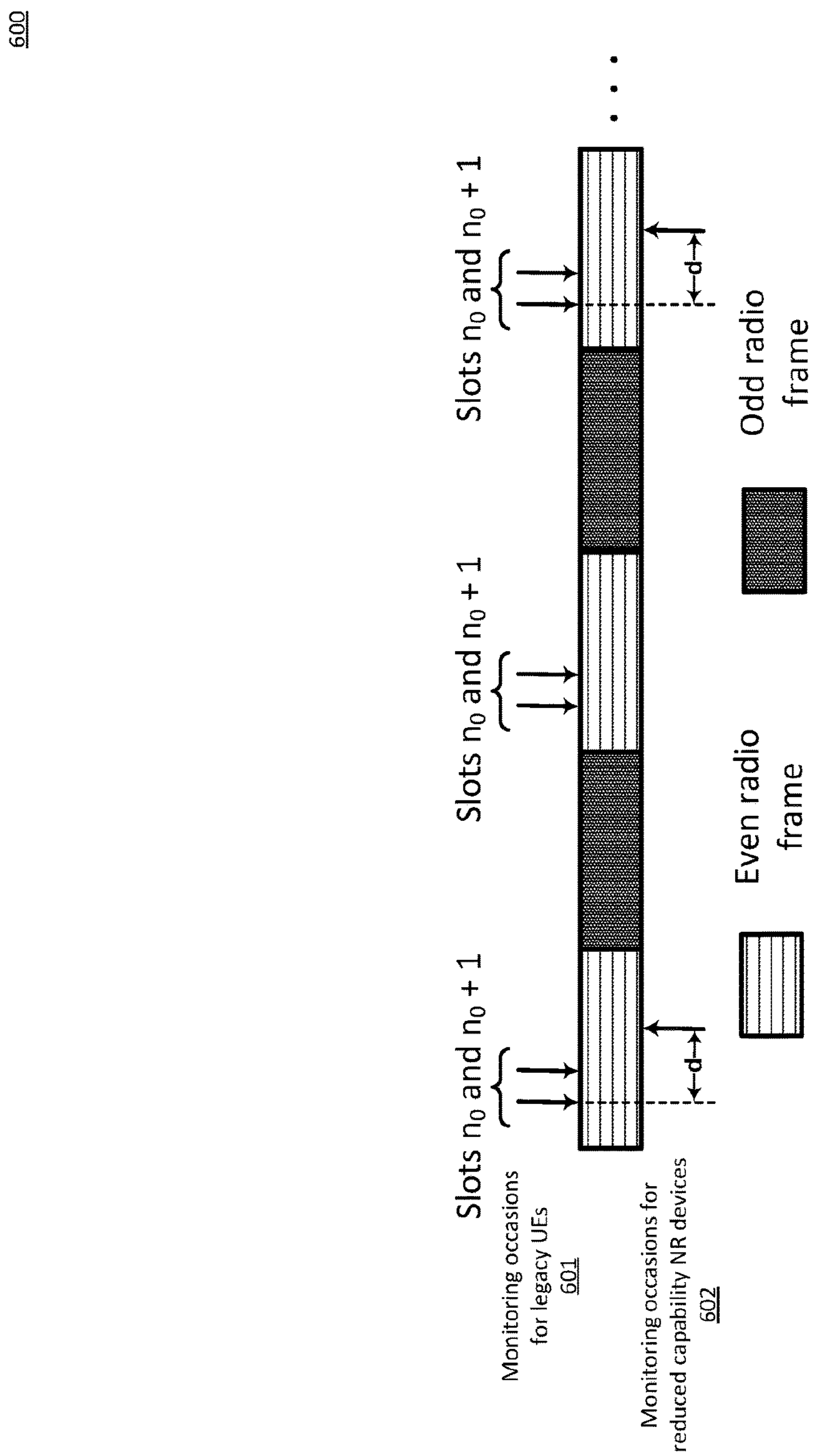
FIG. 6 shows an example of SSB and CORESET-0 multiplexing pattern 1, in which one slot is used to monitor RMSI-PDCCH, and it is shifted with respect to $n_0$ for legacy UEs and monitoring periodicity is reduced by factor of two.

FIG. 6 shows an example of SSB and CORESET-0 multiplexing pattern 1, in which one slot is used to monitor RMSI-PDCCH, and it is shifted with respect to $n_0$ for legacy UEs and monitoring periodicity is reduced by factor of two 600. In the example of FIG. 6, RMSI-PDCCH monitoring for legacy UEs 601 and reduced capability NR devices 602 is shown when SSB and CORESET-0 multiplexing pattern 1 is used. The monitoring periodicity of RMSI-PDCCH is reduced by factor of two for reduced capability NR devices, i.e., the monitoring periodicity is multiplied by factor of half. Also, instead of monitoring RMSI-PDCCH in two consecutive slots as in case of legacy UEs, only one slot is allocated for monitoring RMSI-PDCCH for reduced capability NR devices. On the top of that, an offset of "d", in units of symbols and/or slots, is applied with respect to $n_0$ for legacy UEs.

To indicate the aforementioned information to reduced capability NR devices, SSB has to carry an indication whether reduced capability NR devices can use this cell for initial access or not. Therefore, the reserved bit may be used in the master information block (MIB) for this purpose. If it is set to one, reduced capability NR devices may use this cell for initial access, otherwise if the bit is set to zero, then the cell cannot be used for initial access.

The cell may not be barred to reduced capability NR devices just because the dedicated RMSI for them cannot be configured. There may be an additional condition, e.g. the legacy RMSI cannot be received or the reduced capability NR device is not capable of operating with the legacy configured RACH procedure, e.g. due to bandwidth or timing constraints.

Moreover, for FR1 operation, there are two reserved bits in PBCH payload, e.g. $\bar{a}_{\bar{A}+6}$ and $\bar{a}_{\bar{A}+7}$. Therefore, any of these two bits may be used to indicate whether the associated cell can be used for initial access for reduced capability NR devices or not.

Associating the SSB with other reference signals such as channel state information-reference signal (CSI-RS) and/or additional demodulation reference signals (DMRS) such that the presence of such signal indicate that this cell may be used for initial access by reduced capability NR devices. The configurations of such reference signal may be provided in the specs. When the measured quality, such as RSRP, RSSI, etc. is greater than particular threshold, then the cell may be used for initial access by reduced capability NR devices. Also, the legacy DMRS of PBCH, SSS or PSS of SSB may be used for this purpose. The threshold values may be specified, provided in the specs.

A new set of tables may be used to interpret pdcch-ConfigSIB1 in master information block (MIB) by reduced capability NR devices. Specifically, both legacy UEs and reduced capability NR devices may read the same pdcch-ConfigSIB1. Legacy UEs may apply Tables 13-1 through 13-15 in in TS 38.213. On the other hand, reduced capability NR devices may apply different set of tables that is specified for their category.

Table 1 shows an example for CORESET-0 configurations when SCS of 15 kHz is used for both SSB and PDCCH. Basically, the configurations associated with large bandwidth CORESET-0 are replaced with other configurations associated with narrow bandwidth CORESET-0. In other words, any configurations that is associated with CORESET-0 comprises more than 24 PRB is replaced with only 24 PRBs. However, other parameters, such as the number of symbols per CORESET and the offset parameter, may be re-used or modified to carry different control information.

TABLE 1

Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHz

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | ~~48~~ 24 | 1 | 12 |
| 7 | 1 | ~~48~~ 24 | 1 | 16 |
| 8 | 1 | ~~48~~ 24 | 2 | 12 |
| 9 | 1 | ~~48~~ 24 | 2 | 16 |
| 10 | 1 | ~~48~~ 24 | 3 | 12 |
| 11 | 1 | ~~48~~ 24 | 3 | 16 |
| 12 | 1 | ~~96~~ 24 | 1 | 38 |
| 13 | 1 | ~~96~~ 24 | 2 | 38 |
| 14 | 1 | ~~96~~ 24 | 3 | 38 |
| 15 | | Reserved | | |

For the monitoring occasions of RMSI-PDCCH, reduced capability NR devices may use modified version of the tables by legacy UE to carry additional information related to the scaling factor to be applied for the RMSI-PDCCH monitoring periodicity, number of repetitions of PDCCH (more details are described below on the repetition procedures), etc.

Reduced capability NR devices may apply the same formula to derive the monitoring periodicity of RMSI-PDCCH as legacy UEs in case of SSB and CORESET-0 multiplexing pattern 1 and then apply a scaling factor. For SSB and CORESET-0 multiplexing pattern 2 and 3, reduced capability NR devices may assume that monitoring periodicity is equal to SSB periodicity multiplied by the indicated scaling factor.

Table 2 shows an example of indicating the periodicity scaling factor. If the monitoring periodicity is calculated to be every even radio frame and the indicated periodicity scaling factor is ¼, then reduced capability NR devices monitor every fourth even radio frame. Also, referring to FIG. 4 and FIG. 6, the shift parameter "d" may be indicated as shown in the column of the first symbol index.

Another possibility is that reduced capability NR devices may be configured with the shift parameter "d" and apply it the monitoring occasions indicated to the legacy UEs.

TABLE 2

Parameters for PDCCH monitoring occasions for Type0-PDCCH CSS set-SS/PBCH block and CORESET multiplexing pattern 1 and FR1

| Index | O | Number of search space sets per slot | M | First symbol index | Periodicity scaling factor | Number of repetitions |
|---|---|---|---|---|---|---|
| 0 | 0 | 1 | 1 | 0 + d | 1/2 | 10 |
| 1 | 0 | 2 | 1/2 | {0 + d, if i is even}, {$N_{symb}^{CORSET}$ + d, if i is odd} | 1/2 | 10 |
| 2 | 2 | 1 | 1 | 0 | 1/4 | 10 |
| 3 | 2 | 2 | 1/2 | {0 + d, if i is even}, {$N_{symb}^{CORSET}$ + d, if i is odd} | 1/4 | 15 |
| 4 | 5 | 1 | 1 | 0 + d | 1/8 | 10 |
| 5 | 5 | 2 | 1/2 | {0 + d, if i is even}, {$N_{symb}^{CORSET}$ + d, if i is odd} | 1/8 | 10 |
| 6 | 7 | 1 | 1 | 0 + d | 1/8 | 15 |
| 7 | 7 | 2 | 1/2 | {0 + d, if i is even}, {$N_{symb}^{CORSET}$ + d, if i is odd} | 1/16 | 15 |
| 8 | 0 | 1 | 2 | 0 + d | 1/16 | 10 |
| 9 | 5 | 1 | 2 | 0 + d | 1/16 | 10 |
| 10 | 0 | 1 | 1 | 1 + d | 1/16 | 10 |
| 11 | 0 | 1 | 1 | 2 + d | 1/16 | 10 |
| 12 | 2 | 1 | 1 | 1 + d | 1/16 | 20 |
| 13 | 2 | 1 | 1 | 2 + d | 1/16 | 30 |
| 14 | 5 | 1 | 1 | 1 + d | 1/16 | 40 |
| 15 | 5 | 1 | 1 | 2 + d | 1/16 | 20 |

Rather than introducing a new set of tables to interpret pdcch-ConfigSIB1 in MIB, the three reserved bits in MIB and PBCH payload may be used to indicate some additional configurations to define another CORESET-0 and/or the RMSI-PDCCH monitoring occasions for reduced capability NR devices. By dedicating one bit to distinguish whether SSB can be used for initial access by reduced capability NR devices, there are two bits left.

First, any of following parameters list denoted as a "common-list" and provided by pdcch-ConfigSIB1 in MIB, may be applied by both legacy UEs and reduced capability NR devices to receive RMSI-PDCCH:

SSB and CORESET multiplexing pattern

The number of symbols in CORESET-0

The RB offset value for CORESET-0

The monitoring occasion parameters

Alternatively, any of the aforementioned parameters (or any of their combinations) may be specified, provided in the specs. For example, the SSB and CORESET multiplexing pattern may always be pattern 1 and number of symbols in COREST-0 may be two symbols.

For the number of PRBs in CORESET-0, 24 PRBs, for example, may be fixed and specified. Also, the time shift between the monitoring occasions of legacy UEs and reduced capability NR devices may be specified and provided in the specs.

The remaining reserved bits in MIB or PBCH payload may be used to signal any of the following information (or any of their combinations):

Time offset between the monitoring occasions for legacy UEs and reduced capability NR devices as illustrated in FIG. 4 and FIG. 6, for example.

Periodicity scaling factor to scale the monitoring occasions periodicity of legacy UEs.

Number of RMSI-PDCCH repetitions.

A frequency offset value relative to the first RB in CORESET-0 of legacy UEs or any other reference RB.

Any of other parameters excluded from the "common-list" above or not specified.

Table 3 shows an example of how the remaining two reserved bits may be used. The table carries information about the time offset between monitoring occasions, periodicity scaling, number of repetitions of PDCCH. It is also assumed that there is frequency offset between CORESET-0 monitored by legacy UEs and CORESET-0 monitored by reduced capability NR devices. The offset may be relative the first PRB in CORESET-0 used by legacy UEs, as shown in FIG. 2. Or the offset may be relative to the associated SSB, i.e., an offset from the smallest RB index of CORESET-0 for reduced capability NR devices to the smallest RB index of the common RB overlapping with the first RB of the corresponding SSB.

TABLE 3

Indicating the parameters related CORESET-0 and monitoring occasions for RMSI-PDCCH that are not common between RMSI configurations of legacy UEs and reduced capability NR devices using the remaining reserved two bits in MIB and/or PBCH payload

| Index | Offset (RBs) | Time offset | Periodicity scaling factor | Number of repetitions |
|---|---|---|---|---|
| 0 | 0 | $d_0$ | ½ | 5 |
| 1 | 2 | $d_1$ | ⅓ | 10 |
| 2 | 4 | $d_3$ | ⅛ | 15 |
| 3 | 0 | $d_4$ | ⅛ | 20 |

SSB configures the same CORESET-0 for UEs with different capabilities.

Figure 7:
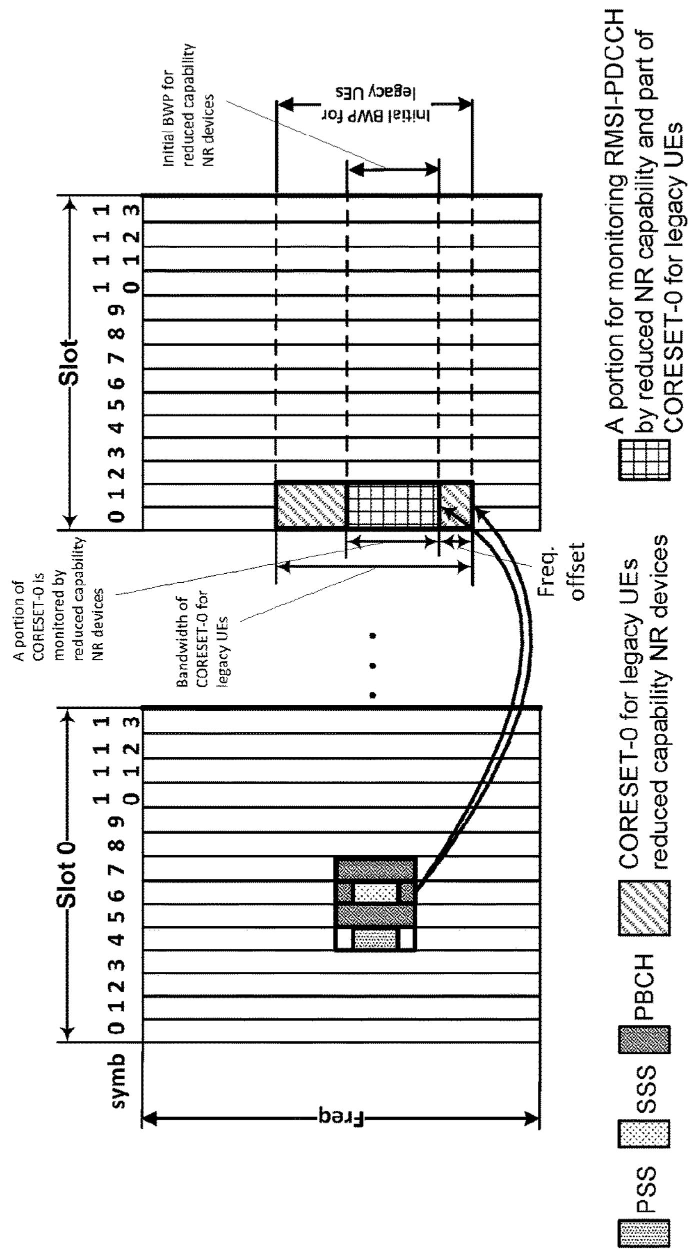
FIG. 7 shows an example in which a portion of CORESET-0 is used to transmitting RMSI-PDCCH for reduced capability NR devices.

FIG. 7 shows an example in which a portion of CORESET-0 is used to transmitting RMSI-PDCCH for reduced capability NR devices 700. The SSB may configure a single CORESET-0, by pdcch-ConfigSIB1 in MIB, to be used by both legacy UEs and reduced capability NR devices. However, due to the limit on the maximum supported bandwidth of reduced capability NR devices, only a portion of this CORESET-0 can be monitored by them. For example, if the indicated CORESET-0 has 48 PRBs, then only a portion of 24 PRBs can be used for the reception of RMSI-PDCCH. This portion may fall anywhere within the CORESET-0 as illustrated in FIG. 7, for example.

All the CCEs allocated to carry RMSI-PDCCH for reduced capability NR devices may be fully contained in the portion that can be monitored by them. This portion may always start/end from/at the first/last PRB in the indicated CORESET-0. Such configuration may be specified or provided in the specs. Alternatively, the gNB may indicate such information. For example, one bit of the two reserved bits may be used for this purpose. If the bit is set to zero/one, this portion starts/end from/at the first/last PRB in CORESET-0, respectively.

As yet another possibility, the location of this portion may be defined as an offset relative to the particular PRB, such as first RB in CORESET-0. The offset value may be indicated using one of available the reserved bits in MIB or PBCH payload.

Also, a time shift may be applied to separate the monitoring occasion of the legacy UEs and reduced capability NR devices as described above for the case in which SSB configures two CORESET-0.

Given that one of the three reserved bits in the MIB and PBCH payload is dedicated to distinguish whether the SSB can be used for initial access for reduced capability NR devices, it is proposed to utilize the remaining two bits as illustrated in Table 4, for example.

TABLE 4

Indicating information for the reception of RMSI-PDCCH with wideband CORESET-0 using two bits in MIB and/or PBCH payload

| Index | Location of the portion monitored by reduced capability NR devices within CORESET-0 | Time offset | Periodicity scaling factor | Number of repetitions |
|---|---|---|---|---|
| 0 | Starts at the first PRB of CORESET-0 | $d_0$ | ½ | 5 |
| 1 | Starts at the first PRB of CORESET-0 | $d_1$ | ⅓ | 10 |
| 2 | End at the last PRB of CORESET-0 | $d_3$ | ⅛ | 15 |
| 3 | End at the last PRB of CORESET-0 | $d_4$ | ⅛ | 20 |

When the RMSI-PDCCH monitoring occasions are partially or fully overlapped between legacy UEs and reduced capability NR devices and SSB points to a portion of CORESET-0 for reduced capability NR devices or their CORESETs are fully or partially overlapped for the case that SSB configures two CORESETs, an ambiguity may happen when two RMSI-PDCCHs are transmitted for different groups of UEs. Legacy UEs may not be able distinguish whether the transmitted RMSI-PDCCH is for legacy UEs or for reduced capability NR devices because legacy UE may be able to decode both RMSI-PDCCH due to the overlapping in the monitoring occasions.

Therefore, a new RNTI may be used for scrambling the PDCCH that schedules system information and make it different from the legacy SI-RNTI. For example, the new RNTI may be called system information-reduced capability-RNTI (SI-RC-RNTI).

A one-bit indicator may be used in RMSI-PDCCH to distinguish whether this RMSI-PDCCH is directed to legacy UE or reduced capability NR device.

Procedures based on repetitions to enhance the coverage of both RMSI-PDCCH and RMSI-PDSCH are described herein. Reduced capability NR devices may assume that the same RMSI-PDCCH is repeated in "n" consecutive monitoring occasions starting from a particular monitoring occasion, e.g. the first monitoring occasion associated with the selected SSB. Since the RMSI-PDCCH with the same contents is repeated, reduced capability NR devices may be able to combine RMSI-PDCCH repetitions.

Figure 8:
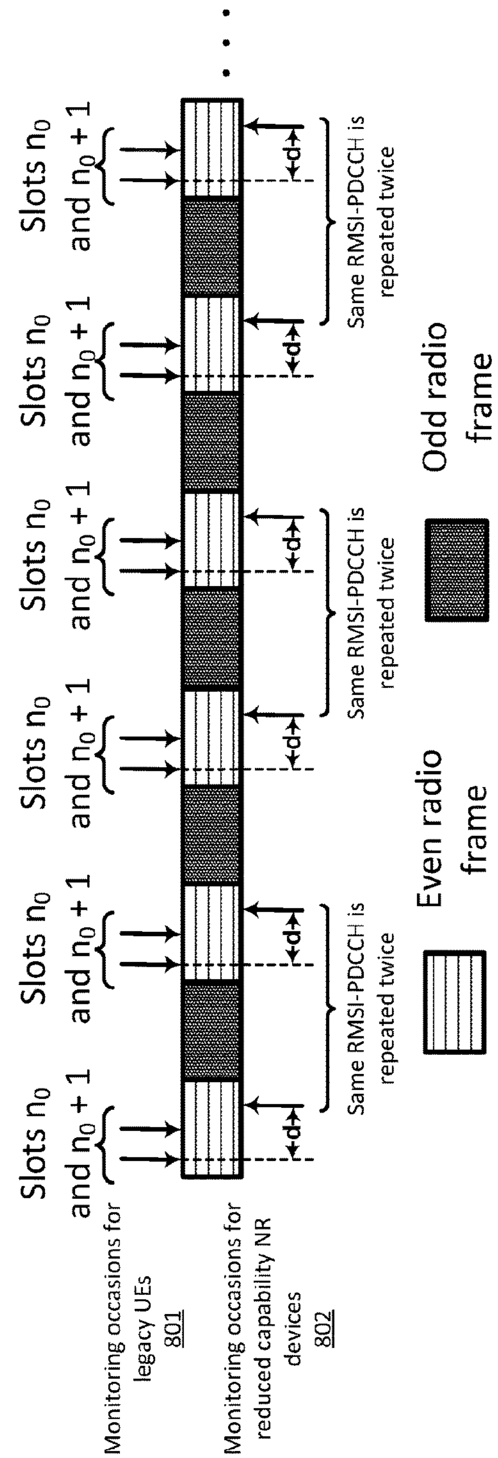
FIG. 8 shows an example in which the RMSI-PDCCH for reduced capability NR devices is repeated twice.

FIG. 8 shows an example in which the RMSI-PDCCH for reduced capability NR devices is repeated twice 800. In the example of FIG. 8, the RMSI-PDCCH monitoring occasions are shown when SSB and CORESET-0 are multiplexed according to pattern 1. Legacy UEs monitors 801 RMSI-PDCCH in slots $n_0$ and $n_0+1$ in even frames. On the other hand, reduced capability NR devices 802 only monitor RMSI-PDCCH in one slot shifted by time shift "d" as explained before. It is assumed that the number of RMSI-PDCCH repetitions is equal to two. Consequently, reduced capability NR devices may assume that each RMSI-PDCCH is repeated twice and they can be combined. Though FIG. 8 shows that the monitoring periodicity of RMSI-PDCCH for reduced capability NR devices is the same as that for legacy NR devices, the described procedure can still be applied for the case in which a scaling factor is applied to RMSI-PDCCH monitoring periodicity.

To further reduce the power consumption of reduced capability NR devices, the RMSI-PDCCH repetitions may be transmitted in the same CCEs that are used to carry the first RMSI-PDCCH. Such assumption reduces the number of blind decoding attempts because reduced capability NR devices do blind decoding for the first RMSI-PDCCH only.

The repetitions of RMSI-PDCCH may be on the same PDCCH candidate across different monitoring occasions, so that the UE doesn't have to combine across different candidates.

The CCEs carrying the RMSI-PDCCH repetitions may be derived from the index of first CCE carrying the first RMSI-PDCCH. This is beneficial as reduced capability NR devices avoid doing blind decoding attempts for each RMSI-PDCCH repetitions and also enables RMSI-PDCCH to occupy different CCEs which provides extra diversity.

The number of repetitions of RMSI-PDCCH may be indicated as described above in addition to the other information regarding CORESET-0 and monitoring occasions for reduced capability NR devices.

The repetition of RMSI-PDCCH may create some ambiguity regarding the interpretation of some of its fields such as time domain resource assignment which point to one row of the TDRA table. Each row provides the parameter K0 and the SLIV. The parameter K0 indicates to the slot offset between the slot carrying PDCCH and the slot carrying its scheduled PDSCH. With multiple RMSI-PDCCH repetitions it is not clear to which slot the offset is applied to. Therefore, the offset may be applied with respect to the slot carrying the last repetition of RMSI-PDCCH. The offset may be applied with respect to the slot carrying the first transmission (or any other specific repetition) of RMSI-PDCCH.

If the reduced capability NR devices successfully decoded RMSI-PDCCH before the last, it may stop monitoring the additional RMSI-PDCCH repetitions. However, RMSI-PDSCH is scheduled relative to the last RMSI-PDCCH repetition, i.e., K0 is relative to the slot carrying the last RMSI-PDCCH repetition.

For the RMSI-PDSCH, a repetition-based procedure may be performed to enhance the coverage of RMSI-PDSCH. The repetitions may occur in consecutive or non-consecutive slots and even more than one repetitions may occur in a single slot, if needed.

Figure 9:
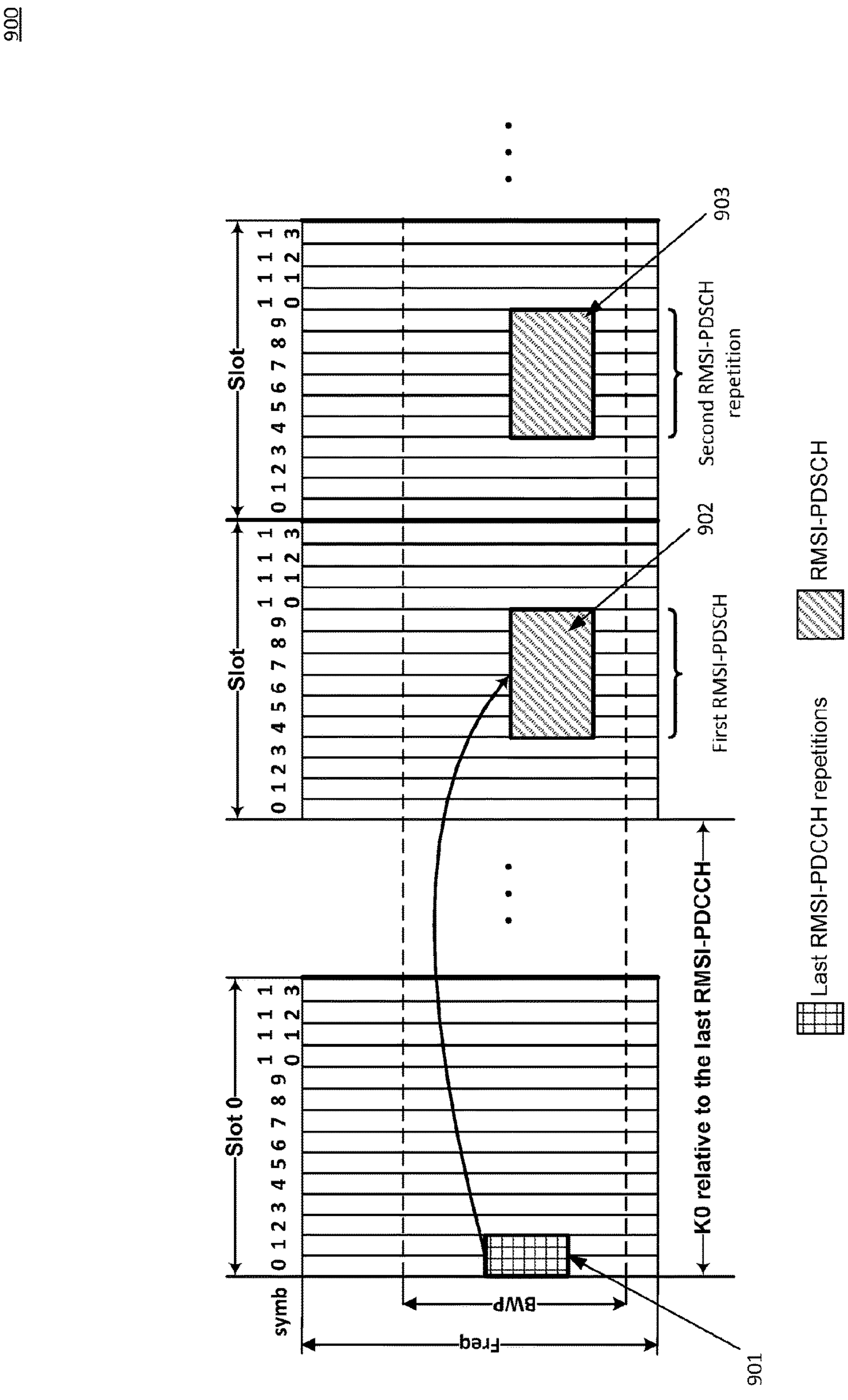
FIG. 9 shows an example of RMSI-PDSCH repetitions in consecutive slots.

FIG. 9 shows an example of RMSI-PDSCH repetitions in consecutive slots 900. FIG. 9 shows an example of RMSI-PDSCH repetitions in consecutive slots. Scheduling of first RMSI-PDSCH 901 follows the same approach as in NR Rel. 15 or Rel. 16, except the indicated K0 by time domain resource assignment field in RMSI-PDCCH is interpreted relative to the last RMSI-PDCCH repetition as described above. The remaining RMSI-PDSCH repetitions 902 and 903 may be applied to the same SLIV value in "N" consecutive slots, where "N" is the number of repetitions and details on signaling "N" are described below.

Figure 10:
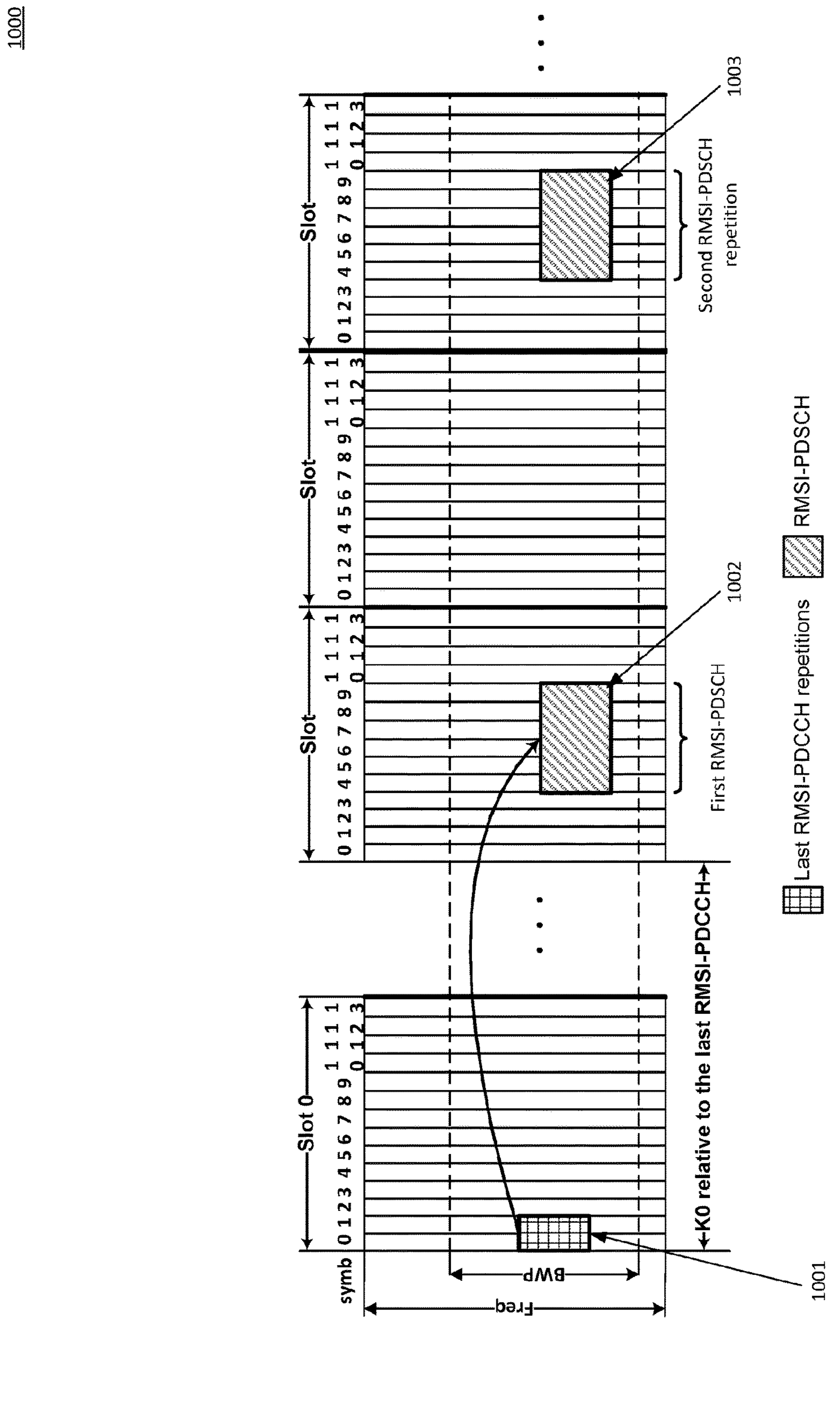
FIG. 10 shows an example of RMSI-PDSCH repetitions in non-consecutive slots.

FIG. 10 shows an example of RMSI-PDSCH repetitions in non-consecutive slots 1000. In the example of FIG. 10, the RMSI-PDSCH repetition is shown in non-consecutive slots. In this example, RMSI-PDSCH repetition takes place in every other slot starting from the slot that carries the first RMSI-PDSCH 1001. The repetition pattern value (RPV) may be equal to one-half. For when the RPV equals to one-third, then RMSI-PDSCH repetitions 1002, 1003 may take place in every third slot starting from the slot that carries the first RMSI-PDSCH 1001 and so on. More details on signaling/(pre-)configuring RPV are described below.

Figure 11:
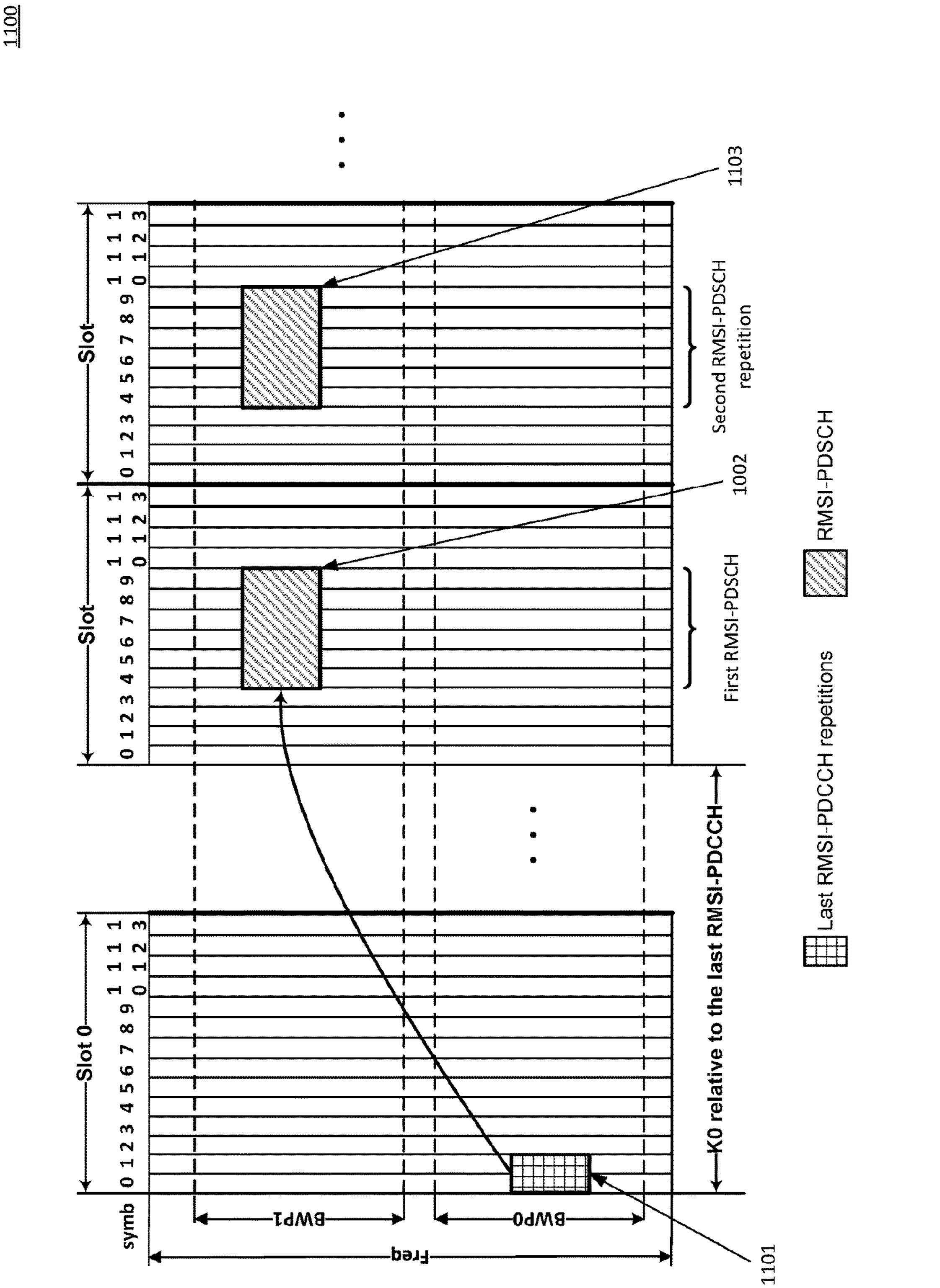
FIG. 11 shows an example of RMSI-PDSCH being transmitted in BWP1 while RMSI-PDCCH is transmitted in BWP0.

FIG. 11 shows an example of RMSI-PDSCH is transmitted in BWP1 while RMSI-PDCCH is transmitted in BWP0 1100. Also, if there are BWPs configured for reduced capability NR devices, the RMSI-PDSCH may take place in different BWP than the one carrying RMSI-PDCCH. This is beneficial to reduce the overhead on the initial/default BWP and provide more flexibly to gNB's scheduler. FIG. 11 shows an example that last RMSI-PDCCH 1101 repetition is transmitted in BWP0 while the RMSI-PDSCH repetitions 1102, 1103 are transmitted in another BWP. The repetitions procedures described above may be applied in the new BWP either the repetitions occur in consecutive or non-consecutive slots. The details on indicating the BWP are described below.

Since DCI format 1_0 with CRC scrambled by SI-RNTI, i.e., RMSI-PDCCH, has 16 reserved bits, any of following information, or any possible combination, may be conveyed to reduced capability NR devices:

The number of repetitions. For example, two bits may be used for this purpose to indicate one of pre-configured number of repetitions, provided in specs, as shown in Table 5 for example.

TABLE 5

Number of repetitions for RMSI-PDSCH

| Index | Number of RMSI-PDSCH repetitions |
|---|---|
| 0 | $N_0$ |
| 1 | $N_1$ |
| 2 | $N_2$ |
| 3 | $N_3$ |

Repetition pattern value (RPV). For example, two bits may be used to indicate the repetitions pattern as shown in Table 6.

TABLE 6

Repetition pattern value for RMSI-PDSCH

| Index | RPV value |
|---|---|
| 0 | 1 (RMSI-PDSCH repetitions are in every consecutive slot starting from the slot carries the first RMSI-PDSCH) |
| 1 | ½ (RMSI-PDSCH repetitions are in every other slot starting from the slot carries the first RMSI-PDSCH) |
| 2 | ⅓ (RMSI-PDSCH repetitions are in every third slot starting from the slot carries the first RMSI-PDSCH) |
| 3 | ¼ (RMSI-PDSCH repetitions are in every fourth slot starting from the slot carries the first RMSI-PDSCH) |

Also, the number of RMSI-PDSCH repetitions and its pattern may be jointly coded. The number of combinations depends on the desired flexibility level. Table 7 shows an example of only two bits provide both pieces of information regarding RMSI-PDSDCH.

TABLE 7

Jointly coding the number of repetitions of RMSI-PDSCH and RPV

| Index | Number of RMSI-PDSCH repetitions | RPV value |
|---|---|---|
| 0 | $N_0$ | 1 (RMSI-PDSCH repetitions are in every consecutive slot starting from the slot carries the first RMSI-PDSCH) |
| 1 | $N_1$ | ½ (RMSI-PDSCH repetitions are in every other slot starting from the slot carries the first RMSI-PDSCH) |
| 2 | $N_2$ | ⅓ (RMSI-PDSCH repetitions are in every third slot starting from the slot carries the first RMSI-PDSCH) |
| 3 | $N_3$ | ¼ (RMSI-PDSCH repetitions are in every fourth slot starting from the slot carries the first RMSI-PDSCH) |

BWP indicator following the legacy interpretation for this field.

A field to enable or disable of frequency hopping (one bit) if it is supported for RMSI-PDSCH transmitted to reduced capability NR devices.

Another field to provide the frequency offset. For example, two bits may be used for this purpose to point to one of preconfigured frequency offset as shown in Table 8.

TABLE 8

Frequency offset values to be used when frequency hopping is enabled

| Index | Frequency offset |
|---|---|
| 0 | $FO_0$ |
| 1 | $FO_1$ |
| 2 | $FO_2$ |
| 3 | $FO_3$ |

Also, enabling/disabling the frequency hopping and the offset values may be jointly coded. Table 9 shows an example of using two bits for this purpose.

TABLE 9

Jointly coding whether frequency hopping is enabled/disabled and the offset value

| Index | Frequency offset |
|---|---|
| 0 | Frequency hopping is disabled |
| 1 | $FO_1$ |
| 2 | $FO_2$ |
| 3 | $FO_3$ |

Also, one bit in the DCI to determine whether this DCI is for legacy UEs or reduced capability NR devices for scenarios where the same SI-RNTI is used.

In legacy DCI format 1_0 with CRC scrambled by SI-RNTI, there is a redundancy version field to indicate used RV of RMSI-PDSCH scheduled by the corresponding RMSI-PDCCH. Therefore, the RV field may still provide the RV of the first RMSI-PDSCH. Then the RV of the remaining RMSI-PDSCH is cycled starting from the indicated redundancy version in the DCI according to the sequence 0-2-3-1, for example.

For the coverage enhancement of either RMSI-PDCCH or RMSI-PDSCH, any of the aforementioned parameters or any of their combinations may be preconfigured and specified, i.e., provided in the specs. This may be beneficial to reduce the signaling overhead.

Also, instead of signaling the number of repetitions of RMSI-PDCCH and/or RMSI-PDCSH for reduced capability NR devices, the RMSI-PDCCH and/or RMSI-PDSCH may be fixed over certain preconfigured duration, provided in the specs, e.g. 80 ms. This enables reduced capability NR devices to assume that content of RMSI-PDCCH and/or RMSI-PDSCH are fixed and different repetitions of RMSI-PDCCH and/or RMSI-PDSCH can be combined, respectively. The RMSI-PDSCH scheduling offset may be based on the timing of the last RMSI-PDCCH within this period. The RMSI-PDCCH in one 80 ms period may schedule the RMSI-PDSCH, including its repetitions, in the subsequent 80 ms period. The monitoring occasions may follow the described procedures above.

Enhancing the coverage of RMSI-PDCCH by enhancing the coding rate is described herein. Basically, the aim may be to reduce the number of information bit in the DCI scheduling RMSI-PDSCH.

In DCI format 1_0 with CRC scrambled by SI-RNTI, the frequency domain resource assignment field has $$\lceil \log_2(N_{RB}^{DL,BWP}(N_{RB}^{DL,BWP}+1)/2) \rceil$$

bits, where $$N_{RB}^{DL,BWP}$$

is the number of PRB in the initial DL BWP to provide resource allocation type 1, the start and length of PRBs for PDSCH. For example, if the maximum bandwidth of BWP for reduced capability NR devices is 24 PRBs, then frequency domain resource assignment field has 9 bits. Such flexibility may not be needed for reduced capability NR devices in some cases because the size of PDSCH may be predictable to certain extent and number of needed PRBs may be fixed or almost fixed.

A limited number of possible lengths of PRBs may be used. It may be a single length of PRB, $L_{PRB}$, provided in the specs, for example it may be equal to the initial active DL BWP, e.g. 24 PRBs. In this case, only $$\lceil \log_2(N_{RB}^{DL,BWP} - L_{PRB}) \rceil$$

bits are needed to indicate just the first PRB in PDSCH. In our example, of BWP of 24 PRB and $L_{PRB}$=6, only 5 bits are needed instead of 9 bits without such enhancement.

Figure 12:
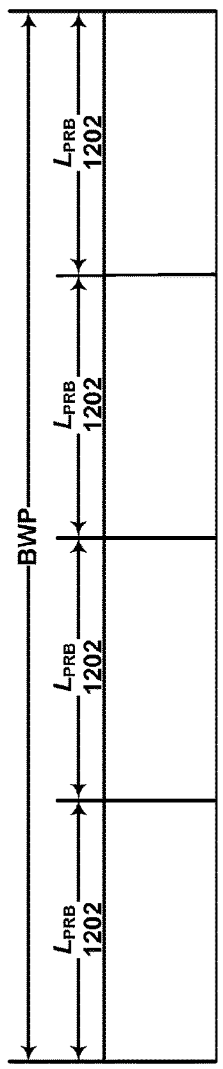
FIG. 12 shows an example of a single group of $L_{PRB}$ being selected.

FIG. 12 shows an example of a single group of $L_{PRB}$ is selected 1200. The PDSCH may be allocated for one of $L_{PRB}$ PRBs groups 1202, as shown in FIG. 12 for example, and only $$\lceil \log_2(N_{RB}^{DL,BWP} - L_{PRB}) \rceil.$$

Therefore, with BWP 1201 of 24 PRBs and $L_{PRB}$=6, only 2 bits are needed for frequency domain resource assignment field in the DCI.

Figure 13:
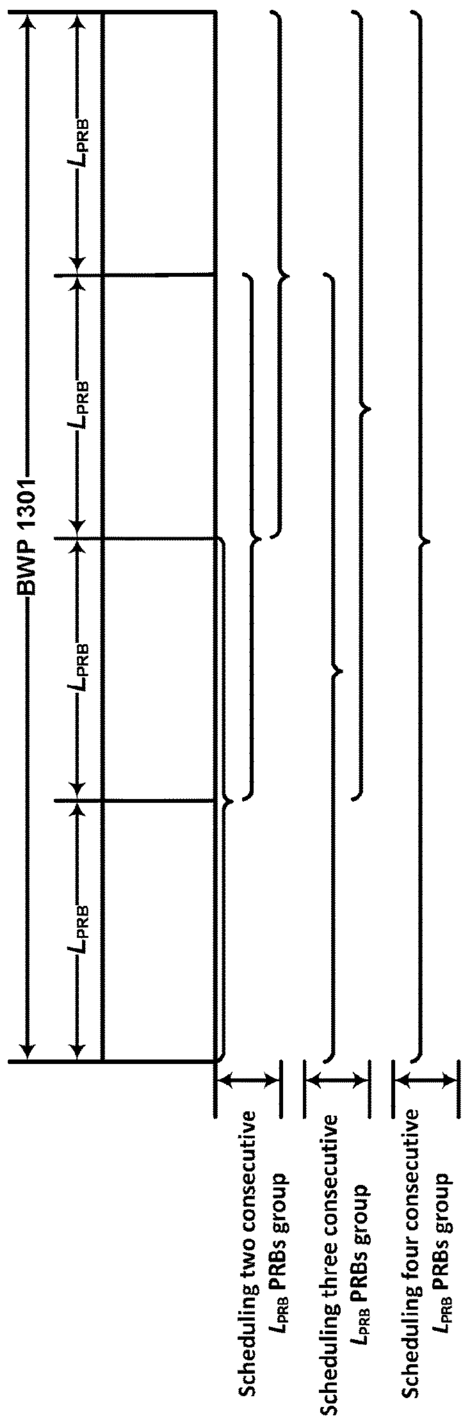
FIG. 13 shows an example of consecutive groups of $L_{PRB}$ being selected.

FIG. 13 shows an example of consecutive groups of $L_{PRB}$ being selected 1300. Consecutive $L_{PRB}$ PRBs groups 1302 may be allocated to provide further scheduling flexibility as shown in FIG. 13 for example. Therefore, in the example of BWP 1301 of 24 PRBs and $L_{PRB}$=6, only $\lceil \log_2(4+3+2+1) \rceil$=4 bits are needed for frequency domain resource assignment field in the DCI.

In DCI format 1_0 with CRC scrambled by SI-RNTI, there are 5 bits reserved for modulation and coding scheme. Due to limited capability of reduced capability NR devices, it is less likely to use high modulation order, e.g. 64 QAM. Therefore, it may be beneficial to save some of those bits in the DCI and to use up to 16 QAM only. In this case, 4 bits are needed for MCS. Further reduction of the modulation and coding scheme field may be achieved by restricting the possible MCS values for reduced capability NR devices.

Solutions for Msg1 in 4-step RACH and MsgA in 2-step RACH to address the issues in problem statement 2 are described herein. Enhancing the coverage of Msg1 in 4-step RACH, i.e., preamble transmission is described herein. Reduced capability NR devices may repeat the transmitted preamble to achieve better coverage. The more the preamble is repeated, the more the coverage can be enhanced. The first step is to determine the needed coverage enhancement level.

For MTC-UEs, there are four coverage enhancement levels and one of them is picked-up by MTC-UE based on measured cell-specific reference signals (CRS). Therefore, for reduced capability NR devices, the same concept may be applied where particular number of coverage enhancement levels, e.g. four or less coverage enhancement levels, and associate each one with certain repetitions configurations, e.g. the number of repetitions. Since there is no CRS-like in NR, the following alternatives may handle with this challenge.

Reduced capability NR devices may use one or combinations of the measurement metrics such as RSRP and/or RSRQ and/or RSSI and/or CQI, etc. based on the selected SSB to perform initial access to determine the needed coverage enhancement levels. Also, measuring DMRS of PBCH and/or RMSI-PDCCH and/or RMSI-PDSCH may be beneficial to derive one of the aforementioned metrics in addition to other ones such as hypothetical BLER.

The SSB may be associated with preconfigured CSI-RS, i.e., the parameters needed to monitor this CSI-RS is specified such that UEs in idle states are able to receive it. One or any combinations of the aforementioned metrics can be obtained from this CSI-RS and then mapped to particular coverage enhancement level.

Reduced capability NR devices may use predefined table, provided in the specs, to identify the needed coverage enhancement level. Table 10 shows an example of mapping the measured RSRP to particular coverage enhancement level. Each level may determine the repetition configurations for the preamble transmission, such as the number of repetitions.

TABLE 10 mapping the measured RSRP to coverage enhancement level

| Measured RSRP | Coverage enhancement level |
|---|---|
| $\beta_0 \le$ RSRP | Level 0 |
| $\beta_1 \le$ RSRP < $\beta_0$ | Level 1 |
| $\beta_2 \le$ RSRP < $\beta_1$ | Level 2 |
| RSRP < $\beta_2$ | Level 3 |

Rather than using a predefined table, to provide gNB with more flexibility, the thresholds on RSRP, i.e., $\beta_0$, $\beta_1$ and $\beta_2$, may be signaled through high layer signaling in system information block1 (SIB1) as part of RACH-ConfigCommon, for example.

For the preamble transmission, its coverage may be enhanced by repetition. In contrast with the preamble repetition approach for MTC-UE which occurs in consecutive subframes, such approach cannot be applied in NR because consecutive RACH occasions (ROs) may be potentially associated with different SSB(s). Practically, there may only be a single RO in LTE system and if repetition is needed for MTC-UE, it occurs in the consecutive subframes starting from the one that carrier RO. On the other hand, in NR there may be multiple ROs and they are possible associated with different SSBs, therefore if any preamble is repeated in improper ROs, it most likely is not received by gNB. The reason is that the gNB may adjust its receive beam(s) for different ROs based on their associated SSB, e.g. gNB may use the same spatial domain filter used for SSB transmission to receive the preambles transmitted from RO(s) associated with this SSB. Therefore, the following alternatives may address this challenge.

In legacy NR, the association period which is defined as the period in which all SSBs are mapped at least once to ROs within this period. Based on the number of SSBs, ROs, the number of SSBs associated with the same RO, etc. some ROs may be left not utilized. In other words, some ROs within the association period may not be associated with any SSB and not used for PRACH transmission.

Figure 14:
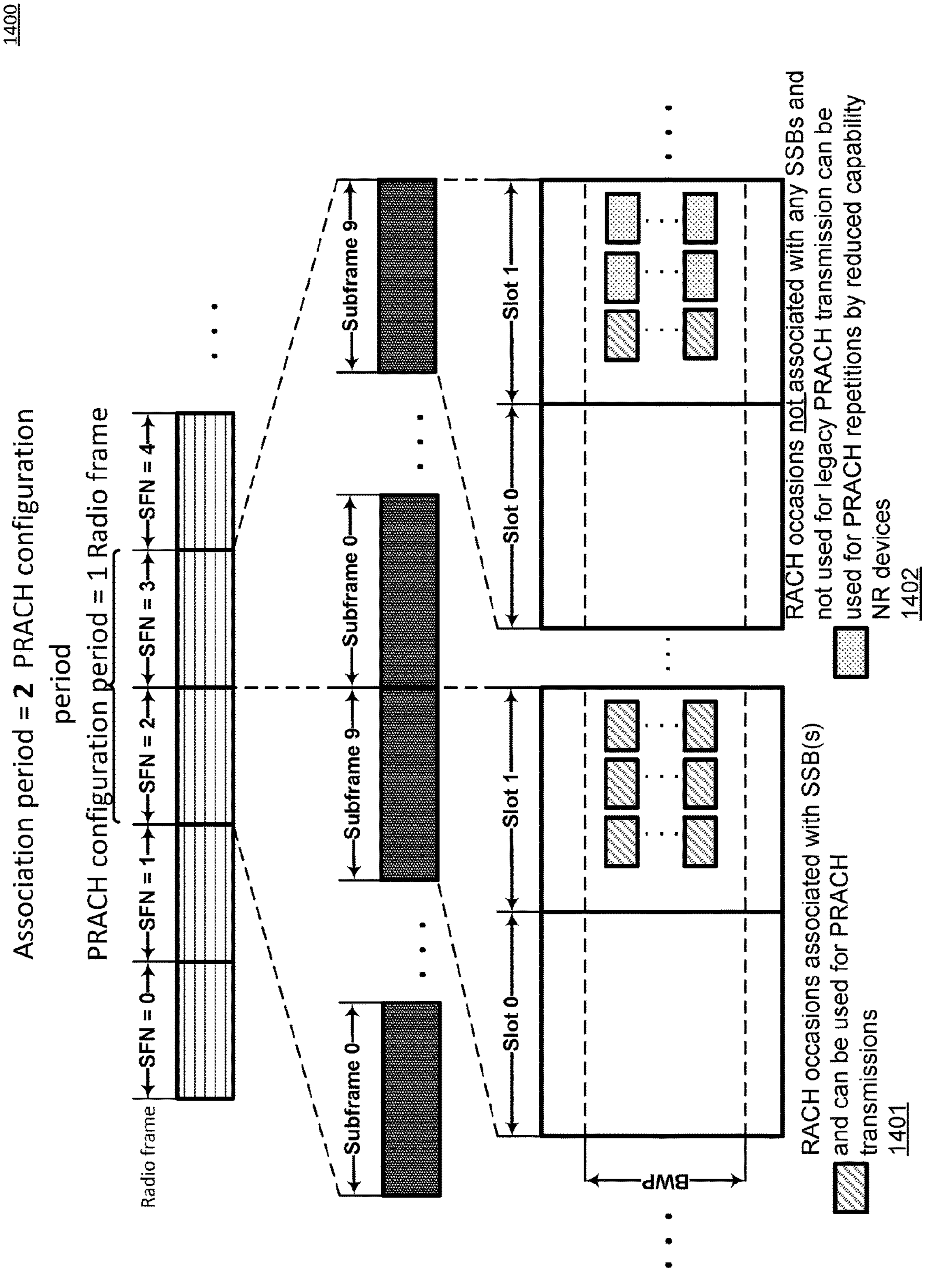
FIG. 14 shows an example of exploitation of the unused RO based on legacy PRACH configurations to carry the repetitions of PRACH transmission.

FIG. 14 shows an example of exploitation of the unused RO based on legacy PRACH configurations to carry the repetitions of PRACH transmission 1400. In the example of FIG. 14, the higher-layer parameter prach-ConfigurationIndex is set to 78. In this example, the association period is assumed to equal to two PRACH configuration periods which is one radio frame. Based on legacy PRACH configurations, last few ROs may not be associated with any SSBs and are not used for PRACH transmission 1402. Therefore, they may be used to carry the repetitions of PRACH.

Specifically, reduced capability NR devices may behave similarly to legacy UEs for the first transmission of the PRACH. In other words, based on the selected SSB, reduced capability NR devices choose one RO among those associated with the selected SSB and pick of preamble out of those allocated for the selected SSB in the selected RO to transmit 1401. For the subsequent repetitions of the PRACH, the unused ROs may be based on legacy NR RACH configurations. Reduced capability NR devices may start the first transmission of PRACH in the unused ROs and continue using them for the subsequent transmissions.

Mapping SSBs on those unused ROs and which preambles may be used are described herein. All or some of SSBs indicated by ssb-PositionsInBurst in SIB1 or in ServingCellConfigCommon are remapped to the unused ROs. To this end, a new high layer parameter ssb-perRACH-Occasion-RedCap may be used to indicate how SSBs are mapped to those unused ROs when deploying legacy RACH configurations. For the preamble IDs, reduced capability NR devices may use the same preamble used in the first transmission, i.e., no extra preambles are allocated in those used ROs. If ssb-perRACH-Occasion-RedCap is not configured, then reduced capability NR devices may use the legacy ssb-perRACH-OccasionAndCB-PreamblesPerSSB to derive how many SSBs are mapped per the unused ROs when deploying legacy RACH configurations.

SSBs may be mapped to those unused or leftover ROs following the legacy mapping rules. Since the number of unused ROs when deploying the legacy RACH configurations is expected to be small and subsequently not all SSBs can be mapped to one of those ROs, then reduced capability NR devices may not use the unmapped SSBs for initial access procedure.

In the figures described herein showing SSBs, the SSB index associated with an SSB refers to which SSB is associated with its labeled RO.

Figure 15:
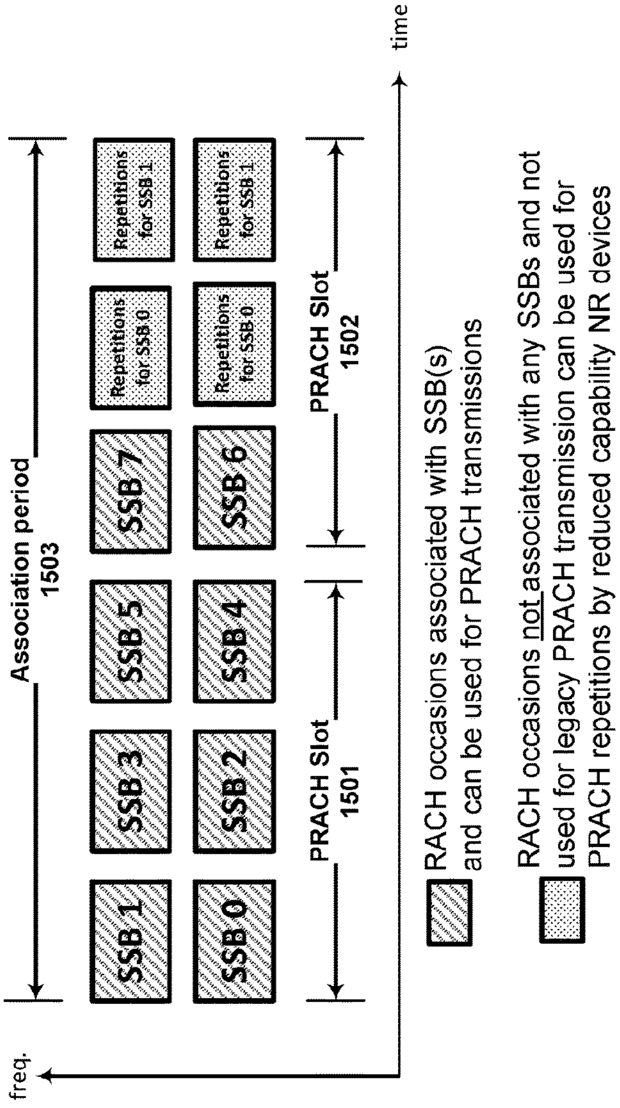
FIG. 15 shows an example of mapping the SSB to ROs and exploiting the unused RO based on the legacy PRACH configurations to carry PRACH repetitions.

FIG. 15 shows an example of mapping the SSB to ROs and exploiting the unused RO based on the legacy PRACH configurations to carry PRACH repetitions 1500. In the example of FIG. 15, each PRACH slot 1501, 1502 has three ROs and two FDMed ROs. It is assumed the SSB is mapped once to ROs and total number of SSBs is 8. Therefore, based on the legacy PRACH configurations, the first 8 ROs in the association period 1503 are mapped to SSBs and there are four unused ROs at the end of the association period. Those unused ROs may carry PRACH repetitions for reduced capability NR devices. By setting ssb-perRACH-Occasion-RedCap to one-half, the repetitions of PRACH associated with SSB 0 and SSB 1 may occur in two ROs as shown in FIG. 15. Based on this example, SSB 2 through SSB 7 may not be used by reduced capability NR devices.

Exploiting the unused RO based on legacy PRACH configurations in one association period may not be enough to provide the desired coverage enhancement. Therefore, exploiting the unused ROs based on legacy PRACH configurations in multiple consecutive or non-consecutive association periods. Also, if the selected SSB is associated with multiple unused ROs based on legacy PRACH configuration in the association period, reduced capability NR devices may transmit PRACH in some or all of those ROs.

Figure 16:
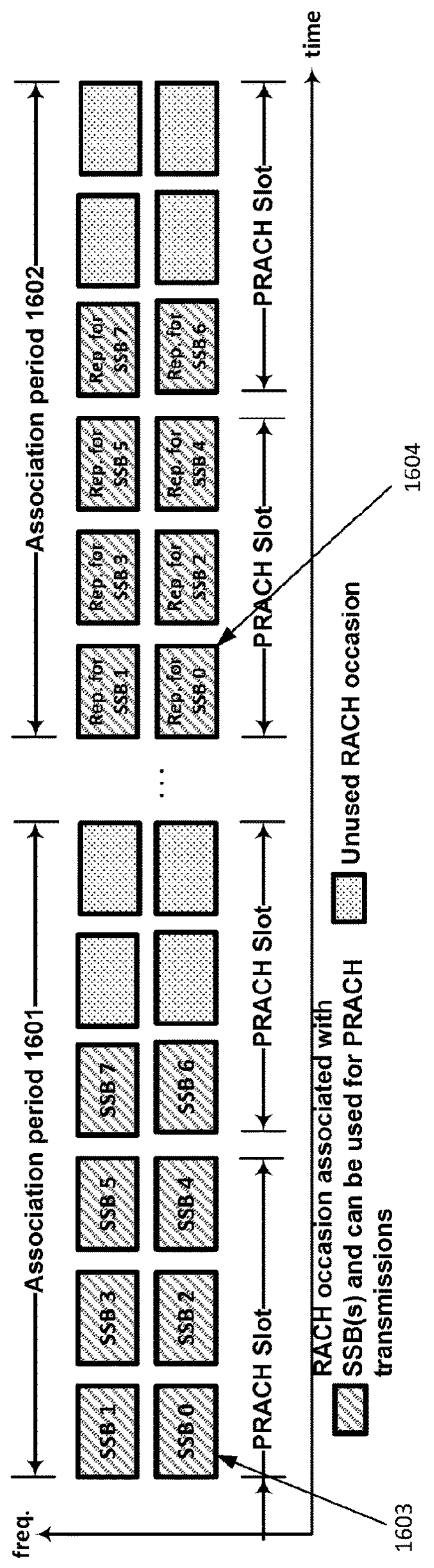
FIG. 16 shows an example of repeating a PRACH transmission in the same RO across different association period.

FIG. 16 shows an example of repeating a PRACH transmission in the same RO across different association periods 1600. Alternatively, reduced capability NR devices may transmit PRACH repetitions across different consecutive or non-consecutive association periods 1601, 1602. For example, if a reduced capability NR device selects RO 1603 associated with SSB 0 to transmit the PRACH in particular association period 1601, the same RO 1604 in the next association period 1602 may be used to carry the repetition of PRACH. The same preamble used for the first PRACH transmission may be used the subsequent PRACH repetitions. The ROs may be labeled in the second association period 1602 in FIG. 16 as ROs to carry the repetitions of previously transmitted PRACH, a new PRACH may still start in this association period. Reduced capability NR devices may transmit PRACH and its subsequent repetitions using the same spatial filter used to receive SSBs associated with the selected RO, and vice versa for gNB.

Figure 17:
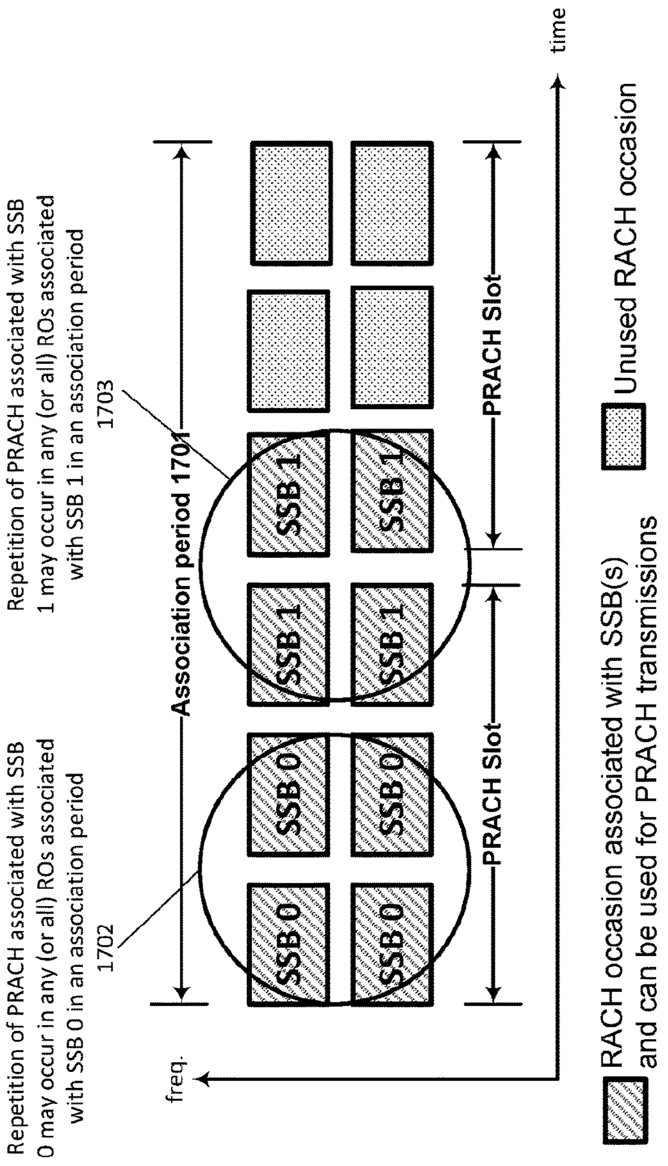
FIG. 17 shows an example of repeating a PRACH transmission in multiple ROs in the same association period.

FIG. 17 shows an example of repeating a PRACH transmission in multiple ROs in the same association period 1700. As yet another method is that if the selected SSB is mapped to multiple ROs in an association period 1701, then these ROs can be used to carry the repetitions of PRACH transmission. FIG. 17 shows an example of the same SSB 1702, 1703 is associated with four ROs and two SSBs are configured in ssb-PositionsInBurst in SIB1 or in ServingCellConfigCommon. In this case, if a reduced capability NR device selects the first RO associated with SSB 0 1702 to transmit PRACH, then it may repeat PRACH in the second and/or third and/or fourth ROs because they are also associated with the same SSB 1702.

Reduced capability NR devices may select the ROs and/or the association periods for the first PRACH transmission and the subsequent repetitions based on certain rules. For example, the repetitions of PRACH may occur in ROs that occupy the same frequency resources (PRBs) as the RO used for the transmission of the first PRACH. Or, the repetitions of PRACH may occur in ROs that has the maximum overlap in terms of frequency resources (PRBs) with the RO used for the transmission of the first PRACH.

Any of the aforementioned solutions may be combined in any way to provide more options to transmit the repetition of PRACH.

Figure 18:
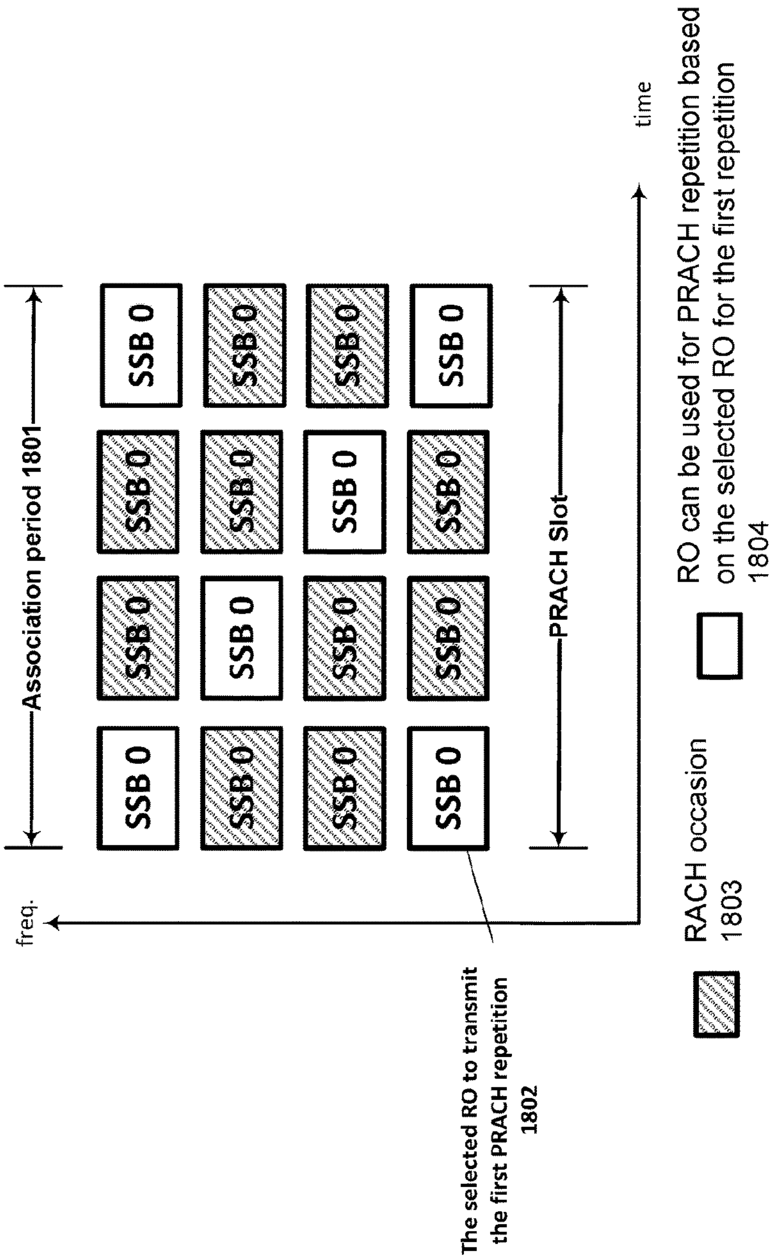
FIG. 18 shows an example of applying a pattern in selecting which RO can be used to carry the PRACH repetitions.

FIG. 18 shows an example of applying a pattern in selecting which RO can be used to carry the PRACH repetitions 1800. Repetition across different association period and/or across different ROs in the same SSB-to-PRACH association period 1801 may occur according to certain pattern. FIG. 18 shows an example of only one SSB is configured in ssb-PositionsInBurst in SIB1 or in ServingCellConfigCommon and its mapped to 16 RO within the association period 1801. The PRACH repetition is transmitted every third RO starting from the RO carrying the first PRACH repetition 1802. In this example, reduced capability NR device selects the RO that occupies the lowest frequency RBs and earliest OFDM symbols to transmit the first PRACH, then every third RO 1804 can carry the PRACH repetitions. The other ROs 1803 may not be used to carry the repetitions of PRACH if the RO 1802 is selected for the first transmission. Though FIG. 18 shows that pattern is applied on ROs within the association period 1801, it may also be applied for repetitions across different association periods and also may be applied on the unused ROs based on a legacy RACH configuration.

This pattern may be provided in terms of a factor such as 1 (every possible RO and/or association period can be used to carry PRACH repetition starting from the one that carried the first PRACH repetition), one-half (every other possible RO and/or association period can be used to carry PRACH repetition starting from the one that carried the first PRACH repetition) and so on. Also, the pattern may be provided in the form of a bitmap. For example, the bitmap 1001001001001001 corresponds to the pattern in FIG. 18. As mentioned above, this pattern may be applied for repetitions on ROs within association period and/or repetitions on RO across different association periods. For example, each bit may correspond to an association period not just a single RO. A high layer signaling may be used to convey this information, e.g. RRC parameter such as repetition_pattern, which may be signaled in SIB1 as part of RACH-Config-Common. Also, such parameters may be preconfigured, provided in the specs.

Furthermore, the needed coverage enhancement level may be associated with the repetition pattern, not only with the number of repetitions. As mentioned above, each coverage enhancement level may be associated with the repetition configurations which may include the number of repetitions, and the repetition pattern as well. Table 11 shows an example of such configuration. This table may be preconfigured, provided in the specs, or it may be provided by high layer signaling to indicate thresholds on RSRP, i.e., $\beta_0$, $\beta_1$ and $\beta_2$, and/or the repetition pattern for each coverage enhancement level.

TABLE 11

Associating the measured RSRP with the coverage enhancement level and repetition pattern

| Measured RSRP | Coverage enhancement level | Repetition pattern |
|---|---|---|
| $\beta_0 \leq$ RSRP | Level 0 | 1 |
| $\beta_1 \leq$ RSRP < $\beta_0$ | Level 1 | One-half |
| $\beta_2 \leq$ RSRP < $\beta_1$ | Level 2 | One-third |
| RSRP < $\beta_2$ | Level 3 | One-fourth |

If ROs are shared between legacy UEs and reduced capability NR devices and/or shared among reduced capability NR devices using different coverage enhancement level, gNB needs to distinguish which UE sent which PRACH. Therefore, the gNB may allocate different preambles to different UEs or coverage enhancement level levels or different UE categories/types. For example, assuming coverage enhancement level 0 needs less repetitions than coverage enhancement level 3, devices may select preambles corresponding to the needed coverage enhancement level and, hence, gNB can expect how many repetitions may be transmitted from this preamble. Also, differentiating between different cases (legacy UEs versus reduced capability NR devices and/or reduced capability NR devices in need of different coverage enhancement levels) is also beneficial in determining when Msg2 can be transmitted.

Figure 19:
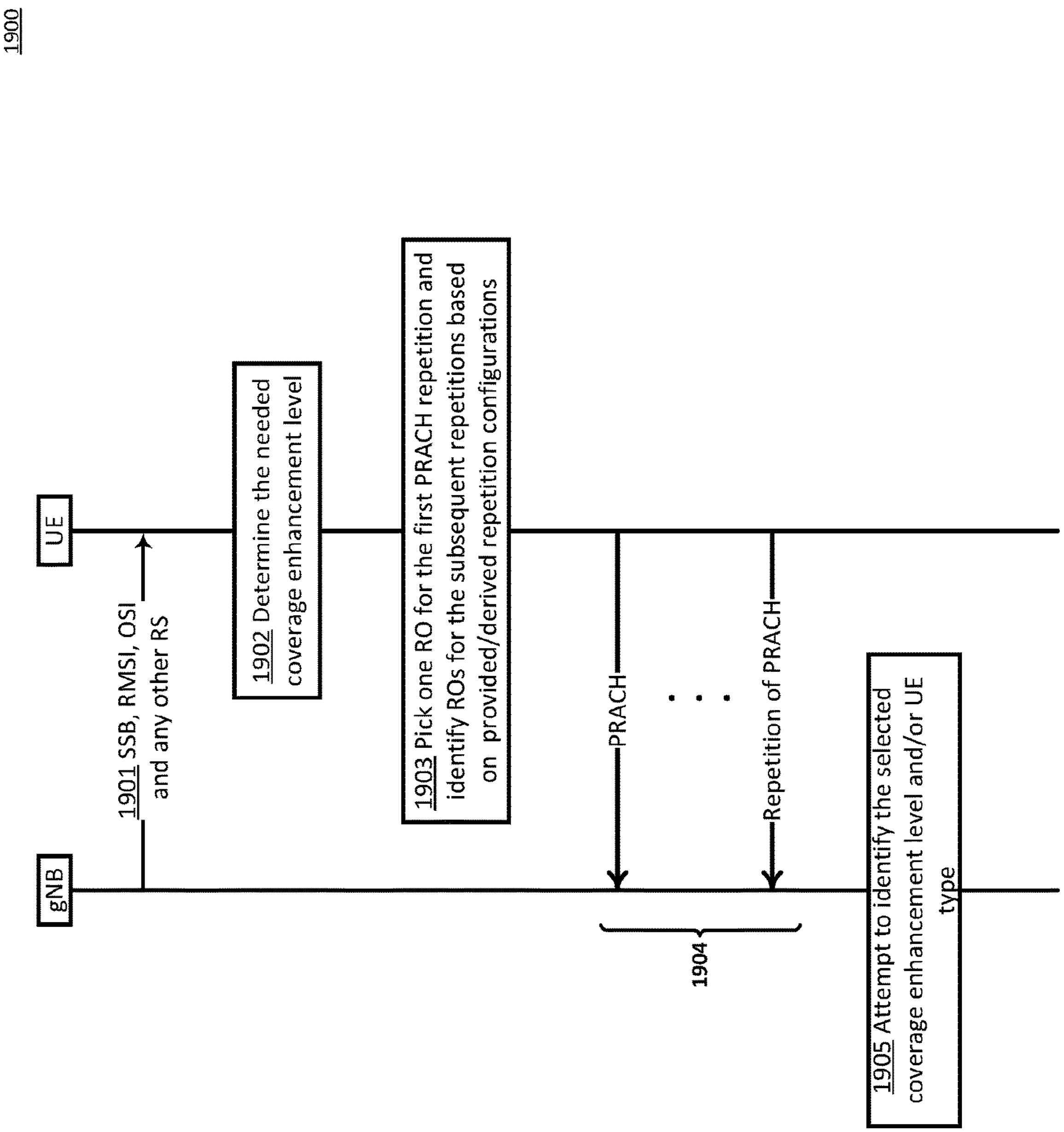
FIG. 19 shows an example procedure for transmitting the PRACH by reduced capability NR devices.

FIG. 19 shows an example procedure for transmitting the PRACH by reduced capability NR devices 1900. In the example of FIG. 19, a high-level description of the aforementioned procedures is shown. Specifically, in step 1901, the gNB may transmit SSB, RMSI, OSI and any other associated reference signals that may be used by the UE to determine the needed coverage enhancement level. Based the received signals and the required coverage enhancement level, in step 1902, the reduced capability NR device may determine the repetitions configurations such as the number of repetitions and/or the repetition pattern. Then in step 1903, one RO and/or preamble may be selected for the first transmission of the PRACH and the location of the remaining ROs to carry the PRACH repetition. Then in step 1904, the UE may start the transmission of PRACH and its repetitions. To determine the selected coverage enhancement level, in step 1905, the gNB may attempt to detect PRACH and its repetitions using different hypothesis with different RO combinations and/or preambles.

To further enhance coverage of PRACH transmission, frequency hopping may be used for PRACH transmission. This may be beneficial when all ROs carrying the PRACH transmission occupy the same frequency resources. The frequency hopping may occur after $N_{rep\_hop}$ PRACH repetitions and this parameter may be signaled by high layer signaling such as in SIB1 as part of RACH-ConfigCommon, for example. Or it may be preconfigured, provided in the specs.

The frequency offset may be relative to the beginning of an RO that would be used if frequency hopping is disabled (or any other reference RB) and it may be provided by high layer signaling, RRC parameter freq_offset_PRACH in SIB1 as part of RACH-ConfigCommon for example. If not provided, then reduced capability NR devices may assume that frequency hopping is disabled. Alternatively, a dedicated high layer signalling may be used to indicate whether frequency hopping for PRACH is enabled or disabled.

Inter-repetition hopping may be performed. For example, the start RB of the $i^{th}$ PRACH repetition may be given by $$RB^{i}_{actual} = \begin{cases} RB_{RO} & \lfloor i/N_{rep\_hop} \rfloor \bmod 2 = 0 \\ (RB_{RO} + RB_{offset}) \bmod N^{size}_{BWP} & \lfloor i/N_{rep\_hop} \rfloor \bmod 2 = 1 \end{cases}$$

where $RB_{RO}$ is the first RB in the corresponding RO that would be used if frequency hopping is disabled, $RB_{offset}$ is the frequency offset value as described above and $$N^{size}_{BWP}$$

is the number of RBs in the BWP used for PRACH transmission, if not configured then $$N^{size}_{BWP}$$

is set to the number of PRBs in the used carrier. As mentioned above, i is the repetition index which starts from zero for the first PRACH repetition and is incremented by 1 for each subsequent repetition.

Figure 20:
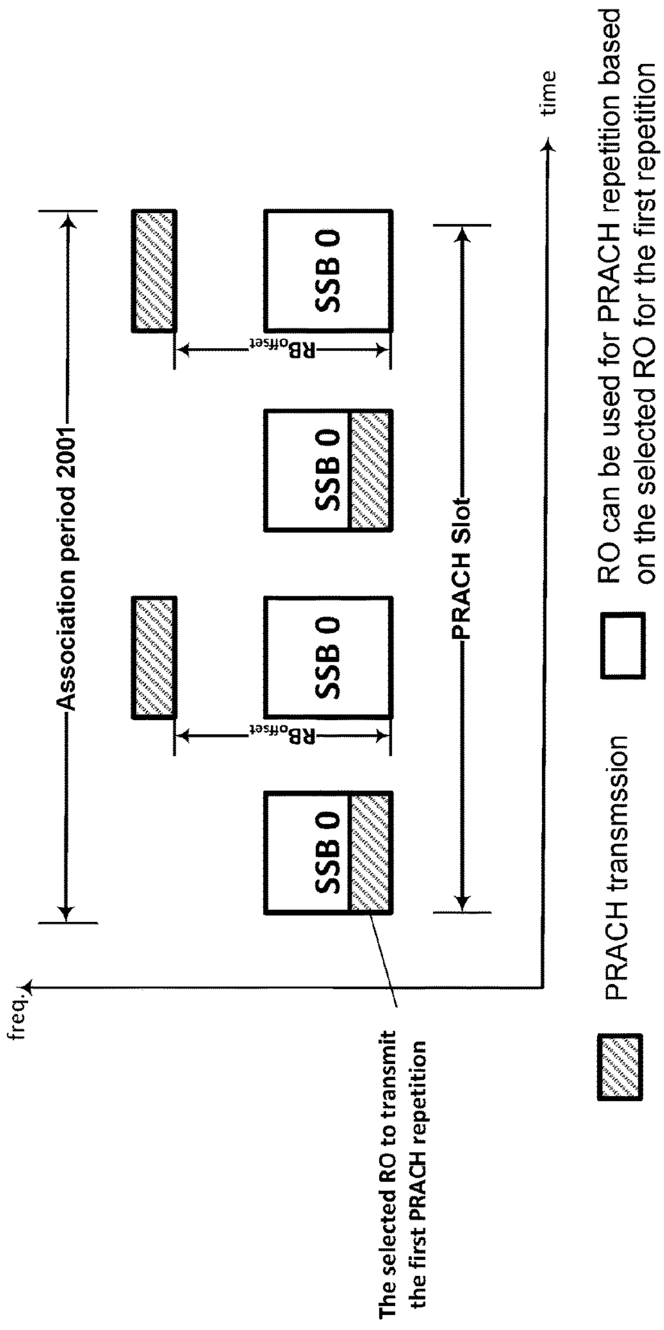
FIG. 20 shows an example of frequency hopping for the PRACH across different repetitions.

FIG. 20 shows an example of frequency hopping for the PRACH across different repetitions 2000. In the example of FIG. 20, four ROs are configured within the association period 2001, and only one SSB is configured in ssb-PositionsInBurst in SIB1 or in ServingCellConfigCommon and mapped to all these four ROs. In this example, the hopping is assumed to occur every repetition as shown in the figure and $RB_{offset}$ is applied relative to the first RB in RO if frequency hopping is disabled. Also, other frequency hopping procedures may be applied such as inter-slot frequency hopping where the hopping occurs every $n_{FO\_slot}$ slot, for example.

Enhancing the coverage of MsgA transmissions in 2-step RACH is described herein. Specifically, the two parts of MsgA are subject to the same enhancement level wherein the enhancements parameters are selected to provide coverage enhancements to both preamble transmissions as well as PUSH transmissions. In another embodiment, different parts of the MsgA, i.e. the preamble and the PUSCH, are transmitted with different enhancement levels.

Since MsgA has two parts: the PRACH preamble and PUSCH, and each one may have different coverage requirements, in this section, reduced capability NR devices/gNB may identify the needed coverage level.

Reduced capability NR devices may use one or combinations of the measurement metrics such as RSRP and/or RSRQ and/or RSSI and/or CQI, etc. based on the selected SSB to perform initial access to determine the needed coverage enhancement levels of both MsgA-PRACH and MsgA-PUSCH. Also, measuring DMRS of PBCH and/or RMSI-PDCCH and/or RMSI-PDSCH may be beneficial to derive one of the aforementioned metrics in addition to other ones such as hypothetical BLER.

Reduced capability NR device may select a particular SSB, for cell acquisition for example, based on the what coverage enhancement level may be required for the transmission of the subsequent UL/DL signals and channels during the initial access, for example.

An SSB may be associated with a preconfigured CSI-RS, i.e., and the parameters needed to monitor this CSI-RS are specified such that UEs in RRC_idle/inactive state are able to receive it.

Reduced capability NR devices may use predefined tables, provided in the specs, to identify the needed coverage enhancement level for both MsgA-PRACH and MsgA-PUSCH. For example, the reduced capability NR device/gNB may use the specified RSRP thresholds in Table 13 and Table 14 to determine the needed coverage enhancement level for MsgA-PRACH and MsgA-PUSCH, respectively. Though Table 13 and Table 14 show the same number of coverage levels, e.g. four coverage levels, in general MsgA-PRACH and MsgA-PUSCH may have different number of coverage levels. Each coverage level may determine some parameters of the applied coverage recovery procedures, as is described below.

TABLE 13 mapping the measured RSRP to coverage enhancement level for MsgA-PRACH

| Measured RSRP | Coverage enhancement level for MsgA-PRACH |
|---|---|
| $\beta_0 \le$ RSRP | Level 0 |
| $\beta_1 \le$ RSRP < $\beta_0$ | Level 1 |
| $\beta_2 \le$ RSRP < $\beta_1$ | Level 2 |
| RSRP < $\beta_2$ | Level 3 |

TABLE 14 mapping the measured RSRP to coverage enhancement level for MsgA-PUSCH

| Measured RSRP | Coverage enhancement level for MsgA-PUSCH |
|---|---|
| $\alpha_0 \le$ RSRP | Level 0 |
| $\alpha_1 \le$ RSRP < $\alpha_0$ | Level 1 |
| $\alpha_2 \le$ RSRP < $\alpha_1$ | Level 2 |
| RSRP < $\alpha_2$ | Level 3 |

Rather than using a predefined table, reduced capability NR device may assume that the RSRP thresholds for MsgA-PRACH, i.e., $\beta_0$, $\beta_1$ and $\beta_2$, may be as same as RSRP thresholds for PRACH in 4-step RACH. Moreover, the gNB may signal them to reduced capability NR device through high layer signaling in system information block1 (SIB1) as part of RACH-ConfigCommon, for example.

Alternatively, the RSRP thresholds for 2-step MsgA-PRACH may differ from those for PRACH in 4-step RACH. In this case, the gNB may indicate the thresholds values for 2-step MsgA-PRACH to reduced capability NR device through high layer signaling as part of RACH-ConfigCommonTwoStepRA or RACH-ConfigGenericTwoStepRA. In case of the absence of such configurations, reduced capability NR device may apply the same threshold levels used for PRACH in 4-step RACH.

It is also proposed that the gNB may signal to the reduced capability NR device the RSRP thresholds, i.e., the gNB may signal to the UE, the parameters α0, α1 and α2, through high layer signaling. The gNB may signal such thresholds to the reduced capability NR device as part of MsgA-PUSCH-Config for example.

Since gNB can control the MCS index of MsgA-PUSCH, the required coverage level for MsgA-PUSCH may vary from one MCS index to another. If gNB signals the RSRP thresholds to the reduced capability NR device, then the process may be transparent to the reduced capability NR device and gNB ensures that the indicated RSRP thresholds are appropriate for the indicated MCS index. However, if the RSRP thresholds are specified without associating it with the indicated MCS index for MsgA-PUSCH, gNB may not receive MsgA-PUSCH at the desired strength such as SINR level, for example.

To this end, different RSRP threshold sets may be specified for different MsgA-PUSCH MCS indices. For example, for MCS indices 0-3, a reduced capability NR device may apply the RSRP threshold set $\{\alpha_0, \alpha_1, \alpha_2\}$, for MCS indices 4-7, a reduced capability NR device may apply the RSRP threshold set $\{\alpha_0', \alpha_1', \alpha_2'\}$, for MCS indices 8-11, a reduced capability NR device may apply the RSRP threshold set $\{\alpha_0'', \alpha_1'', \alpha_2''\}$, and so on.

Alternatively, only one set of RSRP thresholds may be specified and correspond to a particular reference MCS index, e.g. MCS=0. Then, based on the MCS index for a MsgA-PUSCH transmission by the gNB, a reduced capability NR device may apply particular rules to derive the appropriate coverage level based on the indicated MCS. For example, a reduced capability NR device may scale the measured RSRP before applying the specified RSRP thresholds. The scaling factor may be a function of the difference between the reference MCS index and the indicated MCS index by gNB.

As yet another example, reduced capability NR devices may use the measured RSRP to derive the required coverage level for MsgA-PRACH by comparing it to one or more prespecified or configured threshold(s). Then reduced capability NR devices may apply particular rules to figure out the needed coverage level for MsgA-PUSCH. For example, the reduced capability NR device may apply the same coverage level used for MsgA-PRACH to be used for MsgA-PUSCH. In another example, a reduced capability NR device may assume that MsgA-PUSCH needs one higher coverage level than the derived coverage level of MsgA-PRACH. For example, if the reduced capability NR device measures RSRP level that indicates the need of using coverage enhancement level 1 for MsgA-PRACH, then the reduced capability NR device may use coverage enhancement level 2 for MsgA-PUSCH.

The relation between the coverage enhancement level of MsgA-PRACH and MsgA-PUSCH may depend on the indicated MCS index of MsgA-PUSCH. For example, the reduced capability NR device may assume that the needed coverage enhancement level for MsgA-PUSCH=coverage level of MsgA-PRACH+Offset. For MCS indices 0-3, the Offset=0, i.e., the reduced capability NR device use coverage level of MsgA-PRACH for the transmission of MsgA-PUSCH. For MCS indices 4-7, the Offset=1, i.e., if reduced capability NR device uses coverage enhancement level 1 for MsgA-PRACH, then UE may apply coverage enhancement level 2 for MsgA-PUSCH, and so on for the remaining MCS indices.

Though in our previous examples, RSRP is used to derive the applied coverage enhancement level, other metrics may be used as well, In NR Rel. 16, a UE selects between conducting 4-step RACH and 2-step RACH based on RSRP measurements. Specifically, the UE selects 2-step RACH to perform random access based on a threshold configured by msgA-RSRP-Threshold or msgA-RSRP-ThresholdSUL. If the measured RSRP is greater than this threshold, 2-step RACH is selected.

This threshold may be part of the required coverage enhancement of MsgA-PUSCH. Specifically, if the reduced capability NR device identifies the need for a coverage enhancement level for MsgA-PUSCH that requires high compensation (for example, large repetitions, high power booting, etc.), reduced capability NR devices may select 4-step RACH instead of 2-step RACH. This is advantageous because the gNB has more control on how to schedule Msg3 such that it is more appropriate to the situation of the reduced capability NR device. For example, the gNB may use lower MCS index than the one configured for MsgA-PUSCH in 2-step RACH, please note one MCS can be configured in MsgA-PUSCH-Config. For example, the last row in Table 15 shows that if the reduced capability NR device is in unfavorable condition either because of the channel or its limited capability, the UE selects 4-step RACH.

TABLE 15 mapping the measured RSRP to coverage enhancement level for MsgA-PUSCH with the possibility of selecting 4-step RACH

| Measured RSRP | Coverage enhancement level for MsgA-PUSCH |
|---|---|
| $\alpha_0 \le$ RSRP | Level 0 |
| $\alpha_1 \le$ RSRP $< \alpha_0$ | Level 1 |
| $\alpha_2 \le$ RSRP $< \alpha_1$ | Level 2 |
| $\eta \le$ RSRP $< \alpha_2$ | Level 3 |
| RSRP $< \eta$ | Select 4-step RACH |

where $\eta$ is RSRP threshold for the selection between 2-step RACH and 4-step RACH and it may be equal to the smallest RSRP threshold in the indicated set of thresholds for MsgA-PUSCH or it may be equal to msgA-RSRP-Threshold or msgA-RSRP-Threshold-SUL.

Repetition based coverage enhancement procedures for MsgA are described herein. In this section, the reduced capability NR device may use the identified coverage enhancement level of MsgA-PRACH and MsgA-PUSCH, mentioned in the above table, and translate it into particular repetition procedures or repetition parameter(s) such as a number of repetitions.

The reduced capability NR device may repeat MsgA-PRACH using one of the procedures described herein or those used for PRACH repetition in 4-step RACH or any of combination thereof.

Regarding how reduced capability NR device may repeat MsgA-PUSCH and its relation to the repetitions of MsgA-PRACH and MsgA-PUSCH, the following alternatives may be used.

In the first alternative, a reduced capability NR device may transmit all of its repetitions of MsgA-PRACH prior to the commencement of the transmission of the first MsgA-PUSCH repetition.

Figure 21:
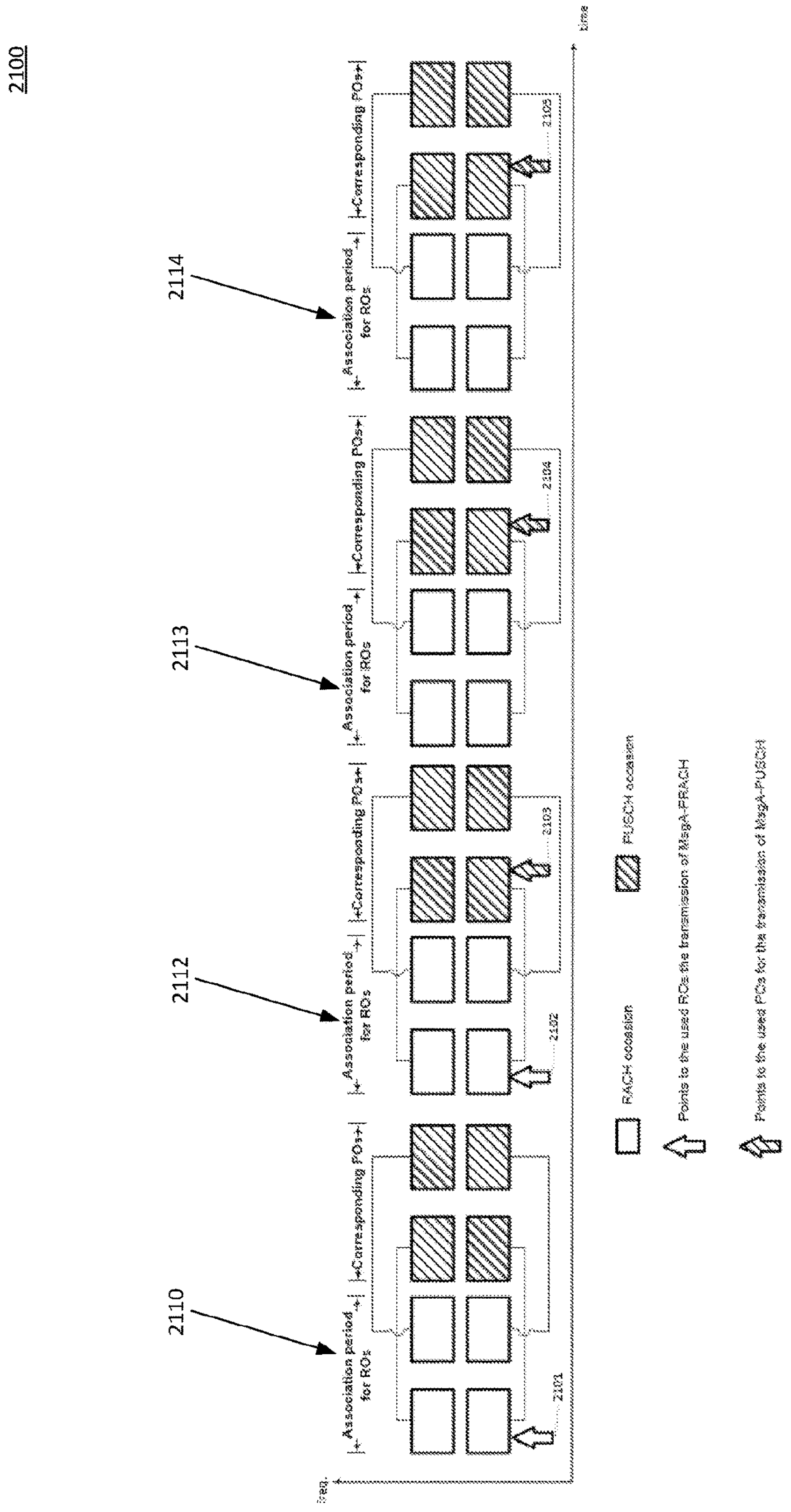
FIG. 21 shows an example of repetitions of MsgA-PRACH being completed prior to the commencement of the first MsgA-PUSCH repetition in one-to-one mapping scenario between ROs and PO.

FIG. 21 shows an example of repetitions of MsgA-PRACH being completed prior to the commencement of the first MsgA-PUSCH repetition in one-to-one mapping scenario between ROs and POs 2100. FIG. 21 shows an example of four association periods 2110, 2111, 2112, and 2113 where the gNB configures each period to include four ROs. In this example, the gNB configures one-to-one mappings between ROs and POs, i.e., each preamble of each RO is mapped to a single PO with its associated DMRS resources. It is assumed that reduced capability NR device identifies coverage enhancement levels of MsgA-PRACH and MsgA-PUSCH that correspond to two and three repetitions for the PRACH and PUSCH parts of MsgA, respectively.

FIG. 21 shows the first ROs, 2101 and 2102, in the first and second association periods 2110 and 2111, which the reduced capability NR device selects to carry the two repetitions of MsgA-PRACH. After the reduced capability NR device completes the transmission of all MsgA-PRACH repetitions, the UE starts the transmission of MsgA-PUSCH repetition from the next PUSCH occasion (PO) associated with the selected RO 2103. The reduced capability NR device transmits the repetitions of MsgA-PUSCH in the POs associated with the selected RO in the subsequent association period after last repetition of PRACH, 2103, 2104, and 2105 as shown in FIG. 21.

Figure 22:
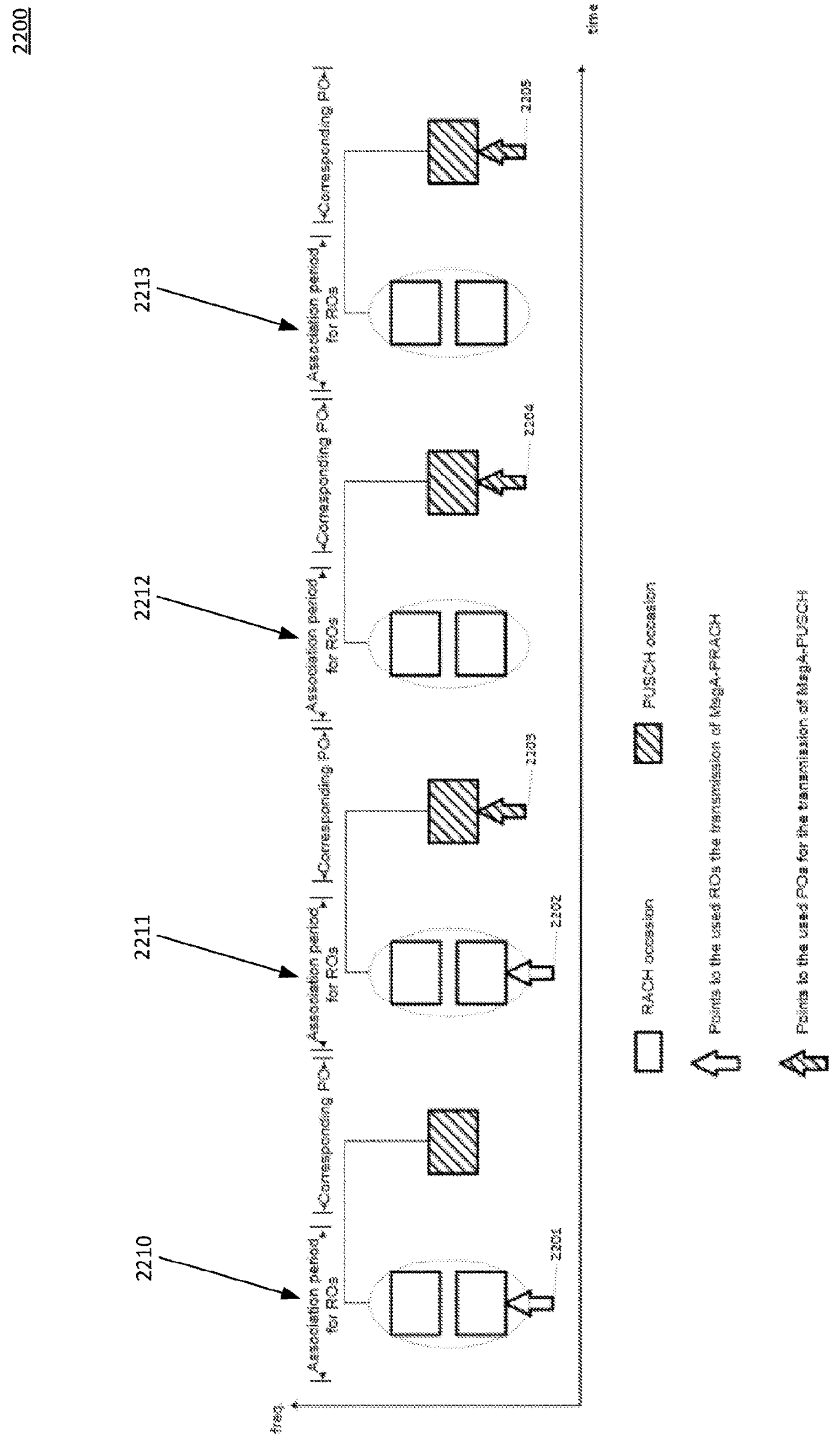
FIG. 22 shows an example of repetitions of MsgA-PRACH being completed prior to the commencement of the first MsgA-PUSCH repetition in multiple-to-one mapping scenario between ROs and POs.

FIG. 22 shows an example of repetitions of MsgA-PRACH being completed prior to the commencement of the first MsgA-PUSCH repetition in multiple-to-one mapping scenario between ROs and POs 2200. FIG. 22 shows an example of four association periods 2210, 2211, 2212, and 2213. The reduced capability NR device may apply the same approach when multiple ROs are mapped to a PO. FIG. 22 shows an example where the gNB configures two ROs to be mapped to a single PO. A similar procedure is applied wherein the reduced capability NR device transmits the two MsgA-PRACH repetitions in the first ROs 2201 and 2202 in the first and second association periods 2210 and 2211. Then the reduced capability NR device transmits the repetitions of MsgA-PUSCH in PO 2203, 2204 and 2205, as shown in FIG. 22.

Figure 23:
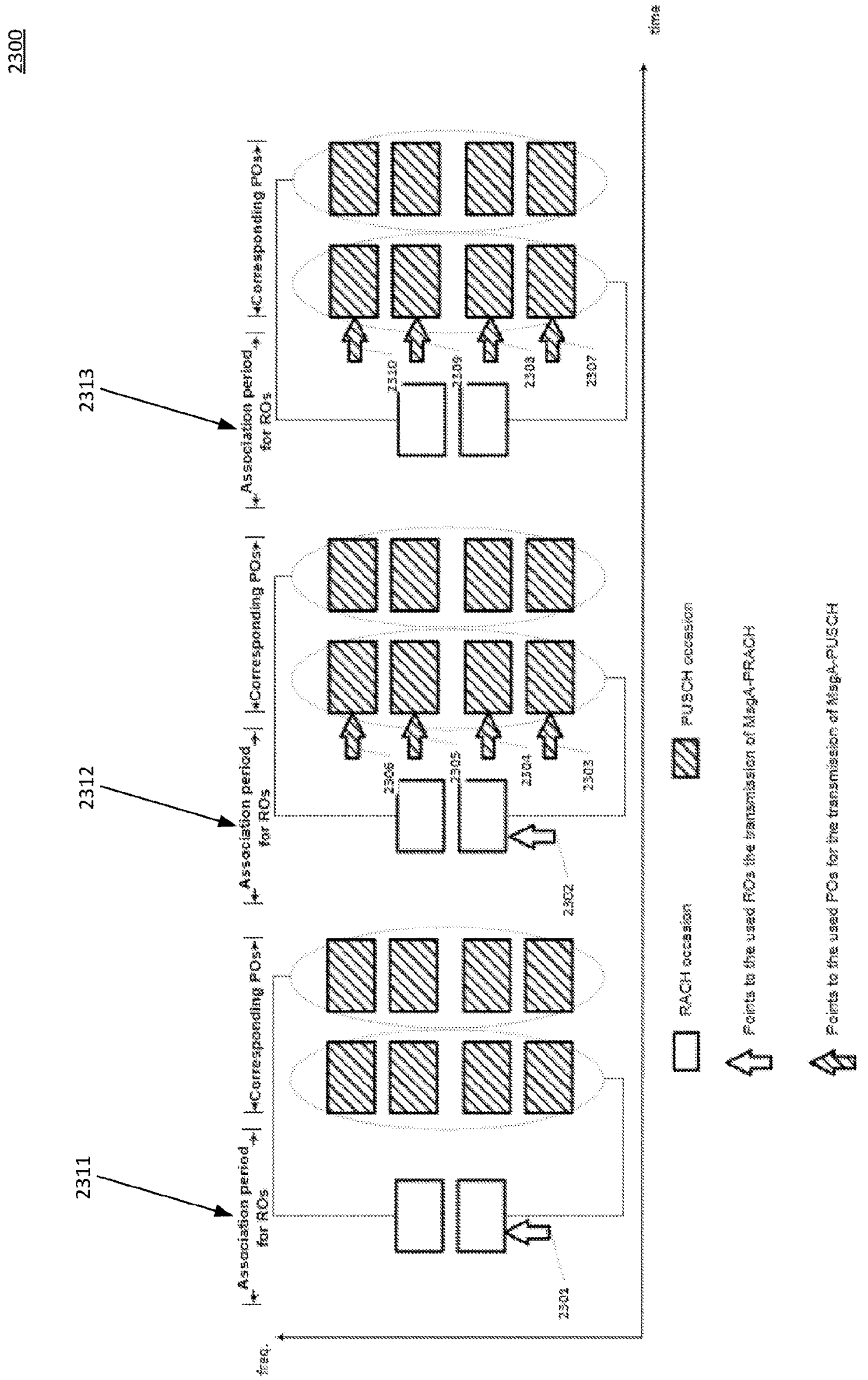
FIG. 23 shows an example of repetitions of MsgA-PRACH being completed prior to the commencement of the first MsgA-PUSCH repetition in one-to-multiple mapping scenario between ROs and POs.

FIG. 23 shows an example of repetitions of MsgA-PRACH being completed prior to the commencement of the first MsgA-PUSCH repetition in one-to-multiple mapping scenario between ROs and POs 2300. FIG. 23 shows an example of three association periods 2311, 2312, and 2313. In the example of FIG. 23, a one-to-multiple mapping is assumed between ROs and POs, i.e., a set of preambles in each RO are mapped to a multiple PO with its associated DMRS resources. Specifically, when a UE selects a particular preamble, it'll be up to the UE to select one of many POs that are associated with this preamble to transmit MsgA-PUSCH. The reduced capability NR device may transmit the repetitions of MsgA-PUSCH in multiple POs associated with the same RO in the same association period or in the subsequent association periods. FIG. 23 shows an example where a reduced capability NR device transmits the two repetitions of MsgA-PRACH in the first ROs 2301 and 2302 in the first and second association period 2310 and 2311. Then, the reduced capability NR device transmits eight repetitions of MsgA-PUSCH in POs 2303, 2304, 2305, 2306, 2307, 2308, 2309, and 2310. Though the previous examples showed that reduced capability NR device may use one approach for the transmission of MsgA-PRACH repetitions, other repetition procedures developed for the repetition of PRACH in 4-step RACH may be applied as well.

Figure 24:
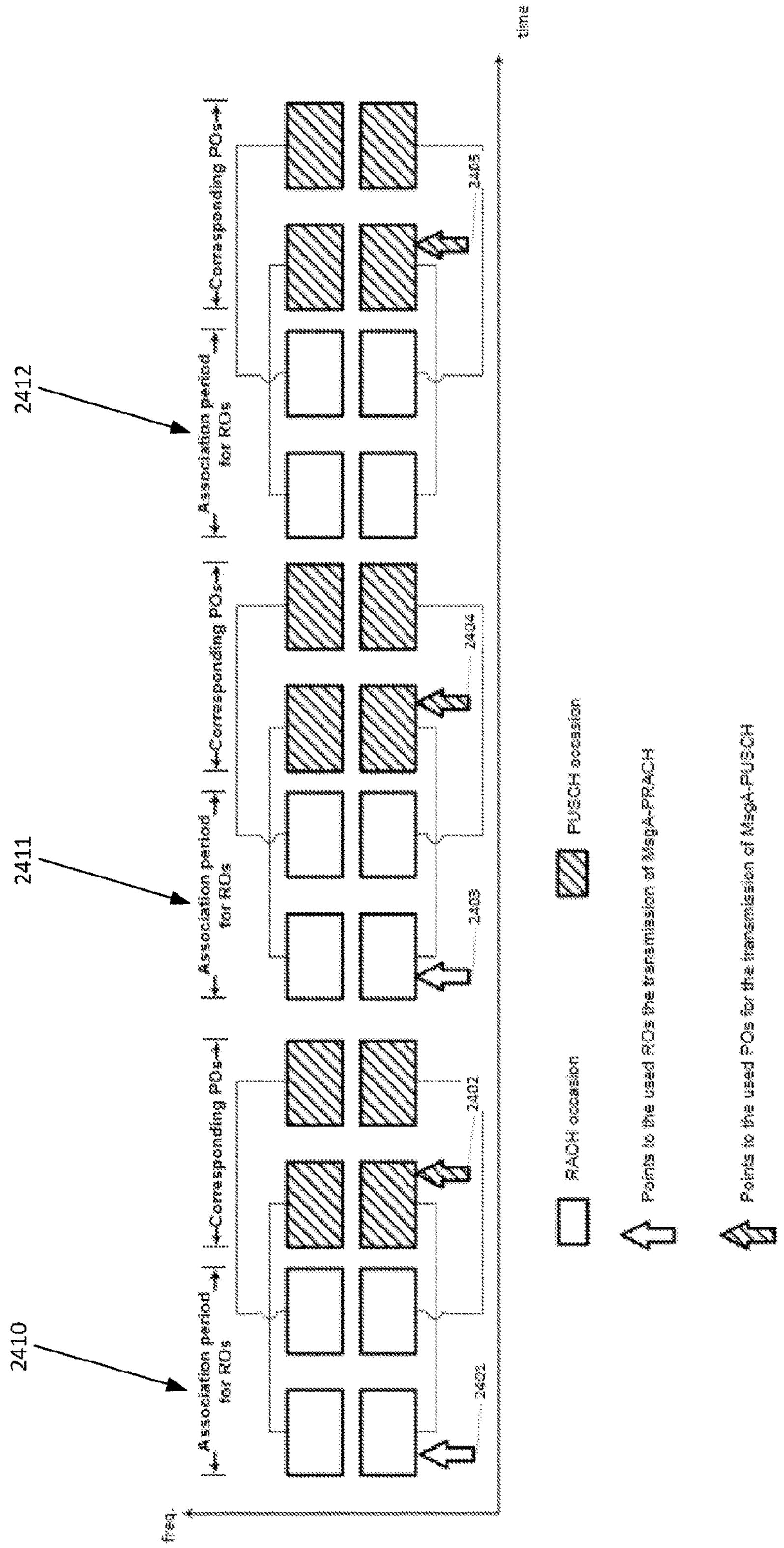
FIG. 24 shows an example of repetitions of MsgA-PRACH and MsgA-PUSCH being transmitted in the same association period in one-to-one mapping scenario between ROs and POs.

FIG. 24 shows an example of repetitions of MsgA-PRACH and MsgA-PUSCH being transmitted in the same association period in one-to-one mapping scenario between ROs and POs 2400. FIG. 24 shows an example of three association periods 2410, 2411, and 2412. In a second alternative, the reduced capability NR device may transmit the repetitions of MsgA-PRACH and MsgA-PUSCH in the same association period. This is exemplified in FIG. 24 where the reduced capability NR device transmits the repetitions of both MsgA-PRACH and MsgA-PUSCH in the same association period as illustrated in the first association period 2410 and second association period 2411 in ROs 2401 and 2403 and POs 2402 and 2404.

Since the reduced capability NR device may identify the need of different coverage enhancement level for MsgA-PUSCH and MsgA-PRACH, the reduced capability NR device may continue transmitting the repetitions of MsgA-PUSCH after the last repetition of MsgA-PRACH. This is illustrated in FIG. 24 where the reduced capability NR device transmits MsgA-PRACH in the third associated period 2412 and only transmits the repetition of MsgA-PUSCH in PO indicated by arrow 2405.

Similar approaches may also be applied for the case of one-to-multiple or multiple-to-one as described in the previous examples.

Though in the previous figures single or multiple RO(s) may be linked with single or multiple PO(s), please note that this linkage refers to the mapping of set(s) of preambles in RO(s) to PO(s).

The reduced capability NR device may transmit identify the number of repetitions for each coverage enhancement level using the specified values, provided in the specs. For example, this is shown in Table 16 and Table 17 for MsgA-PRACH and MsgA-PUSCH, respectively.

TABLE 16 mapping the measured RSRP to coverage enhancement level for MsgA-RACH and the corresponding number of repetitions

| Measured RSRP | Coverage enhancement level for MsgA-PRACH | Number of repetitions |
|---|---|---|
| $\beta_0 \le$ RSRP | Level 0 | 2 |
| $\beta_1 \le$ RSRP < $\beta_0$ | Level 1 | 4 |
| $\beta_2 \le$ RSRP < $\beta_1$ | Level 2 | 6 |
| RSRP < $\beta_2$ | Level 3 | 8 |

TABLE 17 mapping the measured RSRP to coverage enhancement level for MsgA-PUSCH the corresponding number of repetitions

| Measured RSRP | Coverage enhancement level for MsgA-PUSCH | Number of repetitions |
|---|---|---|
| $\alpha_0 \le$ RSRP | Level 0 | 3 |
| $\alpha_1 \le$ RSRP < $\alpha_0$ | Level 1 | 5 |
| $\alpha_2 \le$ RSRP < $\alpha_1$ | Level 2 | 7 |
| RSRP < $\alpha_2$ | Level 3 | 9 |

The gNB may signal to the reduced capability NR device the number of repetitions for different coverage enhancement levels of MsgA-PRACH and/or MsgA-PUSCH. For example, gNB may use higher layer signaling to indicate the number of repetitions to the reduced capability NR devices for different coverage enhancement levels for MsgA-PRACH and/or MsgA-PUSCH. gNB may transmit to reduced capability NR devices these parameters as a part of RACH-ConfigCommonTwoStepRA or RACH-ConfigGenericTwoStepRA in case of MsgA-PRACH, or part of MsgA-PUSCH-Config in case of MsgA-PUSCH for example.

If the reduced capability NR device identify that one or multiple ROs that are configured to carry preamble repetition may be invalid according to one or more rules, a reduced capability NR device may continue to transmit the preamble on other ROs until the indicated or identified number of preamble repetitions has been transmitted. This may be applied for PRACH transmission in 4-step RACH and MsgA-PRACH in 2-step RACH.

Alternatively, if one or multiple ROs that are configured to carry preamble repetition are invalid according to one or more rules, the reduced capability NR device may not attempt to compensate those invalid preamble repetitions in any other ROs and terminate the preamble repetitions at the same time as if all ROs are valid. This may be applied for PRACH transmission in 4-step RACH and MsgA-PRACH in 2-step RACH.

Similar rules may be applied as described above for MsgA-PUSCH repetitions when one or multiple POs that are configured to carry MsgA-PUSCH repetitions are invalid.

Other methods for non-repetition based coverage enhancement are described herein. The reduced capability NR device may enhance the coverage of MsgA-PRACH using repetition-based procedures as described above or for PRACH in 4-step RACH. However, the reduced capability NR device may apply other methods to enhance the coverage of MsgA-PUSCH different from just repetition.

In NR Rel. 16, gNB can provide up to two configurations of MsgA-PUSCH. Each one corresponds to particular payload size(s) and UE picks one of them based on the size of the intended payload.

Here, the gNB may provide the reduced capability NR device with more than just two configurations of MsgA-PUSCH. Specifically, the UE may select appropriate configurations among different many other configurations that are suitable for the coverage situation experienced by the UE such that gNB receives MsgA-PRACH and/or MsgA-PUSCH at better quality. For example, gNB may configure the reduced capability NR device such that the configuration associated with high coverage enhancement level have more additional-DMRS symbol(s) than a configuration associated with lower coverage enhancement level. Also, the selection of DMRS length, i.e., single-symbol or double-symbol DMRS may depend on the required coverage enhancement level.

As another possibility, gNB may configure different MsgA-PUSCH to be associated with different SLIV and/or MCS to transmit the same PUSCH payload.

Figure 25:
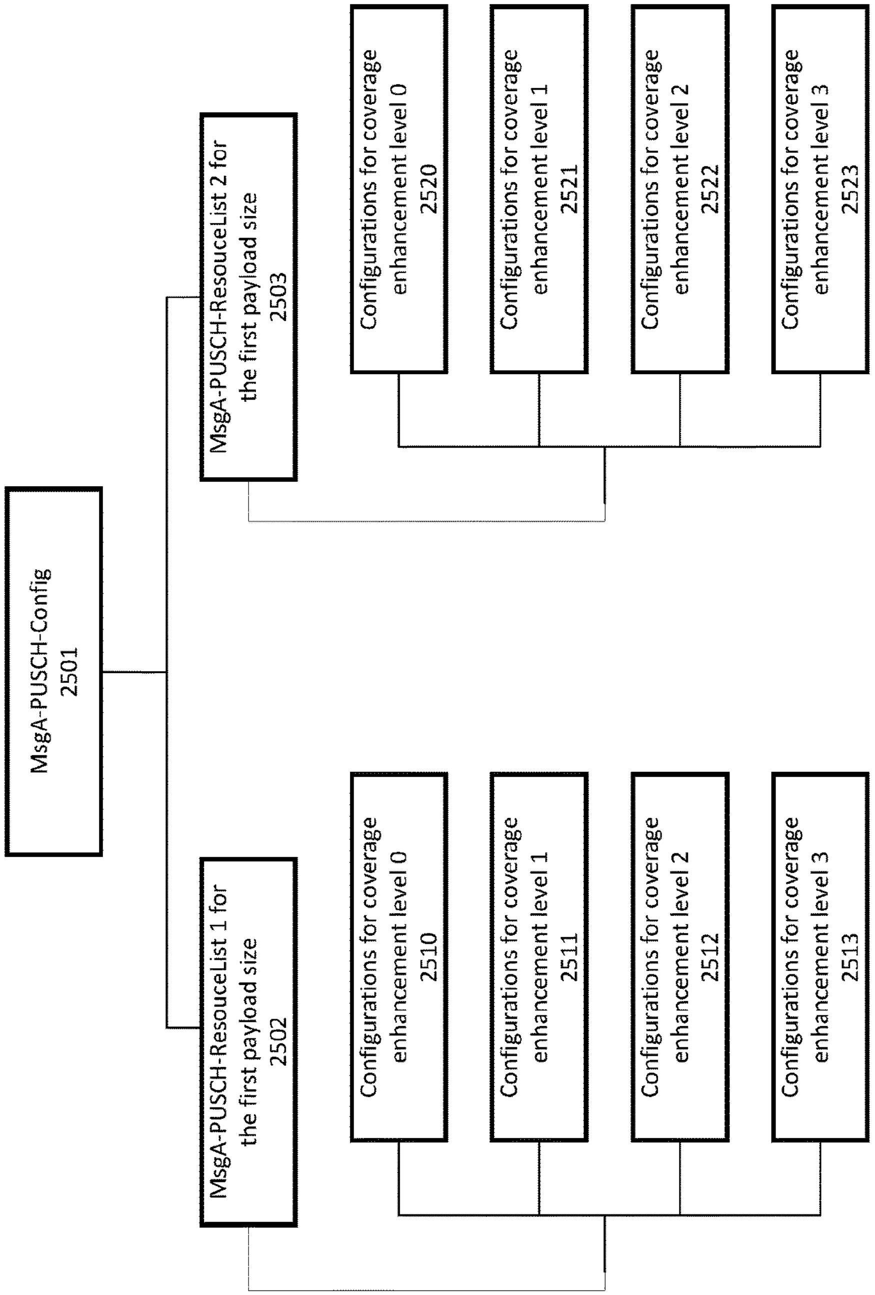
FIG. 25 shows an example configurations structure to support multiple MsgA-PUSCH configurations for different coverage enhancement levels.

FIG. 25 shows an example configurations structure to support multiple MsgA-PUSCH configurations for different coverage enhancement levels 2500. The MsgA-PUSCH-Config 2501 may include msgA-PUSCH-ResourceList-r16 2502 and 2503 as a sequence of size two where each list corresponds to particular payload size. Under each list, the gNB may provide reduced capability NR device with multiple configurations to support different coverage enhancement levels as shown in FIG. 25, for example, where each list has four different configurations 2510, 2511, 2512, and 2513 and 520, 2521, 2522, and 2523. Though the FIG. 25 shows that MsgA-PUSCH-ResourceList 1 and MsgA-PUSCH-ResourceList 2 have the same number of coverage enhancement levels, they can be different in general.

One possibility to realize these configurations is illustrated by modifying MsgA-PUSCH-Config IE in NR Rel. 16. For simplicity, the unchanged text is omitted.

MsgA-PUSCH-Config information element

```
-- ASN1START
-- TAG-MSGA-PUSCH-CONFIG-START
MsgA-PUSCH-Config-rl6 ::=                    SEQUENCE {
   msgA-PUSCH-ResourceList-r16               SEQUENCE
(SIZE(1..2)) OF MsgA-PUSCH-Resource-r16      OPTIONAL, --
Cond InitialBWPConfig
-- Here the number of msgA-PUSCH-ResourceList-r16 is two as in
Rel. 16
                              <Unchanged Text Omitted>
}
MsgA-PUSCH-Resource-r16 ::=                  SEQUENCE {
                               <Unchanged Text Omitted>
   msgA-MCS-r16                              SEQUENCE {
      INTEGER (0..15),                       --for coverage enhancement
level 0
      INTEGER (0..15) OPTIONAL,                --for coverage enhancement
level 1
      INTEGER (0..15) OPTIONAL,                --for coverage enhancement
level 2
      INTEGER (0..15) OPTIONAL,                --for coverage enhancement
level 3
   },
   nrofSlotsMsgA-PUSCH-r16                   SEQUENCE {
      INTEGER (1..4),                          --for coverage enhancement
level 0
      INTEGER (1..4) OPTIONAL,                 --for coverage enhancement
level 1
      INTEGER (1..4) OPTIONAL,                 --for coverage enhancement
level 2
      INTEGER (1..4) OPTIONAL,               --for coverage enhancement
level 3
   },
   nrofMsgA-PO-PerSlot-r16                                 SEQUENCE {
      ENUMERATED {one, two, three, six},                   --for coverage
enhancement level 0
      ENUMERATED {one, two, three, six},     OPTIONAL,         --for
coverage enhancement level 1
      ENUMERATED {one, two, three, six},     OPTIONAL,         --for
coverage enhancement level 2
      ENUMERATED {one, two, three, six},     OPTIONAL,         --for
coverage enhancement level 3
   },
   msgA-PUSCH-TimeDomainOffset-r16                         SEQUENCE {
      INTEGER (1..32),                       --for coverage enhancement
level 0
      INTEGER (1..32) OPTIONAL,                --for coverage enhancement
level 1
      INTEGER (1..32) OPTIONAL,                --for coverage enhancement
level 2
      INTEGER (1..32) OPTIONAL,                --for coverage enhancement
level 3
   },
   msgA-PUSCH-TimeDomainAllocation-r16                       SEQUENCE {
      INTEGER (1..maxNrofUL-Allocations)     OPTIONAL,     --Need S, for
coverage enhancement level 0
      INTEGER (1..maxNrofUL-Allocations)     OPTIONAL,     --Need S, for
coverage enhancement level 1
      INTEGER (1..maxNrofUL-Allocations)     OPTIONAL,     --Need S, for
coverage enhancement level 2
      INTEGER (1..maxNrofUL-Allocations)     OPTIONAL,     --Need S, for
coverage enhancement level 3
   },
   startSymbolAndLengthMsgA-PO-r16                           SEQUENCE {
      INTEGER (0..127) OPTIONAL, -- Need S, for coverage
enhancement level 0
      INTEGER (0..127) OPTIONAL, -- Need S, for coverage
enhancement level 1
      INTEGER (0..127) OPTIONAL, -- Need S, for coverage
enhancement level 2
      INTEGER (0..127) OPTIONAL, -- Need S, for coverage
enhancement level 3
   },
```

-continued

MsgA-PUSCH-Config information element

```
-- <Unchanged Text Omitted>
frequencyStartMsgA-PUSCH-r16                                    SEQUENCE {
    INTEGER (0..maxNrofPhysicalResourceBlocks-1),                   --for
coverage enhancement level 0
    INTEGER (0..maxNrofPhysicalResourceBlocks-1), OPTIONAL,         --for
coverage enhancement level 1
    INTEGER (0..maxNrofPhysicalResourceBlocks-1), OPTIONAL,         --for
coverage enhancement level 2
    INTEGER (0..maxNrofPhysicalResourceBlocks-1), OPTIONAL,         --for
coverage enhancement level 3
  },
  nrofPRBs-PerMsgA-PO-r16                                       SEQUENCE {
    INTEGER (1..32),                        --for coverage enhancement level 0
    INTEGER (1..32), OPTIONAL,                --for coverage enhancement
level 1
    INTEGER (1..32), OPTIONAL,                --for coverage enhancement
level 2
    INTEGER (1..32), OPTIONAL,                --for coverage enhancement
level 3
  },
  nrofMsgA-PO-FDM-r16                                           SEQUENCE
    ENUMERATED {one, two, four, eight},                             --for
coverage enhancement level 0
    ENUMERATED {one, two, four, eight},     OPTIONAL,               --for
coverage enhancement level 1
    ENUMERATED {one, two, four, eight},     OPTIONAL,               --for
coverage enhancement level 2
    ENUMERATED {one, two, four, eight},     OPTIONAL,               --for
coverage enhancement level 3
  },
  msgA-IntraSlotFrequencyHopping-r16                            SEQUENCE {
    ENUMERATED {enabled} OPTIONAL,      -- Need R, for coverage
enhancement level 0
    ENUMERATED {enabled} OPTIONAL,      -- Need R, for coverage
enhancement level 1
    ENUMERATED {enabled} OPTIONAL,      -- Need R, for coverage
enhancement level 2
    ENUMERATED {enabled} OPTIONAL,      -- Need R, for coverage
enhancement level 3
},
msgA-HoppingBits-r16                    SEQUENCE {
    BIT STRING (SIZE(2)) OPTIONAL,   -- Need R, for coverage
enhancement level 0
    BIT STRING (SIZE(2)) OPTIONAL,   -- Need R, for coverage
enhancement level 1
    BIT STRING (SIZE(2)) OPTIONAL,   -- Need R, for coverage
enhancement level 2
    BIT STRING (SIZE(2)) OPTIONAL,   -- Need R, for coverage
enhancement level 3
  },
  msgA-DMRS-Config-r16                                          SEQUENCE
(SIZE(1..4) OF MsgA-DMRS-Config-r16,          --Each DMRS
configuration correspond to particular coverage enhancement level
nrofDMRS-Sequences-r16                                          SEQUENCE {
    INTEGER (1..2),                         -- for coverage enhancement
level 0
    INTEGER (1..2) OPTIONAL,                -- for coverage enhancement
level 1
    INTEGER (1..2) OPTIONAL,                -- for coverage enhancement
level 2
    INTEGER (1..2) OPTIONAL,                -- for coverage enhancement
level 3
  },
                        <Unchanged Text Omitted>
}
MasgA-DMRS-Config-r16 ::=                                       SEQEUNCE {
                        <Unchanged Text Omitted>
}
-- TAG-MSGA-PUSCH-CONFIG-STOP
                            -- ASN1STOP
```

The explanation of each RRC parameter follows the explanation provided in 3GPP TS 38.331. The key difference here is that most of the RRC parameters are converted into sequences such that gNB can configure each parameter according to the associated coverage enhancement level. Reduced capability NR device may apply the configurations associated with selected coverage enhancement level.

If multiple coverage enhancement levels share the same configurations, then gNB does not transmit a repeated version of the same configurations and UE may understand that this configuration may be applied for all the coverage enhancement levels. For example, if there are four coverage enhancement levels and only one MCS index is indicated as shown below, then reduced capability NR device may apply the same MCS index for the difference coverage enhancement level.

```
msgA-MCS-r16                    SEQUENCE {
    INTEGER (0..15),        --for coverage enhancement
level 0

INTEGER (0..15) OPTIONAL,      --for coverage enhancement
level 1  NOT transmitted

INTEGER (0..15) OPTIONAL,      --for coverage enhancement
level 2  NOT transmitted

INTEGER (0..15) OPTIONAL,      --for coverage enhancement
level 3  NOT transmitted
    },
```

Instead of converting most of the RRC parameters into sequences, the same goal may be realized with more compact configurations as follows. Basically, a kind of nested loop may be created, i.e., MsgA-PUSCH-Resource-r16 is a sequence of up to NrofCoverageEnhLevel configurations MsgA-PUSCH-ResourceforEachCoverageEnhLevel-r17 for difference coverage enhancement levels. Each MsgA-PUSCH-ResourceforEachCoverageEnhLevel-r17 contains similar RRC parameters as MsgA-PUSCH configurations in NR Rel. 16. Please note that NrofCoverageEnhLevel may be explicitly indicated by higher layer signaling or derived based on the number of RSRP thresholds, for example, to determine the required coverage enhancement level.

MsgA-PUSCH-Config information element

```
-- ASN1START
-- TAG-MSGA-PUSCH-CONFIG-START
MsgA-PUSCH-Config-r16 ::=                          SEQUENCE {
  msgA-PUSCH-ResourceList-r16                        SEQUENCE
(SIZE(1..2)) OF MsgA-PUSCH-Resource-r16                 OPTIONAL, --
Cond InitialBWPConfig
-- Here the number of msgA-PUSCH-ResourceList-r16 two is as in
Rel. 16
                          <Unchanged Text Omitted>
}
MsgA-PUSCH-Resource-r16 ::= SEQUENCE
(SIZE(1..NrofCoverageEnhLevel)) OF MsgA-PUSCH-
ResourceforEachCoverageEnhLevel-r17
ResourceforEachCoverageEnhLevel-r17 ::= SEQUENCE {
  msgA-PUSCH-PreambleGroup-r16                      ENUMERATED
{groupA, groupB}                                    OPTIONAL, --
Need S
                          <Unchanged Text Omitted>
  nrofInterlacesPerMsgA-PO-r16                      INTEGER (1..10)
OPTIONAL, -- Need R
  ...
}
MsgA-DMRS-Config-r16 ::=              SEQUENCE {
  msgA-DMRS-AdditionalPosition-r16          ENUMERATED
{pos0, pos1, pos3}                          OPTIONAL, --
Need S
                          <Unchanged Text Omitted>
  msgA-ScramblingID1-r16                              INTEGER
(0..65536)                                              OPTIONAL --
Need S
}
-- TAG-MSGA-PUSCH-CONFIG-STOP
                                   -- ASN1STOP
```

Though frequency hopping is already supported for MsgA-PUSCH, the gain may be limited due to the limited supported bandwidth and large coherence bandwidth of the channel. Therefore, frequency hopping may be performed across different BWPs or within a carrier.

The hopping may be inter-slot hopping, i.e., the hopping occurs across the slot boundary after $N_{rep\text{-}slot}$ slot(s). If $N_{rep\text{-}slot}$ is equal to one, hopping occurs each slot, if $N_{rep\text{-}slot}$ is equal to 2, then hopping occurs every other slot. Or inter-repetition hopping where a hop can take place after $N_{rep\text{-}hop}$ hop(s). That hopping may occur after each $N_{rep\text{-}AssociationPeriod}$ association period(s). The parameters $N_{rep\text{-}slot}$, $N_{rep\text{-}hop}$, and/or $N_{rep\text{-}AssociationPeriod}$ may be indicated by higher layer signaling as part of MsgA-PUSCH-Config, for example.

Figure 26:
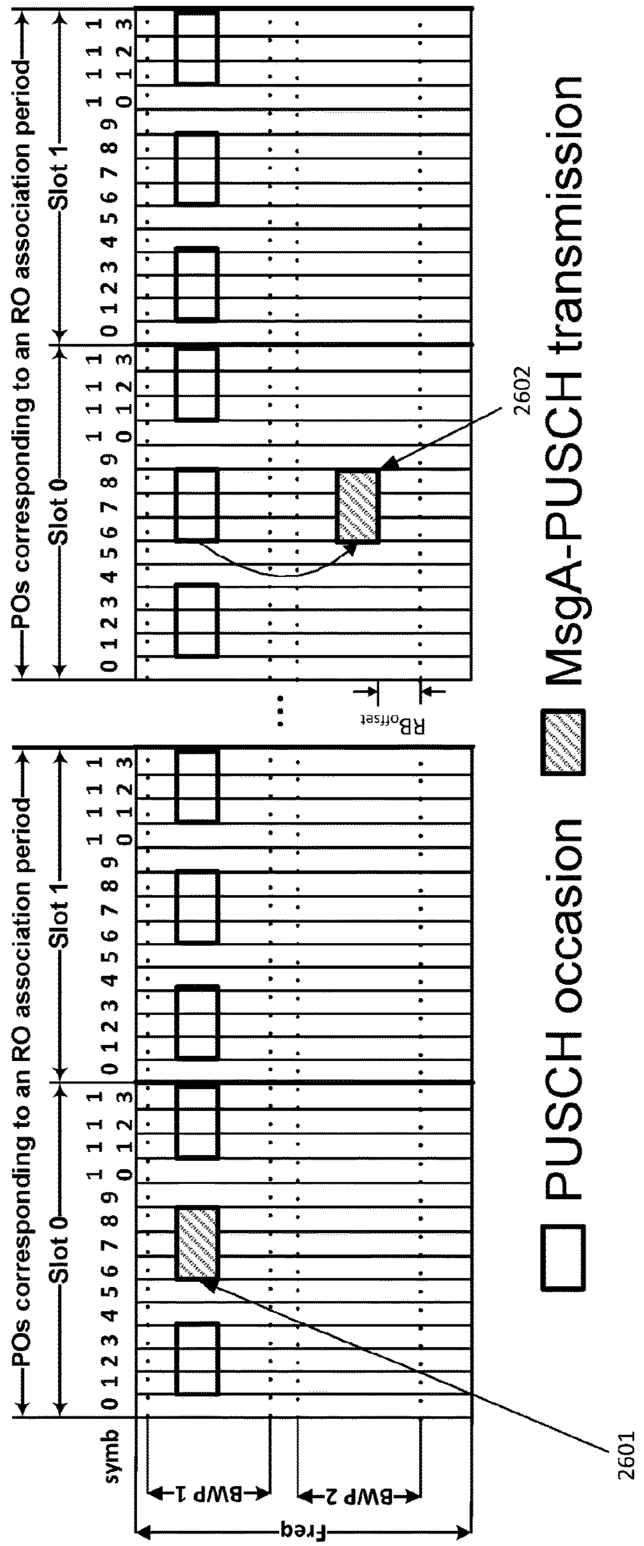
FIG. 26 shows an example of MsgA-PUSCH hopping across BWPs.

FIG. 26 shows an example of MsgA-PUSCH hopping across BWPs 2600. FIG. 26 shows an example where reduced capability NR device transmits MsgA-PUSCH hops across different RO in different association periods. Specifically, a reduced capability NR device selects POs associated with the selected preamble according to the mapping rules to transmit the first MsgA-PUSCH repetition 2601. For the next repetition in the next association period, the reduced capability NR device transmits MsgA-PUSCH hop 2602 across the BWP. As shown in FIG. 26 the MsgA-PUSCH after hopping 2602 still occupies the same OFDM symbols as the previous MsgA-PUSCH transmitted before the hop. However, it is transmitted in another BWP with a particular frequency offset. In this example, the frequency offset is relative to the first PRB in the new BWP. However, the frequency offset may be relative to any other reference RB within or outside the new/old BWP and it may be indicated by higher layer signaling.

The gNB may indicate to the reduced capability NR device through a new higher layer signaling, e.g. RRC parameter whether frequency hopping occurs across BWPs or within a BWP. Or, for reduced capability NR derives, when the frequency hopping is enabled, by msgA-IntraSlotFrequencyHopping-r16, then it refers to hopping across BWPs by default. Please note that intra-slot frequency hopping may not be supported for reduced capability NR devices due to the limited gain compared with the design complexity to do hopping within MsgA-PUSCH itself.

Please note, if the frequency hopping occurs within a BWP, then the existing RRC parameters related to frequency hopping in NR Rel. 16 may be re-interpreted as follows. The RRC parameter msgA-IntraSlotFrequencyHopping-r16 indicates whether the frequency hopping is enabled or not. If the frequency hopping is enabled, it may be inter-slot, inter-repetition, inter-association period, or any other hopping approach depending on which type of hopping may be supported in the specs. Moreover, the RRC parameter msgA-HoppingBits-r16 indicates the frequency offset between the hops.

To determine in which BWP the hopping occurs, several solutions based on the RRC state of reduced capability NR devices may be implemented.

If the UE is in an RRC-connected state with additional configured BWPs other than the BWP in which the 2-step RACH procedure is initialized, the BWP in which hops occur may be determined as follows:

According to certain rules such as:

The hoppings may occur in the BWP that has the nearest or the furthest center frequency to or from the center frequency of BWP that has first MsgA-PUSCH repetition.

The hop may be transmitted in the BWP indexed by m, where m is a function of the index of the BWP in which first MsgA-PUSCH repetition has occurred, denoted as n. For example, m=(n+1) mod T, where T is the total number of configured BWPs which the 2-step RACH is initiated.

According to explicit indication:

gNB may indicate to the reduced capability NR device through higher layer the index of the BWP in which the UE may perform the frequency hopping. For example, an RRC parameter in MsgA-PUSCH-Config.

gNB may indicate to the reduced capability NR device through higher layer signaling a sequence of BWP indices which the reduced capability NR device may follow for the transmission of MsgA-PUSCH hops. For example, assuming that the gNB indicates a sequence 3 4 1 2 to the reduced capability NR device for frequency hopping. In this case, if the reduced capability NR device initiates the 2-step RACH is initiated in BWP 4, then the hops may be transmitted in BWP 1. Similarly, if reduced capability NR device initiates the 2-step RACH in BWP 1, then the hops may occur in BWP 2, and so on.

If the UE is in RRC-idle/inactive states and/or no additional configured BWPs other than the BWP in which the 2-step RACH is initialized, the gNB may configure a "dummy" BWP for the purpose of transmitting the repetition of MsgA-PUSCH. This "dummy" BWP may neither be used for other purposes nor be counted towards the maximum number of configured BWPs. For example, to configure the frequency domain location and bandwidth of this "dummy" BWP an RRC parameter such as locationAndBandwidth may be indicated as part of Msg-PUSCH-Config. The value of this parameter may be interpreted as in resource indicator value (RIV) as same as in BWP IE to provide the starting position and the bandwidth of a BWP as a number of contiguous PRBs.

The reduced capability NR devices may apply different power settings for MsgA-PUSCH transmission for different applied coverage enhancement levels. In NR Rel. 16, msgA-DeltaPreamble indicates the power offset of MsgA-PUSCH relative to the preamble received target power. If the field is absent, the UE may use the parameter msg3-DeltaPreamble of 4-step type RA in the configured BWP if 4-step type RA is configured.

Here, the reduced capability NR device may apply different power offsets for different coverage enhancement levels. For example, if gNB configures the reduced capability NR device with four coverage enhancement levels, the modified msgA-DeltaPreamble may indicate four values of power offset, instead of one as in NR Rel. 16, as shown below. Once the reduced capability NR device identifies the needed coverage enhancement level, UE may apply the corresponding power offset.

MsgA-PUSCH-Config information element

```
-- ASN1START
-- TAG-MSGA-PUSCH-CONFIG-START
MsgA-PUSCH-Config-r16 ::=                 SEQUENCE {
                <Unchanged Text Omitted>
msgA-DeltaPreamble-r16          SEQUENCE {
  INTEGER (-1..6) OPTIONAL -- Need S,for coverage enhancement
level 0
  INTEGER (-1..6) OPTIONAL -- Need S,for coverage enhancement
level 1
  INTEGER (-1..6) OPTIONAL -- Need S,for coverage enhancement
level 2
  INTEGER (-1..6) OPTIONAL -- Need S,for coverage enhancement
level 3
}
}
```

For MsgA-PRACH and MsgA-PUSCH repetitions, the reduced capability NR device may transmit all repetitions without power ramping based on the identified coverage enhancement level. If no response is received, the reduced capability NR device may increment the power levels of MsgA-PRACH and MsgA-PUSCH according to NR Rel. 16 and the new power levels are used for all the repetitions of MsgA-PRACH and MsgA-PUSCH.

If a reduced capability NR device does not receive a response from gNB after N trials, which can be indicated by high layer signaling, the next coverage enhancement level may be assumed. The power ramping step may vary from one coverage enhancement level to another and it may be indicated in the same approach as described above.

The reduced capability NR device may increment the transmit power of MsgA-PRACH and MsgA-PUSCH repetitions for the used coverage enhancement level and before switching to the next coverage enhancement level. The power increment for each repetition may follow the same behavior as retransmission MsgA in Rel. 16 until maximum transmit power is reached. Then, reduced capability NR device may continue using the maximum transmit power until all the repetitions of MsgA-PRACH and/or MsgA-PUSCH are transmitted or a response received from gNB. If there are invalid ROs or POs, then the reduced capability NR device may apply the above described procedure for handling the repetitions when there are invalid ROs/POs.

As yet another possibility, the reduced capability NR device may apply Rel. 16 behavior in terms of retransmission of MsgA and boost its transmit power. If the reduced capability NR device does not receive any response after reaching the maximum transmit power, then the reduced capability NR device may apply the coverage enhancement procedures described above.

Please note that any combination of the above described procedures may be applied to enhance the coverage of MsgA-PRACH and/or MsgA-PUSCH.

The reduced capability NR devices may indicate its type (reduced capability NR device) to the network for the case that legacy UEs and reduced capability NR devices share the RACH resources, i.e., share the same ROs and preambles. Also, it may be beneficial if reduced capability NR devices can indicate the selected coverage enhancement level such that gNB can transmit MsgB with the proper configurations.

The gNB may allocate different sets of preambles, e.g. disjoint sets, to different UEs types or coverage enhancement levels. For example, assuming coverage enhancement level 0 needs less repetitions than coverage enhancement level 3, then devices may select a preamble from the subset of preambles corresponding to the needed coverage enhancement level. Hence, gNB can expect how many repetitions may be transmitted from this preamble. For distinguishing between different UE types, if a UE selects a preamble from those for reduced capability NR devices, then gNB is aware of the UE type.

Figure 27:
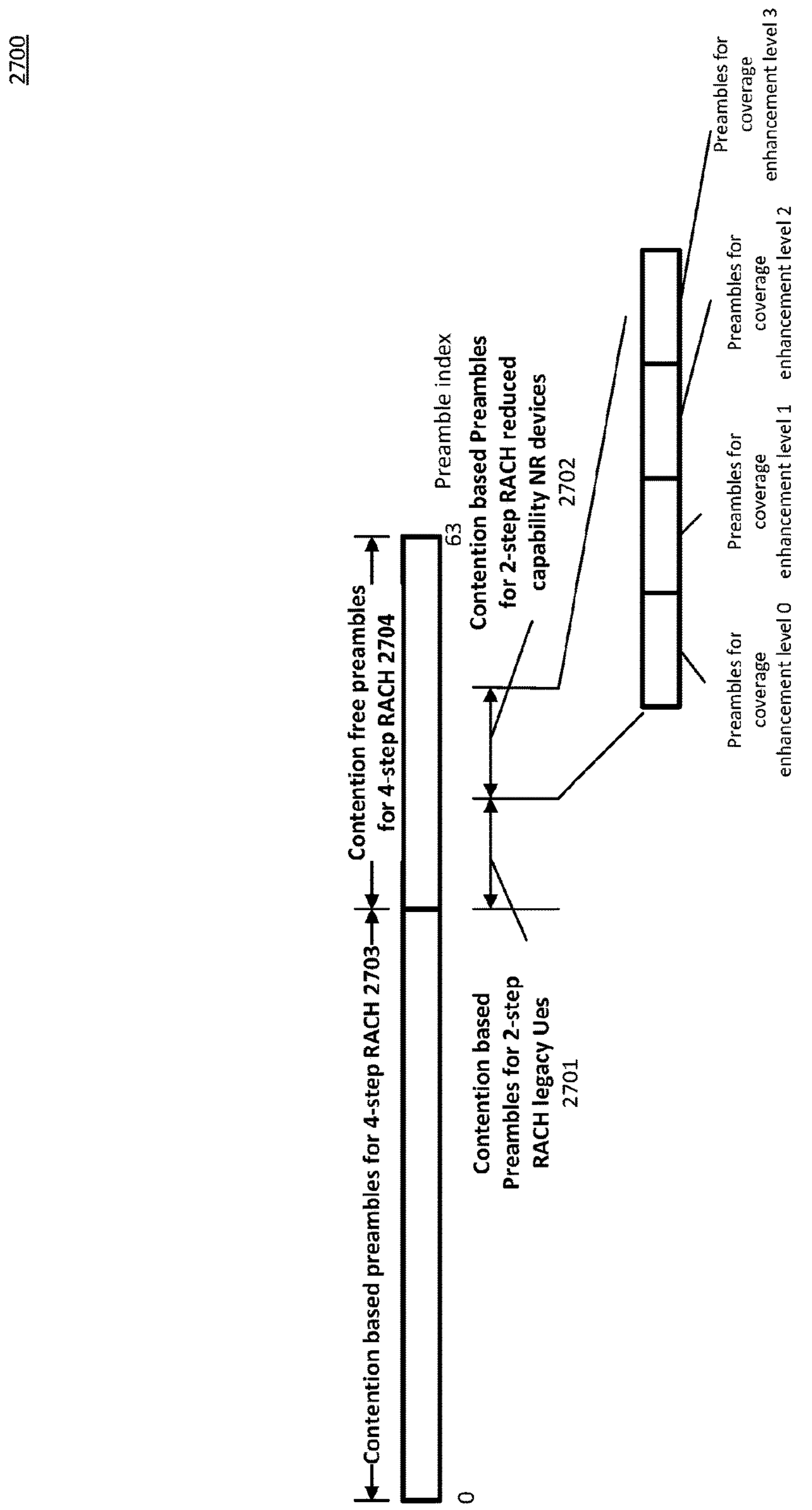
FIG. 27 shows an example of using preambles indices to distinguish between legacy UEs and reduced capability NR devices and/or different coverage enhancement level.

FIG. 27 shows an example of using preambles indices to distinguish between legacy UEs and reduced capability NR devices and/or different coverage enhancement level 2700. FIG. 27 shows an example of how gNB can split preambles indices 2701, 2702, 2703, 2704 when ROs are shared between 4-step RACH and 2-step RACH which in turn are shared between legacy UEs and reduced capability NR devices. To reduce the impact on legacy UEs, their 2-step RACH preambles indices 2701 to start from last contention-based preamble of 4-step RACH 2703 followed by the 2-step RACH preambles of reduced capability NR devices 2702. Each group of preambles indices may be divided further into subgroups for each coverage enhancement level.

In another example, the reduced capability NR device may transmit a piggybacked UCI on MsgA-PUSCH that can carry some information to indicate the type of UE to the gNB and the selected coverage enhancement level. For example, a one-bit field may be used to distinguish between legacy UEs and reduced capability NR devices. Moreover, another field may comprise $\log_2$ (number of coverage enhancement level of MsgA-PRACH or Msg-PUSCH) and be used to indicate the selected coverage enhancement level for MsgA-PRACH and/or MsgA-PUSCH.

According to NR Rel. 16, the initialization ID for MsgA-PUSCH scrambling is given by $c_{init}$=RA-RNTI×$2^{16}$+RAPID×$2^{10}$+$n_{ID}$, where RA-RNTI is as same as NR Rel. 15, RAPID is the selected RACH preamble ID, and nu) is provided by higher-layer parameter msgA-DataScrambling-Index-r16 if configured; otherwise the UE applies physical cell ID. Therefore, the reduced capability NR device may scramble MsgA-PUSCH with a particular sequence and use it as indicator of the UE type and/or the selected coverage enhancement level.

For example, the gNB may indicate to the reduced capability NR device through a new higher layer signaling, e.g. RRC parameter msgA-DataScramblingIndexRedCAP-r17, an identified used to initiate the data scrambling ID, $c_{init}$ based on the equation provided above, and be used by reduced capability NR devices initiate 2-step RACH. Similarly, through high layer signaling, other RRC parameters may indicate different parameter(s) to initiate data scrambling, $c_{init}$, for different coverage enhancement levels, as shown below for example.

MsgA-PUSCH-Config information element

```
-- ASN1START
-- TAG-MSGA-PUSCH-CONFIG-START
MsgA-PUSCH-Config-r16 ::=                          SEQUENCE {
                    <Unchanged Text Omitted>
  msgA-DataScramblingIndexRedCAP-r17               SEQUENCE {
      INTEGER (0..1023) OPTIONAL, -- Need S, for coverage
enhancement level 0
      INTEGER (0..1023) OPTIONAL, -- Need S, for coverage
enhancement level 1
      INTEGER (0..1023) OPTIONAL, -- Need S, for coverage
enhancement level 2
      INTEGER (0..1023) OPTIONAL, -- Need S, for coverage
enhancement level 3
  }
                    <Unchanged Text Omitted>
}
```

The gNB may configure different PUSCH occasion(s) for different types of UEs in the same manner described above on how PUSCH occasion(s) can be configured for different coverage enhancement levels. In this case, reduced capability NR devices may select the corresponding PO according to its applied coverage enhancement level and such that gNB can distinguish the UE type.

Alternatively, reduced capability NR devices may use DMRS sequences/ports or any other configurations for DMRS of MsgA-PUSCH to assist gNB to distinguish between different UE types and/or coverage enhancement level. To this end, for example, more DMRS sequences/DMRS ports per PO may be introduced. And higher layer signaling may indicate the corresponding parameters in the same manner as described above.

The above described procedures may be applied to indicate the UE type and/or the selected coverage enhancement level in Msg3 in 4-step RACH.

Solutions for Msg2 in 4-step RACH and MsgB in 2-step RACH are described herein. Given that a separate RMSI-PDCCH and RMSI-PDSCH are transmitted to reduced capability NR devices differently than RMSI-PDCCH and RMSI-PDSCH for legacy UEs, then a separate ra-SearchSpace in PDCCH-ConfigCommon is indicated to reduced capability NR devices. Therefore, the bandwidth of CORESET associated with ra-SearchSpace for this category of UEs is expected to be within their capability limits.

However, if RMSI-PDSCH is shared by both legacy UEs and reduced capability NR devices, then a common ra-SearchSpace may be applied by both categories of UEs. In this case, the bandwidth of CORESET associated with this ra-SearchSpace may not be within the maximum allowable bandwidth limit of reduced capability NR devices. Therefore, the aforementioned solutions to handle CORESET-0 may be applied for the CORESET associated with ra-SearchSpace.

A new RNTI different than the random access radio-network temporary identifier (RA-RNTI) may be used by legacy to scramble DCI format 1_0. This is beneficial as it prevents legacy UEs from reading the DCI scheduling RAR-PDSCH directed to reduced capability NR devices. This may happen when the ROs and preambles are shared between legacy UE and reduced capability NR devices and the monitoring occasions of PDCCH scheduling RAR-PDSCH are fully or partially overlapped. That is because PDCCH scheduling RAR-PDSCH for reduced capability NR devices is proposed to be different than the PDCCH scheduling RAR-PDSCH for legacy UEs. The equation used to calculate RA-RNTI may be revised such that if legacy UE and reduced capability NR device picked the same RO, they can obtain different RA-RNTIs.

Based on Rel. 15 and Rel. 16, UE starts monitoring PDCCH scheduling RAR from the first monitoring occasions provided by ra-SearchSpace that is at least one symbol after the last symbol of the RO used for PRACH transmission.

Since it is expected that reduced capability NR devices may need to repeat PRACH transmission several times when it can start monitoring Msg2 is defined herein with the following alternatives.

In one example, reduced capability NR devices may start monitoring RAR after last repetitions of PRACH, e.g. based on the selected coverage enhancement level. The same rules may be applied similarly to NR Rel. 15 and Rel. 16, i.e., reduced capability NR device starts monitoring PDCCH scheduling RAR from the first monitoring occasions provided by ra-SearchSpace that is at least one symbol after the last symbol of the RO used for the transmission of last PRACH repetition.

Despite the simplicity of this solution, it may result in unnecessary power consumption if the gNB received PRACH before the last repetition. In other words, any PRACH transmission after the gNB successfully received PRACH is considered a waste of power and resources.

Therefore, reduced capability NR devices may start monitoring Msg2 before accomplishing all the PRACH repetitions. Specifically, the selected coverage enhancement level may indicate the maximum number of PRACH repetitions. Then reduced capability NR devices may divide those repetitions into groups where each group comprises N repetitions. The value of N may be indicated by high layer signaling in SIB1 as part of RACH-ConfigCommon, for example, or it may be specified, provided in the specs. Please note that the value of N may be an absolute number of repetitions or a percentage of maximum number of PRACH repetitions. Also, the last group may have less than N repetitions. After the transmission of each group of PRACH repetitions, reduced capability NR device may attempt to receive Msg2-PDCCH. In general, reduced capability NR device may start monitoring Msg2-PDCCH at any monitoring occasion configured for Msg2-PDCCH after the first transmission of PRACH. Specifically, the UE may attempt to decode Msg2-PDCCH in any monitoring occasions indicated by ra-SearchSpace between the different PRACH repetition groups. If Msg2-PDCCH is received, the UE does not transmit the remaining PRACH repetitions. If not, the UE transmit another PRACH repetition group. These steps are illustrated in the flowchart in FIG. 28.

Figure 28:
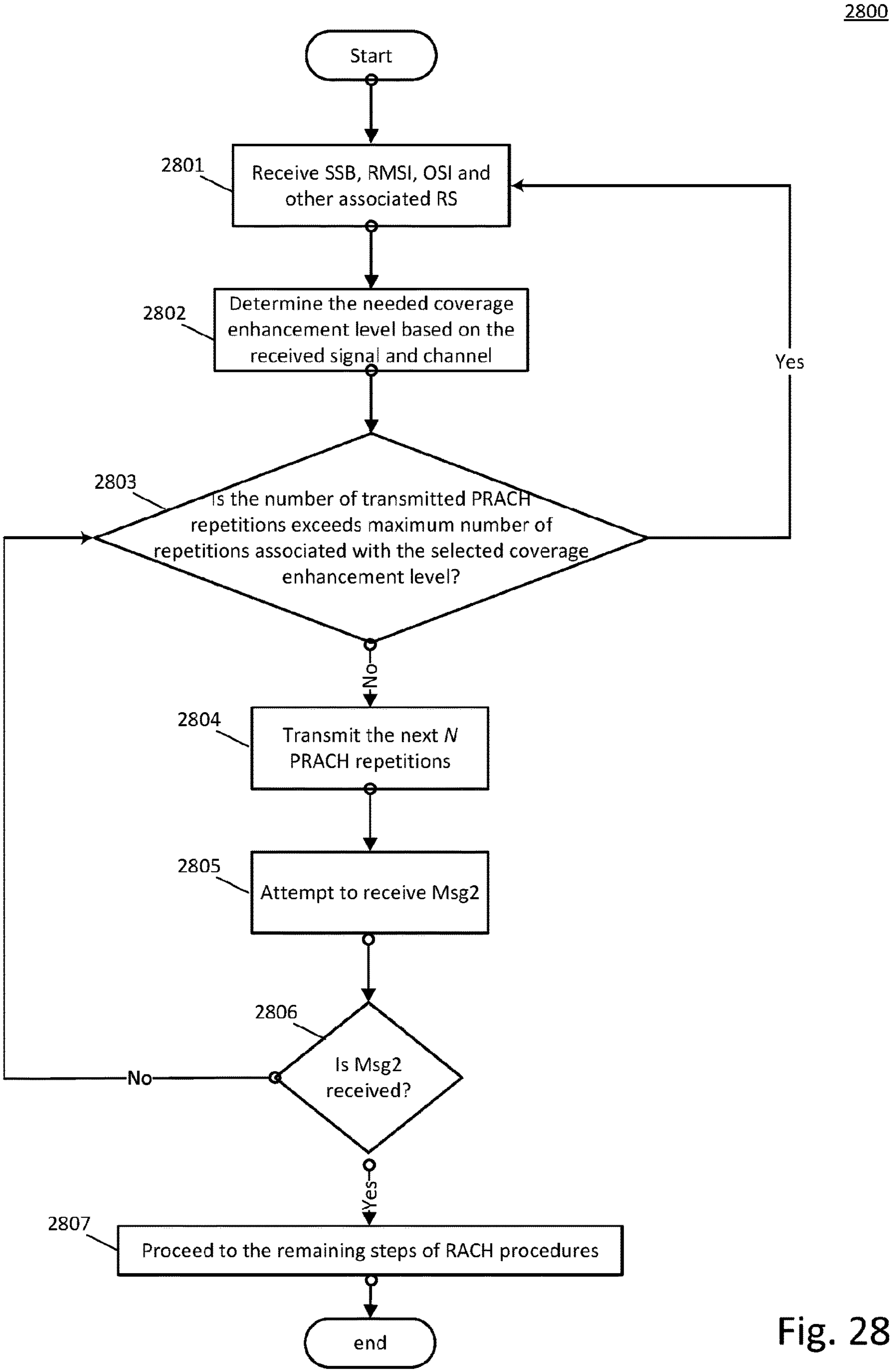
FIG. 28 shows an example procedure for monitoring Msg2 before transmitting all the PRACH repetitions.

FIG. 28 shows an example procedure for monitoring Msg2 before transmitting all the PRACH repetitions 2800. In step 2801, the reduced capability NR device may receive the SSB, RMSI, OSI, and other associated RS. At step 2802, the reduced capability NR device may determine the needed coverage enhancement level based on the received signal and channel. At step 2803, the reduced capability NR device may determine whether the number of transmitted PRACH repetitions exceeds the maximum number of repetitions associated with the selected coverage enhancement level. When the outcome of step 2803 is "no", the reduced capability NR device may attempt to monitor another or the same SSB again. Alternatively, the reduced capability NR device may assume the same coverage enhancement level (same number of repetitions) and repeat the whole PRACH repetitions (step 2804) and attempt to receive Msg2 (step 2805) with increased power following rules to increase the transmit power of PRACH in NR Rel. 15 and Rel. 16. Alternatively, the reduced capability NR device may move to the next coverage enhancement level (more repetitions). Also, similar steps may be applied if the UE fails to receive Msg2-PDCCH (step 2806) after finishing all the repetitions of PRACH or the UE fails to receive RAR-PDSCH after the correct reception of Msg2-PDCCH or the UE does not find the preamble ID after decoding RAR-PDSCH correctly. The reduced capability NR device may proceed to the remaining steps of the RACH procedure (step 2807).

Figure 29:
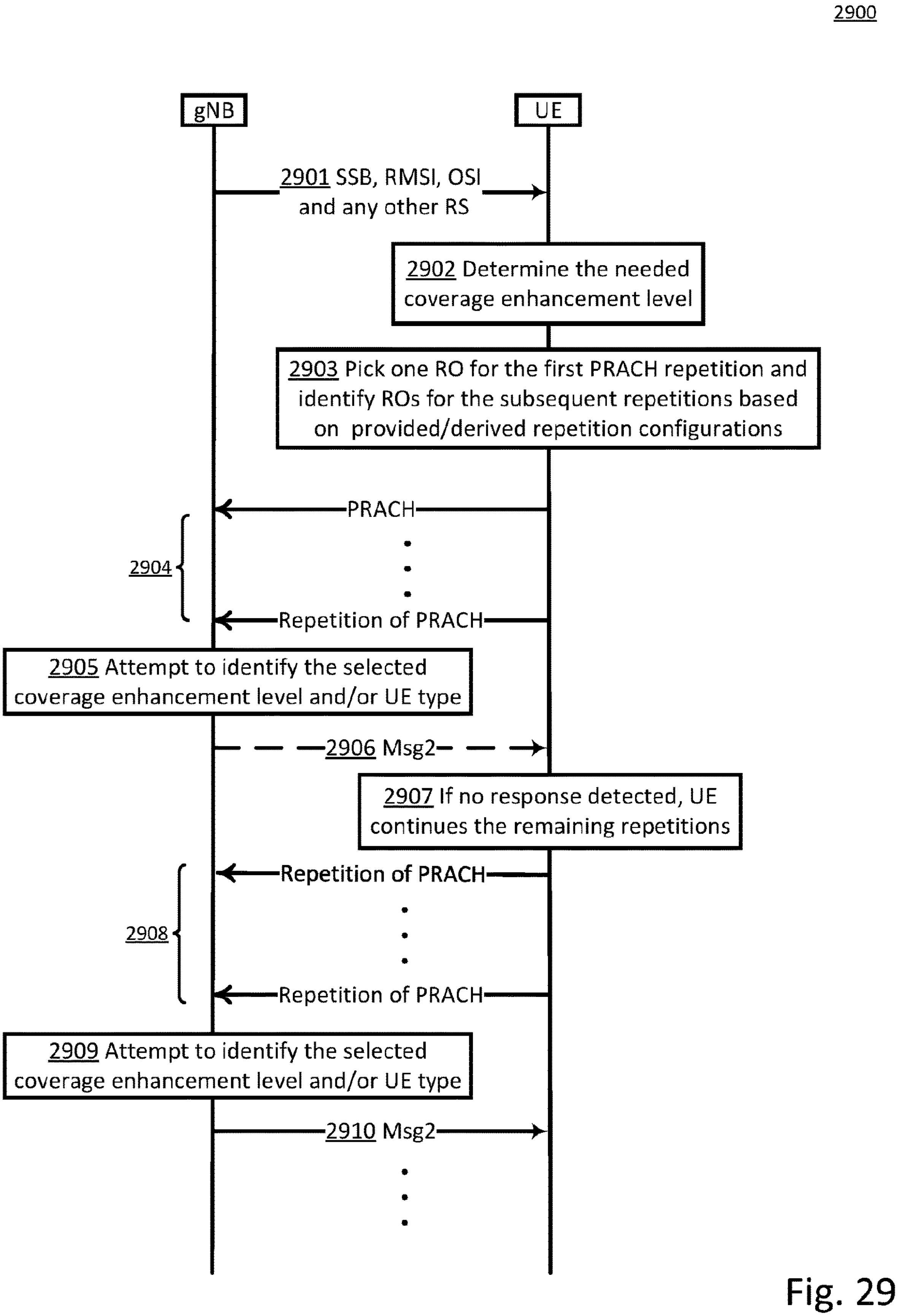
FIG. 29 shows an example procedure to monitor Msg2 before transmitting all the PRACH repetitions.

FIG. 29 shows an example procedure to monitor Msg2 before transmitting all the PRACH repetitions 2900. In step 2901, the reduced capability NR device (e.g., UE) may receive the SSB, RMSI, OSI, and other associated RS. At step 2902, the reduced capability NR device may determine the needed coverage enhancement level based on the received signal and channel. At step 2903, the reduced capability NR device may pick one RO for the first PRACH repetition and identify ROs for the subsequent repetitions based on provided/derived repetition configurations. At step 2904, the reduced capability NR device may transmit the PRACH repetitions. At step 2905, the reduced capability NR device may attempt to identify the selected coverage enhancement level and/or UE type. At step 2906, the reduced capability NR device may receive Msg2. At step 2907, the reduced capability NR device may, if no response is detected, continue the remaining repetitions. At step 2908, the reduced capability NR device may transmit the PRACH remaining repetitions. At step 2909, the reduced capability NR device may attempt to identify the selected coverage enhancement level and/or UE type. At step 2910, the reduced capability NR device may receive Msg2.

The coverage of Msg2 PDCCH and PDSCH by using repetition procedures. Similar solutions to those developed above for enhancing the coverage of RMSI-PDCCH can be applied. The Msg2-PDCCH may be repeated "n" times in consecutive or non-consecutive monitoring occasions indicated by ra-SearchSpace. The number of repetitions may be indicated by high layer signaling. Across these repetitions of Msg2-PDCCH, the content of Msg2-PDCCH may assume to be fixed such that reduced capability NR devices can combine them.

To further reduce the power consumption at reduced capability NR devices, the Msg2-PDCCH repetitions may be transmitted in the same CCEs or same PDCCH candidates that are used to carry the first Msg2-PDCCH. Such assumption reduces the number of blind decoding attempts because reduced capability NR devices do blind decoding for the first Msg2-PDCCH only.

If the Msg2-PDCCH is repeated across non-consecutive monitoring occasions, a scaling factor is applied to scale down the monitoring periodicity provided by ra-SearchSpace. In other words, the reduced capability NR device may skip some monitoring occasion from those provided ra-SearchSpace.

The repetition of Msg2-PDCCH may create some ambiguity regarding the interpretation of some of its fields such as time domain resource assignment which point to one row of the TDRA table. Each row provides the parameter K0 and the SLIV. The parameter K0 indicates to the slot offset between the slot carrying PDCCH and the slot carrying its scheduled PDSCH. With multiple Msg2-PDCCH repetitions, it is not clear to which slot the offset is applied to. Therefore, the offset may be applied with respect the slot carrying the last repetition of Msg2-PDCCH. Also, the offset may be applied with respect to the slot carrying the first (or any particular) repetition of Msg2-PDCCH.

If the reduced capability NR devices successfully decoded Msg2-PDCCH before the last, it may stop monitoring the additional Msg2-PDCCH repetitions. However, Msg2-PDSCH is scheduled relative to the last Msg2-PDCCH repetition, i.e., K0 is relative to the slot carrying the last Msg2-PDCCH repetition.

To enhance the coverage of Msg2-PDSCH, all the solutions proposed to enhance the coverage of RMSI-PDSCH may be applied here as well. In DCI format 1_0 with CRC scrambled by RA-RNTI, there are 16 reserved bits which may be used to carry the additional information to enhance the coverage of MSg2-PDSCH. The details of the usage of these reserved bits is similar to the usage of the reserved bits in RMSI-PDCCH. Also, one of those reserved bits in Msg2-pDCCH may be used to distinguish whether the scheduled RAR is directed to legacy UEs and reduced capability NR devices.

Enhancement for MsgB in 2-step RACH are described herein. Given that MsgB for reduced capability NR devices may be different from MsgB directed to legacy UEs as the coverage of former may need to be enhanced, therefore, the gNB may configure a search space to monitor PDCCH scheduling MsgB for 2-step RACH directed to reduced capability NR devices that differs from the one used for legacy UEs. To this end, gNB may configure a dedicated search space for reduced capability NR devices through higher layer signaling, e.g., RRC parameter ra-SearchSpace2StepRedCap-r17, as part of PDCCH-ConfigCommon or RACH-ConfigGenericTwoStepRA, for example.

Alternatively, the monitoring occasion of PDCCH scheduling MsgB for reduced capability NR devices may be a shifted version of the search space monitored by legacy UEs. The gNB may indicate the time offset between the PDCCH monitoring occasions for legacy UEs and the PDCCH monitoring occasions for reduced capability NR devices through higher layer signaling, such as the RRC parameter Monitoring-OccasionOffset-RedCap. It also may be specified, provided in the specs.

Even if the same PDCCH monitoring occasions are used by both legacy UEs and reduced capability NR devices, gNB may use a new RNTI to scramble PDCCH scheduling MsgB for reduced capability NR devices, e.g. MsgB-Radio-Network Temporary Identifier-Reduced Capability (MsgB-RNTI-RedCap).

The previously developed solutions for monitoring Msg2 in 4-step RACH before the competition of all PRACH repetitions may be applied for 2-step RACH with some modifications. Specifically, reduced capability NR devices may start monitoring MsgB before the completion of all MsgA-PRACH repetitions.

Figure 30:
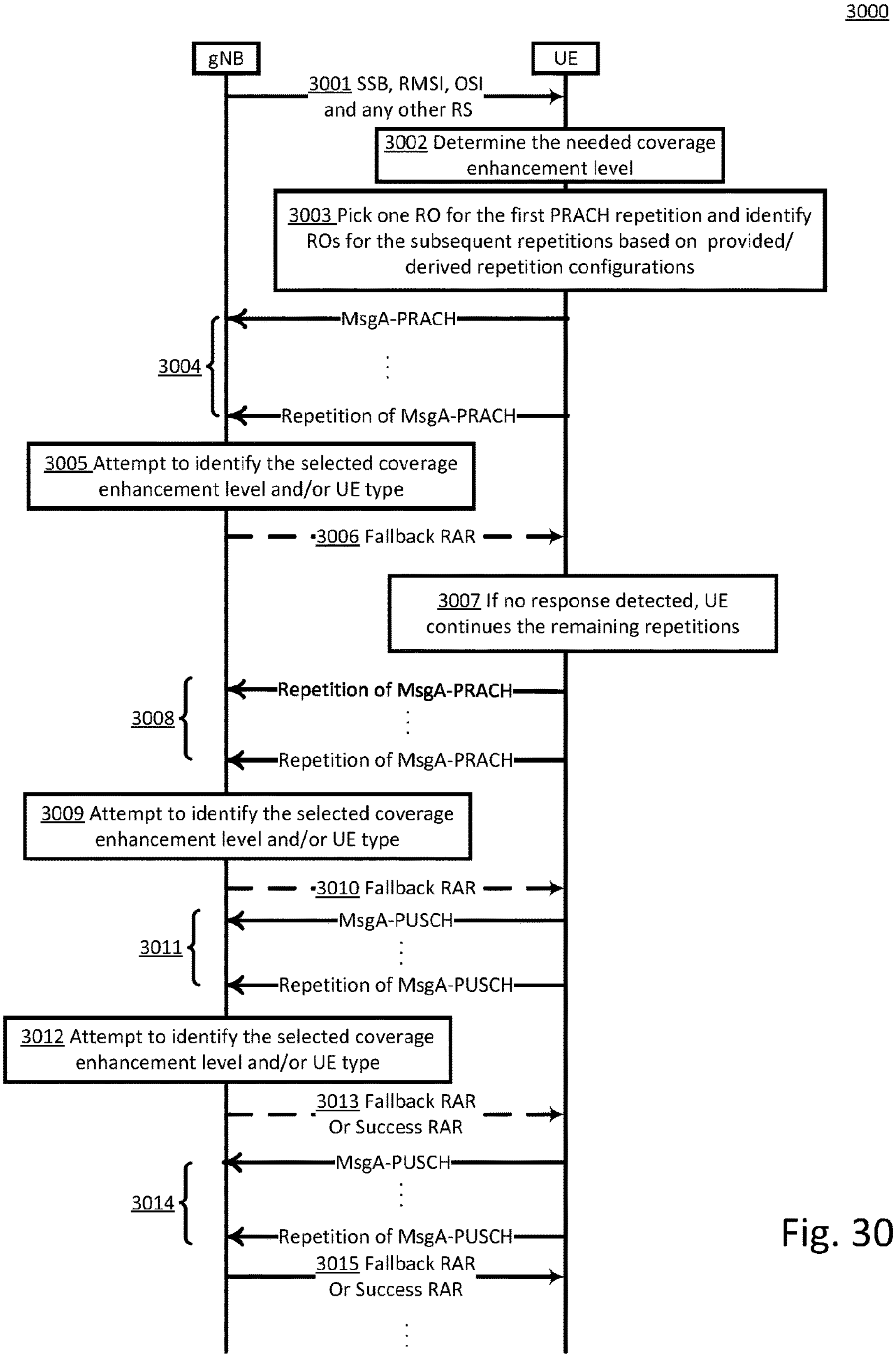
FIG. 30 shows an example procedure to monitor MsgB when the repetitions of MsgA-PRACH are completed prior to the commencement of the first MsgA-PUSCH repetition.

FIG. 30 shows an example procedure to monitor MsgB when the repetitions of MsgA-PRACH are completed prior to the commencement of the first MsgA-PUSCH repetition 3000. FIG. 30 shows an example where reduced capability NR device repeats MsgA-PRACH for coverage enhancement prior to the commencement of MsgA-PUSCH transmission. This figure is similar to FIG. 29 but with several modifications.

In step 3001, the reduced capability NR device (e.g., UE) may receive the SSB, RMSI, OSI, and other associated RS. At step 3002, the reduced capability NR device may determine the needed coverage enhancement level based on the received signal and channel. At step 3003, the reduced capability NR device may pick one RO for the first MsgA-PRACH repetition and identify ROs for the subsequent repetitions based on provided/derived repetition configurations. At step 3004, the reduced capability NR device may transmit the Msg A-PRACH repetitions. At step 3005, the reduced capability NR device may attempt to identify the selected coverage enhancement level and/or UE type. At step 3006, reduced capability NR device may monitor MsgB with Fallback RAR, for example, but they do not expect to receive a Success RAR, because reduced capability NR devices has not transmitted MsgA-PUSCH yet. Therefore, the only possibility is that gNB received and successfully detected some of MsgA-PRACH repetitions. Since MsgA-PUSCH is not transmitted yet, the only option is that gNB transmits a MsgB with Fallback RAR, for example, which lets the reduced capability NR device transmit a Msg3 according to 4-step RACH.

If the reduced capability NR device which has initiated 2-step RACH does not detect MsgB addressed to itself, the reduced capability NR device may resume the remaining repetitions of MsgA-PRACH and attempts again to receive MsgB with Fallback RAR. For example, at step 3007, the reduced capability NR device may, if no response is detected, continue the remaining MsgA-PRACH repetitions. At step 3008, the reduced capability NR device may transmit the MsgA-PRACH remaining repetitions. At step 3009, the reduced capability NR device may attempt to identify the selected coverage enhancement level and/or UE type. At step 3010, the reduced capability NR device may receive MsgB with Fallback RAR.

If not received, the reduced capability NR device may start the transmission of MsgA-PUSCH using one coverage enhancement procedure described above for MsgA-PUSCH. In FIG. 30, it is assumed that repetition-based coverage enhancement procedure is used. However, other coverage enhancement for MsgA-PUSCH procedures may be used or any of their combinations. In the same manner, after the reduced capability NR device transmits $N_{PUSCH}$ repetitions of MsgA-PUSCH (step 3011), the reduced capability NR device may attempt to receive MsgB from gNB. At step 3012, the reduced capability NR device may attempt to identify the selected coverage enhancement level and/or UE type. Since some of MsgA-PUSCH repetitions have been transmitted, the reduced capability NR device may start looking for MsgB with either Fallback RAR or success RAR as in step 3013. If UE does not receive response, the reduced capability NR device may continue the transmission of the remaining portion of MsgA-PUSCH repetitions, step 3014. Then, the reduced capability NR device may start looking for MsgB with either Fallback RAR or success RAR as in step 3015. The parameter $N_{PUSCH}$ may be indicated in the same manner as in PRACH repetitions in 4-step RACH described above.

For the coverage enhancement procedures in which the reduced capability NR device transmits MsgA-PRACH and MsgA-PUSCH in the same association period and after N attempts, a reduced capability NR device monitors MsgB that may comprise Fallback RAR or success RAR. gNB may configure the value of N as described above.

In NR Rel. 16, if the PRACH preamble is not mapped to a valid PO, UE starts the monitoring window at the first symbol that the UE is configured to receive PDCCH for Type1-PDCCH CSS set. Moreover, this window has to be at least one symbol after the last symbol of the PRACH occasion corresponding to the PRACH transmission. Since the reduced capability NR device may repeat MsgA-PUSCH across multiple ROs, it is expected that some of them may be valid and other may not be valid.

Therefore, the reduced capability NR device may start the monitoring window after encountering N valid POs. The value of N may be indicated by higher layer signaling.

The reduced capability NR device may start the monitoring window after encountering N invalid POs. The value of N may be indicated by higher layer signaling.

The decision to start the monitoring window may depend on the first PO only. If the first PO is not valid, then the monitoring window starts after last symbol of the PRACH occasion corresponding to the PRACH transmission. If the first PO is valid, then all repetitions may follow one of the previously described procedures.

The gNB may enhance the coverage of MsgB-PDCCH and MsgB-PDSCH by using repetition procedures. Similar solutions to those developed above for enhancing the coverage of RMSI and Msg2 can be applied.

Other than the repetitions, frequency hopping may be applied for Msg-PDSCH to enhance its coverage. The gNB may transmit the hops within the same BWP or across different BWPs or within the carrier that contains the BWP in which the first repetition is transmitted.

Figure 31:
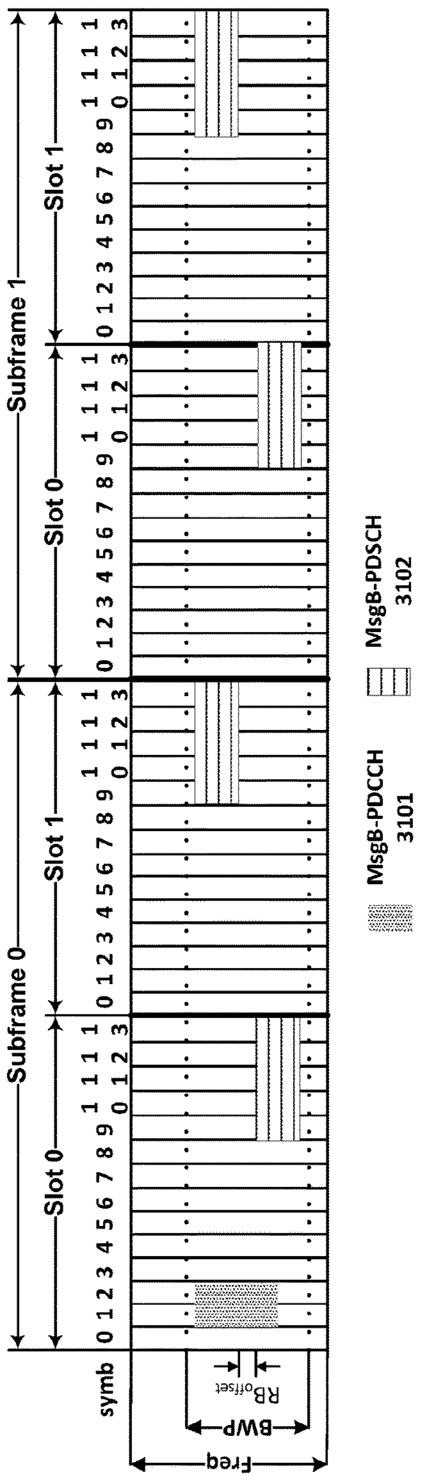
FIG. 31 shows an example hopping within a BWP inter-slot for MsgB-PDSCH.

FIG. 31 shows an example hoppin within a BWP inter-slot for MsgB-PDSCH 3100. Different hopping patterns may be used in the time domain. It may be inter-slot hopping where the hopping occurs across the slot boundary, and the starting RB of MsgB-PDSCH 3102 hop may be given by:

$$RB_{actual} = \begin{cases} RB_{start\_indicated} & n_s^{\mu} \bmod 2 = 0 \\ (RB_{start\_indicated} + RB_{offset}) \bmod N_{BWP}^{size} & n_s^{\mu} \bmod 2 = 1 \end{cases}$$

Or by $$RB_{actual} = \begin{cases} RB_{start\_indicated} & \lfloor n_s^{\mu}/\text{Nslot\_hop} \rfloor \bmod 2 = 0 \\ (RB_{start\_indicated} + RB_{offset}) \bmod N_{BWP}^{size} & \lfloor n_s^{\mu}/\text{Nslot\_hop} \rfloor \bmod 2 = 1 \end{cases}$$

where $RB_{start\_indicated}$ is the starting RB within BWP as provided by the MsgB-PDCCH 3101, and $RB_{offset}$ is the frequency hop between the two hops which may be indicated by higher layer signaling or dynamically indicated in MsgB-PDCCH 3101, and $$n_s^{\mu}$$

is the slot number within a radio frame which is exemplified in FIG. 31. The second equation shows the case where the hopping occurs every $N_{slot\_hop}$ slot. Similarly, inter-repetition hopping in which a hopping takes place after each $N_{rep\_hop}$ repetitions.

Figure 32:
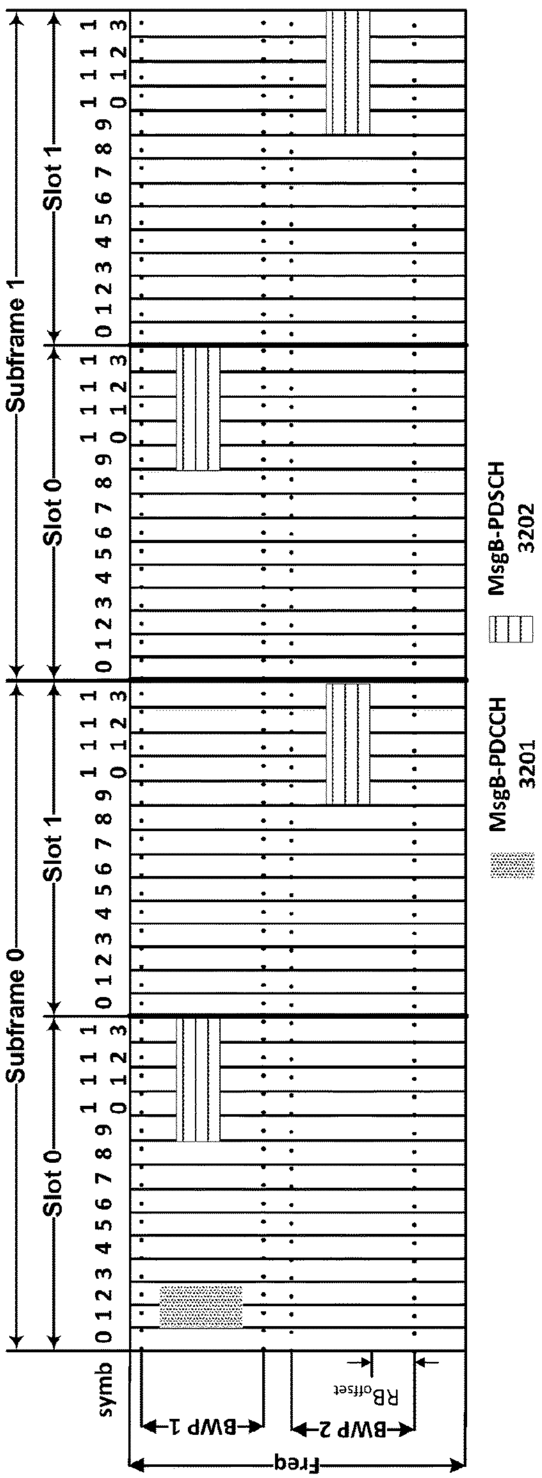
FIG. 32 shows an example across BWPs and cross slot hopping.

FIG. 32 shows an example across BWPs and cross slot hopping 3200. For cross BWP hopping, frequency hopping of MsgB-PDSCH 3202 may occur across the slot boundary, but in different BWPs. The hopping occurs in another BWP with a particular frequency offset. In this example, the frequency offset is relative to the first PRB in the new BWP. However, the frequency offset may be relative to any other reference RB within or outside the new/old BWP and it may be indicated by higher layer signaling or dynamically signaled in MsgB-PDCCH 3201.

For determining the BWP(s) in which hopping occurs, the described solutions for MsgA-PUSCH may be applied to configure/indicate/identifying which BWP(s) that can be used for frequency hopping. The MsgB-PDCCH may have a field that indicates which BWP(s) may carry the hopping. This field may be seen the same as BWP indicator field, but it is interpreted differently. Specifically, the first repetition occurs in the BWP that carries MsgB-PDCCH. The next hopping occurs in the BWP indicated by this new field.

For dynamically indicating the frequency offset either when hopping occurs within a BWP or across different BWPs, gNB may configure the reduced capability NR device through higher layer signaling with multiple frequency offset values and MsgB-PDCCH points to one of the configured values Though the described solution here are for MsgB in 2-step RACH, they can also be applied for Msg2 in 4-step RACH.

The reserved bits in MsgB-PDCCH may indicate the different information for coverage enhancement of MsgB-PDSCH about the number of repetitions, frequency offset in case of hopping is enabled, etc., the same as the usage of the reserved bits in RMSI-PDCCH and Msg2-PDCCH.

On the top of that, the one-bit field in MsgB-PDCCH may be used to determine whether this MsgB-PDCCH is directed to reduced capability NR devices or legacy UEs.

Given MsgB-PDSCH may need to be repeated to enhance its coverage, the PDSCH-to-HARQfeedback timing field may be interpreted relative to the last MsgB-PDSCH repetition.

Alternatively, to enable gNB to terminate the repetitions of MsgB-PDSCH early if the UE receives it correctly, the PDSCH-to-HARQ_feedback timing field is interpreted relative to each or some MsgB-PDSCH repetitions.

When MsgB-PDSCH is early terminated and frequency hopping is enabled across different BWP, the reduced capability NR device may assume that DL BWP that carried the Acked MsgB-PDSCH may be used for the subsequent DL transmissions.

Solutions for Msg3 in 4-step RACH and 2-step RACH (when applicable) are described herein. To enhance the coverage of Msg3, the reduced capability NR device may repeat Msg3. The details of Msg3 repetition may be provided in RAR-PDSCH and/or its scheduling PDCCH depending on the available number of bits in RAR-PDSCH.

Figure 33:
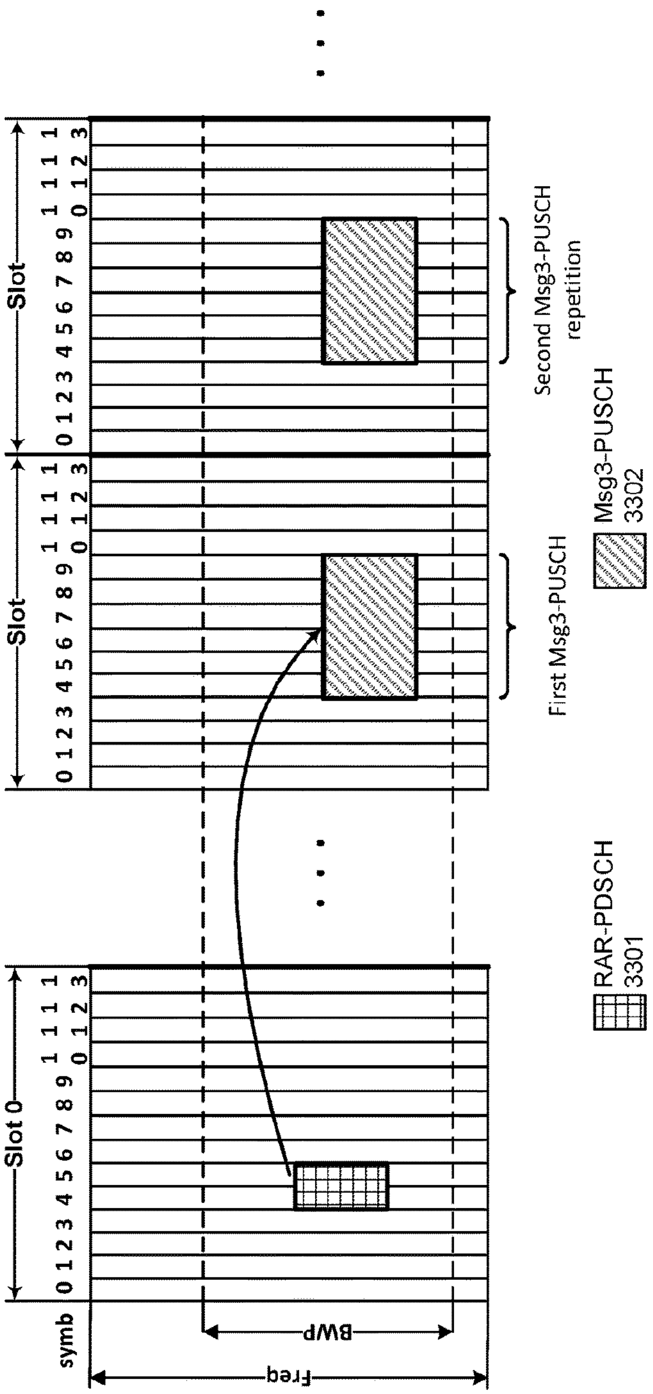
FIG. 33 shows an example of RAR scheduling multiple Msg3-PUSCH in consecutive slots.

FIG. 33 shows an example of RAR scheduling multiple Msg3-PUSCH in consecutive slots 3300. The Msg3 PUSCH time resource allocation field in RAR-PDSCH 3301 may point to the first Msg3 PUSCH repetition 3302. The remaining repetitions may occupy consecutive slots starting from the carried the first Msg3 PUSCH 3302 and start from the same symbol with the same duration as shown in FIG. 33, for example.

Other procedures to repeat Msg3 PUSCH may be applied to enhance its coverage. For example, the repetitions of Msg3 occur in the same slot and they can either be back-to-back or having few symbols separating them within the same slot.

Figure 34:
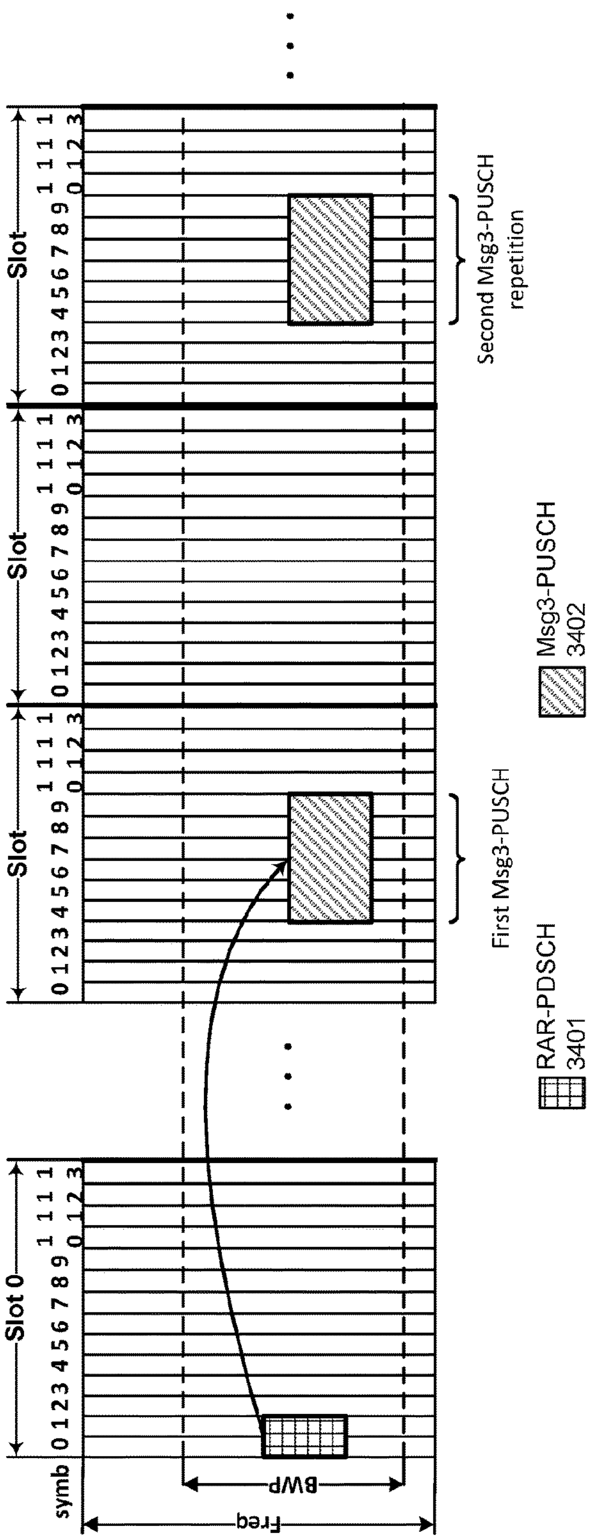
FIG. 34 shows an example of RAR scheduling multiple Msg3-PUSCH in non-consecutive slots.

FIG. 34 shows an example of RAR scheduling multiple Msg3-PUSCH in non-consecutive slots 3400. Also, the scheduling of Msg3-PUSCH may occur in non-consecutive slots with a particular pattern. For example, it may happen in every other slot, every third slot and so on. A repetition pattern value (RPV) is described herein that is similar to the form of the RMSI-PDSCH repetitions. FIG. 34 shows another example of Msg3-PUSCH repetitions 3402 in non-consecutive slots. In this example, Msg3-PUSCH repetitions 3402 take place in every other slot starting from the slot that carries the first Msg3-PUSCH. Here, RPV is equal to one-half. For example, two bits in RAR-PDSCH 3401 may be used to indicate the repetitions pattern as shown in Table 12 which may be preconfigured, provided in the specs.

TABLE 12

| Repetition pattern value for Msg3-PUSCH | |
|---|---|
| Index | RPV value |
| 0 | 1 (Msg3-PUSCH repetitions are in every consecutive slot starting from the slot carries the first Msg3-PUSCH) |
| 1 | ½ (Msg3-PUSCH repetitions are in every other slot starting from the slot carries the first Msg3-PUSCH) |
| 2 | ⅓ (Msg3-PUSCH repetitions are in every third slot starting from the slot carries the first Msg3-PUSCH) |
| 3 | ¼ (Msg3-PUSCH repetitions are in every fourth slot starting from the slot carries the first Msg3-PUSCH) |

Also, another two bits in RAR-PDSCH, for example, may be used to indicate the number of repetitions of Msg3-PUSCH from four preconfigured values, provided in the specs.

In NR Rel. 15 and Rel. 16, the first Msg3-PUSCH is transmitted using redundancy version (RV) index of RV0. Therefore, RV may be cycled across the subsequent repetitions of Msg3-PUSCH according to the order of RV indices of 0-2-3-1, for example.

There is a chance that there are not enough reserved bits in RAR-PDSCH to carry the information for Msg3-PUSCH repetitions such as the number of repetitions. In this case, the reserved bits in the DCI may be used for scheduling RAR-PDSCH to indicate the number of repetitions not only of RAR-PDSCH, but also Msg3-PUSCH. The number of Msg3-PUSCH repetitions may be provided as part RACH configurations. The repetitions of Msg3-PUSCH may be equal to or derived from the number of repetitions of RAR-PDSCH. The repetitions of Msg3-PUSCH may be equal to or derived from the number of repetitions of PRACH based on the selected coverage enhancement level.

Enhancement for MsgB with Fallback RAR are described herein. Similar to Msg2-RAR which scheduled msg3, gNB can transmit MsgB with Fallback RAR to schedule Msg3 for reduced capability NR devices. The same procedures described above for enhancing the coverage of Msg3 in 4-step RACH may be used in when MsgB with Fallback RAR schedules Msg3 in 2-step RACH.

The key difference is that Fallback subPDU has only one reserved bit. Therefore, it may not be enough to indicate all the relevant information of Msg3 for coverage enhancement such as the number of repetitions, repetition pattern, etc. Therefore, the gNB may exploit reserved bits in MsgB-PDCCH use them to carry the relevant or the remaining information for the coverage enhancement of MsgB-PUSCH.

In this case, if gNB multiplexes multiple Fallback RARs for different reduced capability NR devices in the same MsgB, each device receives information about the time/frequency resources of first Msg3 repetition from its Fallback subPDU. However, gNB transmits the remaining information such as the number of repetitions, the repetition pattern, etc., in Msgb_PDCCH which is common for all the reduced capability NR devices that find their RAPID in the Fallback subPDU.

Solutions for Msg4 in 4-step RACH are described herein. To enhance the coverage of Msg4-PDSCH and its scheduling PDCCH, similar procedures may be used as those developed to enhance the coverage of RMSI-PDCCH, RMSI-PDSCH, Msg2-PDCCH and Msg2-PDSCH.

The key difference between Msg4-PDSCH and others is that the UE may be required to transmit HARQ-ACK in PUCCH to indicate that that Msg4-PDSCH is received correctly. To this end, the PDSCH-to-HARQ_feedback timing field in the DCI format 1_0 with CRC scrambled by TC-RNTI or C-RNTI. Specifically, this field indicate the number of slots between the slot carrying PUCCH and the slot carrying Msg4-PDSCH.

Given Msg4-PDSCH may need to be repeated to enhance its coverage, the PDSCH-to-HARQ_feedback timing field may be interpreted relative to the last Msg4-PDSCH repetition.

Alternatively, to enable gNB to terminate the repetitions of Msg4-PDSCH if the UE receives it correctly, then the PDSCH-to-HARQ_feedback timing field may be interpreted relative to each or some Msg4-PDSCH repetitions.

The PUCCH carrying ACK of Msg4 may be repeated and the indicated value in PDSCH-to-HARQ_feedback timing field indicate when to the first repetition of PUCCH may be transmitted. The remaining repetition of PUCCH may be transmitted after the first repetition according to particular rules.

What is claimed is:

1. A wireless communications device comprising a processor and a memory, the wireless communications device further including computer-executable instructions stored in the memory of the wireless communications device which, when executed by the processor of the wireless communications device, cause the wireless communications device to:

receive, from a base station, a reference signal (RS);

receive, from the base station, a RS receive power (RSRP) threshold for Msg3 of 4-step random access channel (RACH) via a radio resource control (RRC) signaling;

receive information indicating bandwidth part for reduced capability device;

determine, based on the received reference signal (RS) and the RSRP threshold, whether to select resources for Msg3 repetition for the wireless communications device or resources without Msg3 repetition for the wireless communications device:

in response to determining to select the resources for Msg3 repetition, determine a number of repetition of a Msg3 for the 4-step random access channel (RACH) based on information indicated by 2 bits of a random access response (RAR) and information included in RACH configuration, wherein the RACH configuration includes the RSRP threshold; and send, based on the determined number of repetition, one or more Msg3 repetitions to the base station using the bandwidth part for reduced capability device received in said receiving the information indicating bandwidth part for reduced capability device.

2. The wireless communications device of claim 1, wherein the wireless communications device is a reduced capability New Radio (NR) device.

3. The wireless communications device of claim 1, wherein the reference signal (RS) comprises a synchronization signal block (SSB).

4. The wireless communications device of claim 1, wherein the reference signal (RS) is monitored at a reduced frequency with respect to a legacy user equipment (UE) monitoring frequency.

5. The wireless communications device of claim 1, wherein the one or more Msg3 repetitions are sent in non-consecutive slots.

6. The wireless communications device of claim 1, wherein the one or more Msg3 repetitions are sent in different bandwidth parts (BWPs).

7. The wireless communications device of claim 1, wherein the one or more Msg3 repetitions are sent in a frequency hopping mode.

8. The wireless communications device of claim 1, wherein the one or more Msg3 repetitions comprise a preamble indicating that the wireless communications device is a reduced capability new radio (NR) device.

9. The wireless communications device of claim 1, wherein the computer-executable instructions, when executed by the processor of the wireless communications device, further cause the wireless communications device to:

receive, from the base station, a fallback random access response (RAR).

10. The wireless communications device of claim 1, wherein the reference signal (RS) is a received signal strength indicator.

11. The wireless communications device of claim 1, wherein the 4-step random access channel is a 4-step physical random access channel (PRACH).

12. The wireless communications device of claim 1, wherein the radio resource control (RRC) configuration includes the RS receive power (RSRP) threshold for 4-step random access channel (RACH).

13. The wireless communications device of claim 1, wherein whether to select resources indicating Msg3 repetition for the wireless communications device is determined based on a comparison of the received reference signal (RS) with the RSRP threshold.

14. A method for use in a wireless communications device, the method comprising:

receiving, from a base station, a reference signal (RS);

receiving, from the base station, a RS receive power (RSRP) threshold for Msg3 of 4-step random access channel (RACH) via a radio resource control (RRC) signaling;

receiving information indicating bandwidth part for reduced capability device;

determining, based on the received reference signal RS and the RSRP threshold, whether to select resources for Msg3 repetition for the wireless communications device or resources without Msg3 repetition for the wireless communications device;

in response to determining to select the resources for Msg3 repetition, determining a number of repetition of a Msg3 for the 4-step random access channel (RACH) based on information indicated by 2 bits of a random access response (RAR) and information included in RACH configuration, wherein the RACH configuration includes the RSRP threshold; and sending, based on the determined number of repetition, one or more Msg3 repetitions to the base station using the bandwidth part for reduced capability device received in said receiving the information indicating bandwidth part for reduced capability device.

15. The method of claim 14, wherein the wireless communications device is a reduced capability new radio (NR) device.

16. The method of claim 14, wherein the reference signal (RS) comprises a synchronization signal block (SSB).

17. The method of claim 14, wherein the one or more Msg3 repetitions are sent in consecutive slots or non-consecutive slots.

18. The method of claim 14, wherein the one or more Msg3 repetitions are sent in different bandwidth parts (BWPs).

19. The method of claim 14, wherein the reference signal (RS) is a received signal strength indicator.

20. The method of claim 14, wherein the 4-step random access channel is a 4-step physical random access channel (PRACH).

21. The method of claim 14, wherein the radio resource control (RRC) configuration includes the RS receive power (RSRP) threshold for 4-step random access channel (RACH).

22. The method of claim 14, wherein whether to select resources indicating Msg3 repetition for the wireless communications device is determined based on a comparison of the received RS with the RSRP threshold.

23. The method of claim 14, wherein the reference signal (RS) is monitored at a reduced frequency with respect to a legacy user equipment (UE) monitoring frequency.

* * * * *